Sept. 18, 1951 J. H. VOSS 2,568,101

AUTOMATIC ALL-RELAY TELEPHONE SYSTEM

Filed Jan. 8, 1947 16 Sheets-Sheet 1

INVENTOR.
JOHN H. VOSS

BY Chas. Tr. Candy

ATTORNEY

Sept. 18, 1951 J. H. VOSS 2,568,101

AUTOMATIC ALL-RELAY TELEPHONE SYSTEM

Filed Jan. 8, 1947 16 Sheets-Sheet 2

FINDER

INVENTOR.
JOHN H. VOSS

BY *Chas. Tu. Candy*

ATTORNEY

Sept. 18, 1951 J. H. VOSS 2,568,101

AUTOMATIC ALL-RELAY TELEPHONE SYSTEM

Filed Jan. 8, 1947 16 Sheets-Sheet 3

*INVENTOR.*
JOHN H. VOSS

BY *Chas. W. Candy*

ATTORNEY

Sept. 18, 1951 J. H. VOSS 2,568,101

AUTOMATIC ALL-RELAY TELEPHONE SYSTEM

Filed Jan. 8, 1947 16 Sheets-Sheet 4

INVENTOR.
JOHN H. VOSS

BY Chas. W. Cardy

ATTORNEY

Sept. 18, 1951 J. H. VOSS 2,568,101

AUTOMATIC ALL-RELAY TELEPHONE SYSTEM

Filed Jan. 8, 1947 16 Sheets-Sheet 5

INVENTOR.
JOHN H. VOSS

BY Chas. W. Candy

ATTORNEY

Sept. 18, 1951 J. H. VOSS 2,568,101

AUTOMATIC ALL-RELAY TELEPHONE SYSTEM

Filed Jan. 8, 1947 16 Sheets-Sheet 6

INVENTOR.
JOHN H. VOSS
BY Chas. Ter. Candy
ATTORNEY

AUTOMATIC ALL-RELAY TELEPHONE SYSTEM

Filed Jan. 8, 1947 16 Sheets-Sheet 7

INVENTOR.
JOHN H. VOSS
BY Clarence L. Cassidy
ATTORNEY

AUTOMATIC ALL-RELAY TELEPHONE SYSTEM

Filed Jan. 8, 1947 16 Sheets-Sheet 8

*INVENTOR.*
JOHN H. VOSS

*BY*

ATTORNEY

AUTOMATIC ALL-RELAY TELEPHONE SYSTEM

Filed Jan. 8, 1947 16 Sheets-Sheet 9

INVENTOR.
JOHN H. VOSS
BY
Chas. W. Candy
ATTORNEY

Sept. 18, 1951 J. H. VOSS 2,568,101

AUTOMATIC ALL-RELAY TELEPHONE SYSTEM

Filed Jan. 8, 1947 16 Sheets-Sheet 10

*INVENTOR.*
JOHN H. VOSS

*BY* Chas. [signature]

ATTORNEY

Sept. 18, 1951 J. H. VOSS 2,568,101

AUTOMATIC ALL-RELAY TELEPHONE SYSTEM

Filed Jan. 8, 1947 16 Sheets-Sheet 11

INVENTOR.
JOHN H. VOSS

BY Chas. M. Candy

ATTORNEY

Sept. 18, 1951 J. H. VOSS 2,568,101

AUTOMATIC ALL-RELAY TELEPHONE SYSTEM

Filed Jan. 8, 1947 16 Sheets-Sheet 12

INVENTOR.
JOHN H. VOSS

BY Chas. Lu. Candy

ATTORNEY

INVENTOR.
JOHN H. VOSS
BY
Chas. W. Candy
ATTORNEY

CONN. CONTR. UNIT

INVENTOR.
JOHN H. VOSS

BY

ATTORNEY

INVENTOR.
JOHN H. VOSS
BY Chas. W. Candy
ATTORNEY

Sept. 18, 1951 J. H. VOSS 2,568,101

AUTOMATIC ALL-RELAY TELEPHONE SYSTEM

Filed Jan. 8, 1947

16 Sheets-Sheet 16

INVENTOR.
JOHN H. VOSS

BY Chas. W. Cardy

ATTORNEY

Patented Sept. 18, 1951 2,568,101

UNITED STATES PATENT OFFICE 2,568,101

AUTOMATIC ALL-RELAY TELEPHONE SYSTEM

John H. Voss, Rochester, N. Y., assignor to Automatic Electric Laboratories, Inc., Chicago, Ill., a corporation of Delaware Application January 8, 1947, Serial No. 720,757

27 Claims. (Cl. 179—18)

Figure 1:
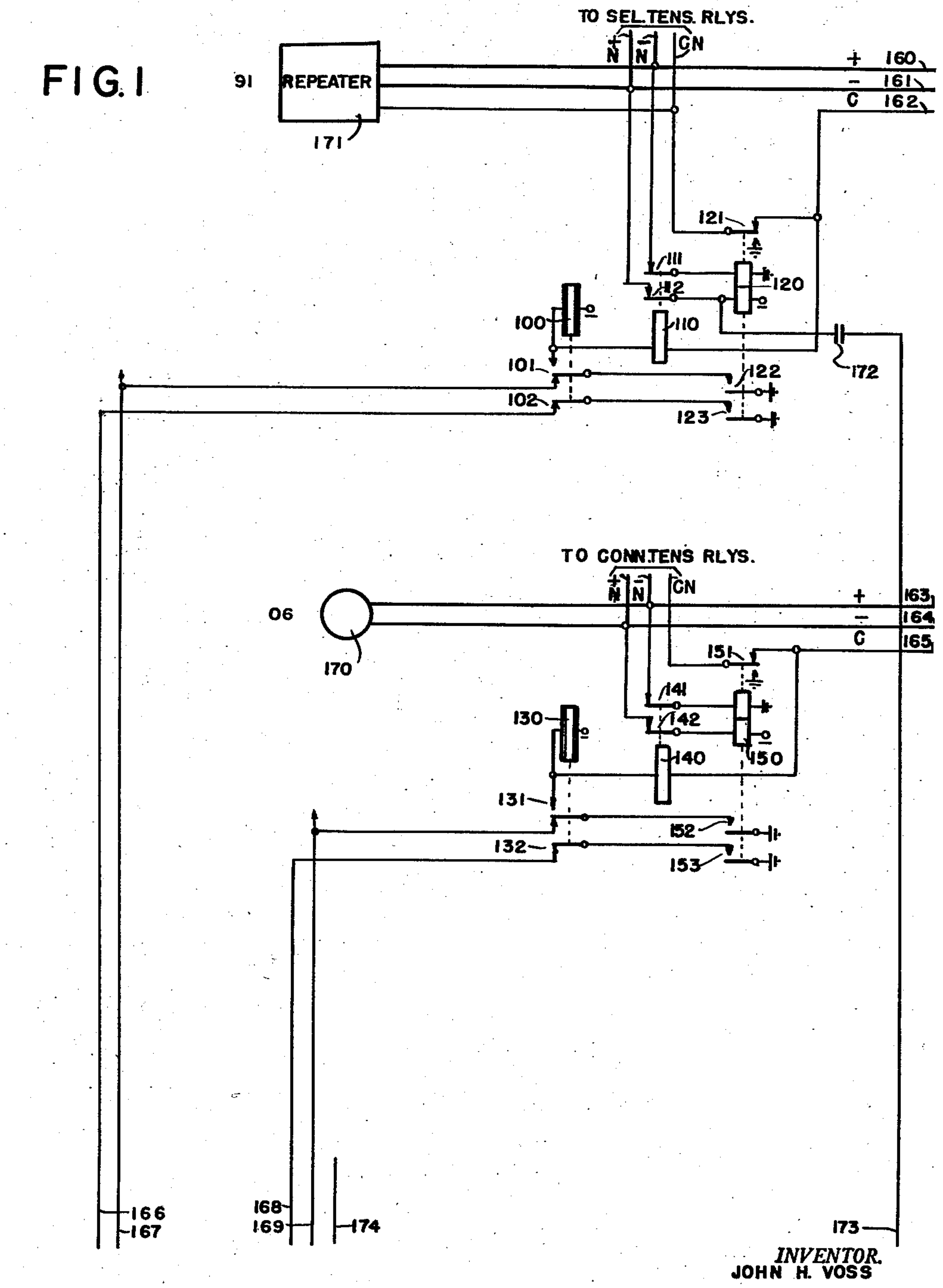

This invention relates in general to telephone systems, but more particularly to automatic telephone systems of the all-relay type, generally similar to those described in Patent 2,491,291 issued to Voss and Jones on December 13, 1949, and in the co-pending application Serial No. 720,756, filed January 8, 1947, now Patent No. 2,535,764, granted December 26, 1950.

Telephone systems of this type, while comparatively new, are known to be extremely fast in operation, and quite reliable in performance. They tend however, to be high in cost, particularly in the larger sizes employing selectors, because of the very large number of relays required. This high cost has been perhaps, the most important handicap encountered in the commercial exploitation of the all-relay system.

The principal method employed in the past to reduce the cost of this type of system has been to remove all control relays from the individual linefinders, and concentrate them in control units common to a plurality of linefinders, leaving in these latter units only the tens and units relays and one or more connect relays for connecting them to the control equipment as and when required. More recent developments, including said aforementioned co-pending applications, teach the use of trunk-selecting equipment common to a plurality of selectors or connectors, rather than making such equipment an integral part of each switch.

The main purpose of the present invention is to continue this process, and still further reduce the cost of such systems, by removing most of the remaining control relays from both the selectors and the connectors, and placing these relays in common control units accessible to a plurality of said switches. Such arrangements are known in connection with Strowger switch systems and other machine switching systems, where however, they have less utility, and, in connection with Strowger systems, at least, tend to reduce somewhat, the inherent flexibility of this equipment.

One feature of my invention is therefore the provision of a selector from which have been removed, not only the trunk-selecting relays, but also the line, release, hold, counting, and transfer relays, as well as the dial tone, timing, and service restriction features normally included in each individual selector switch.

Another feature of my invention is the provision of a connector from which have been removed, not only all trunk selecting relays, but also the pulse counting and digit transfer relays, and the line testing and ringing control relays, as well as the busy tone and reverting call tone features normally included in each individual connector switch.

Another feature of my invention is the provision of separate common control units for linefinders, selectors and connectors, as well as separate trunk selecting units for both selectors and connectors, and the progressive release of these units for use by other switches, as the call progresses through its different stages.

A further feature of the invention is the forced release of all common control units if held for longer than a certain fixed maximum time interval.

Still another feature of the invention is the momentary busying of the idle connectors of a group when the associated common control unit is seized by one of said connectors.

Another feature of the invention lies in the association of two or more common control units with any given group of selectors, and the use of said control units in rotation. It will be obvious that such an arrangement could also be used with the connectors if desired, with only minor changes in the circuits.

Other objects and features of the invention will be apparent from the specification and claims which follow, considered in conjunction with the associated drawings comprising Figures 1 to 18 inclusive, which show one embodiment of the invention as applied to a 1000 line system of the type indicated. It will be understood that the arrangement shown is but one embodiment of the invention, and that various modifications and re-arrangements are possible, without departing from the scope of the invention.

Figure 16:
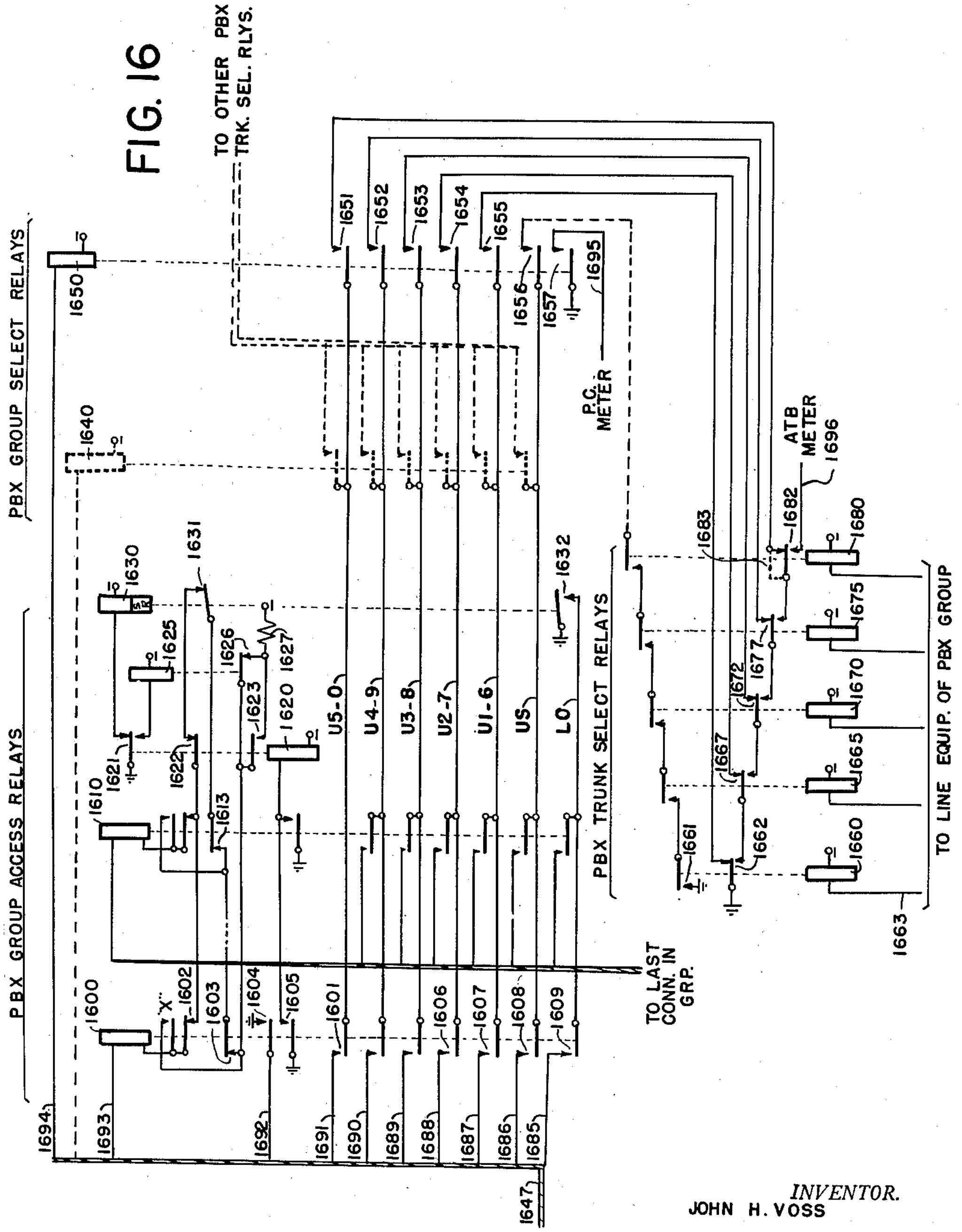
Figures 17, 18:
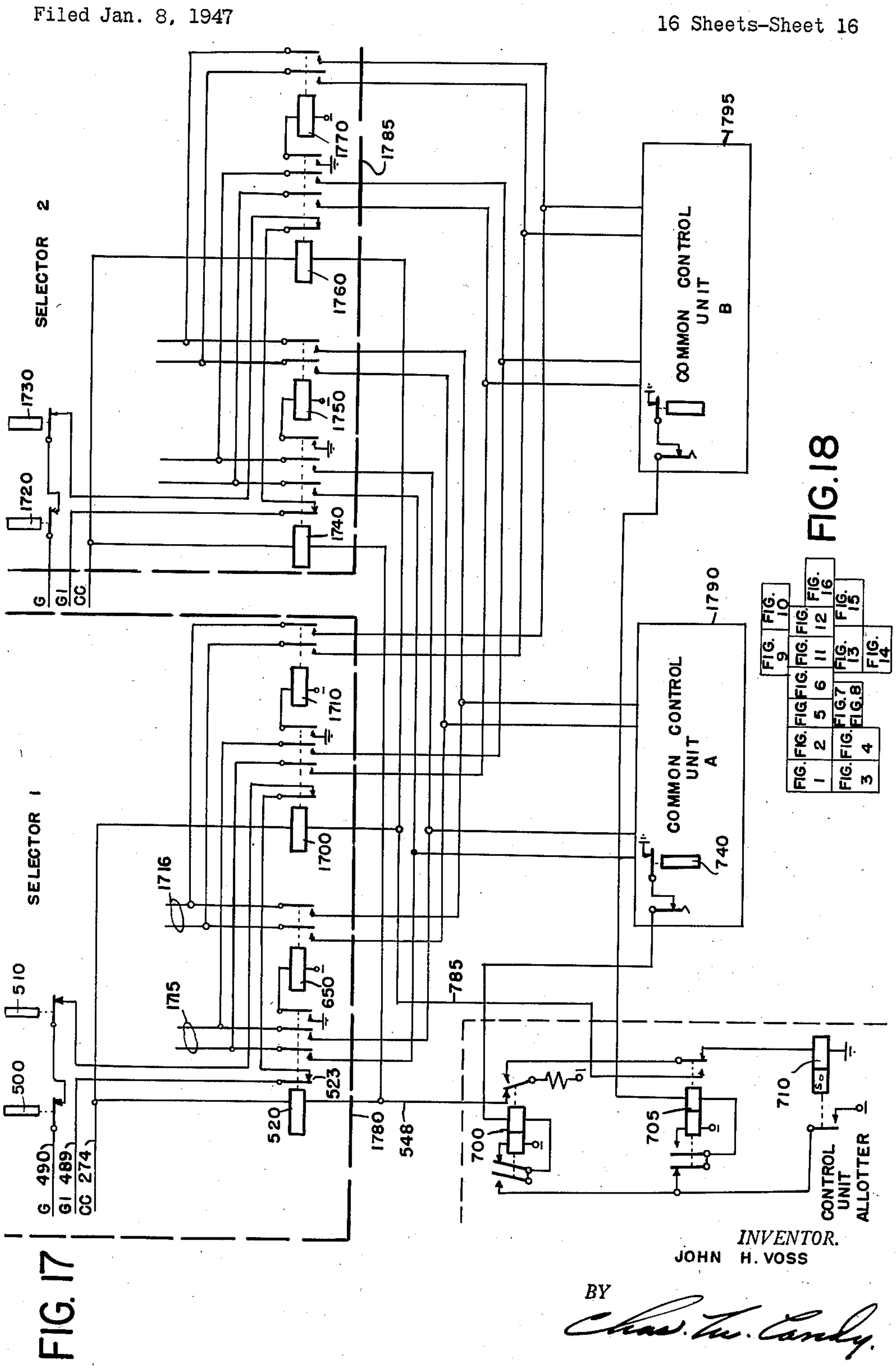

With reference to the drawings, Figures 1 to 16, when arranged as indicated in Figure 18, with the adjoining conductors properly aligned, represent a sufficient amount of the essential parts of the system to enable the operation thereof to be thoroughly understood.

Figure 2:
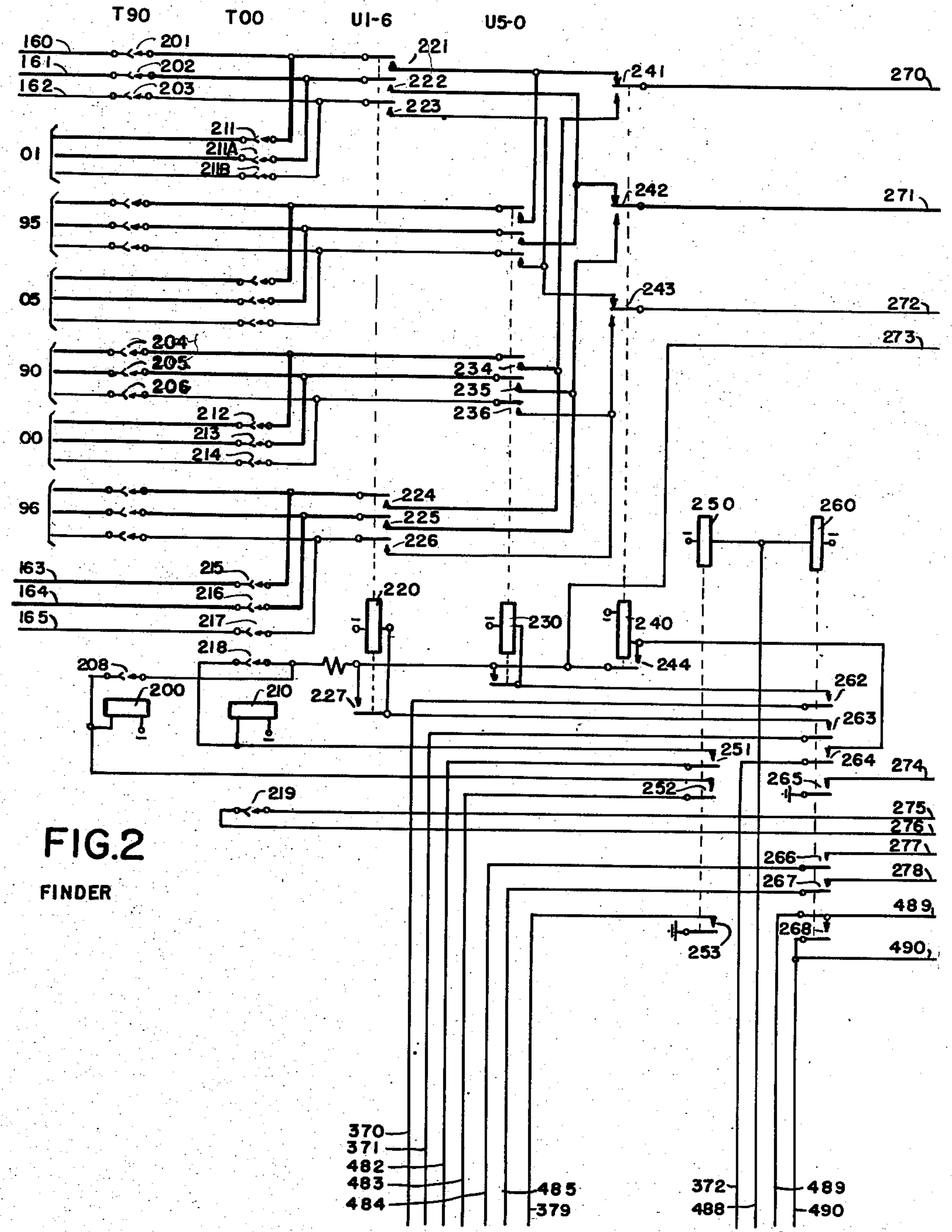
Figure 3:
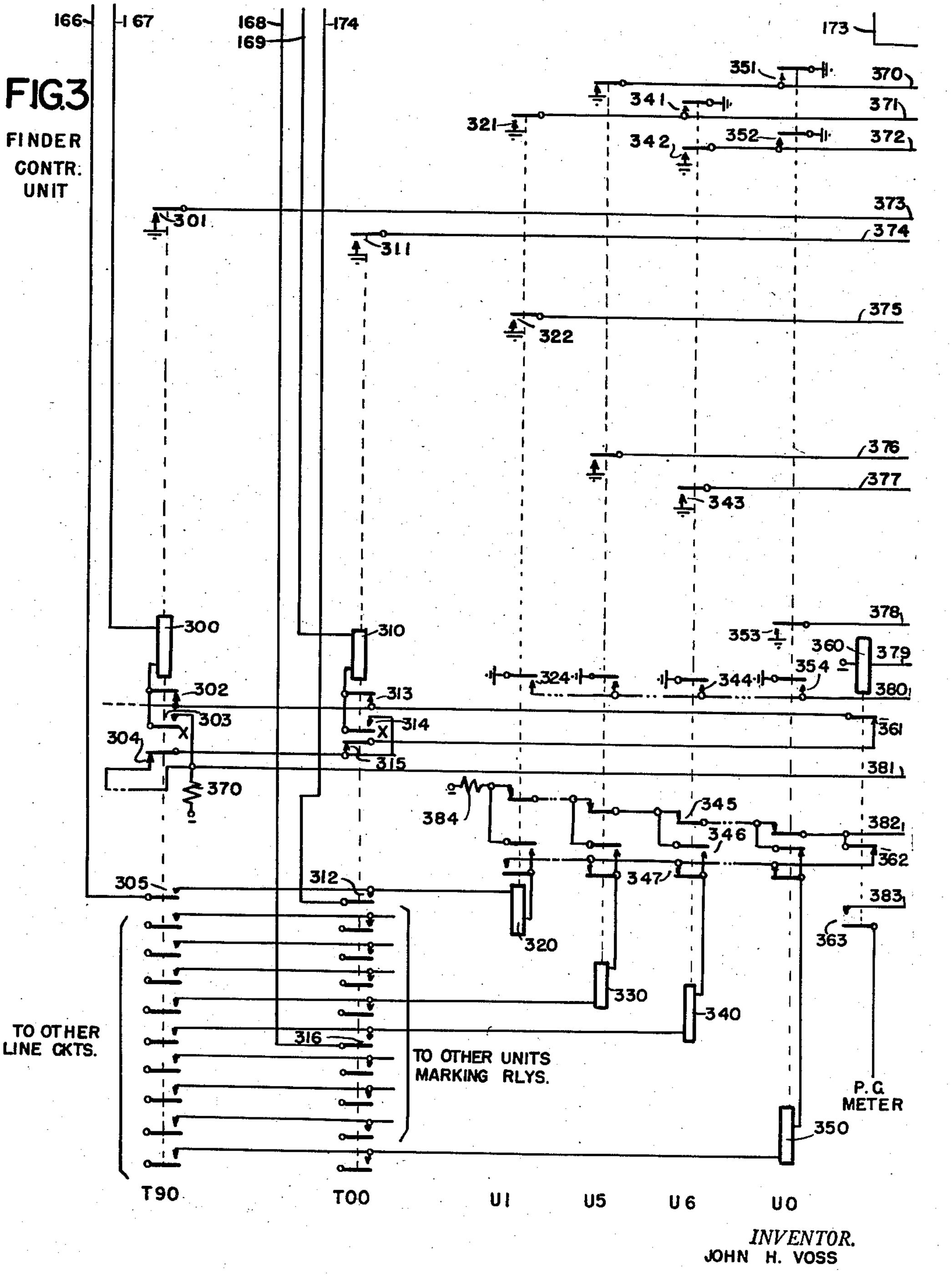
Figure 4:
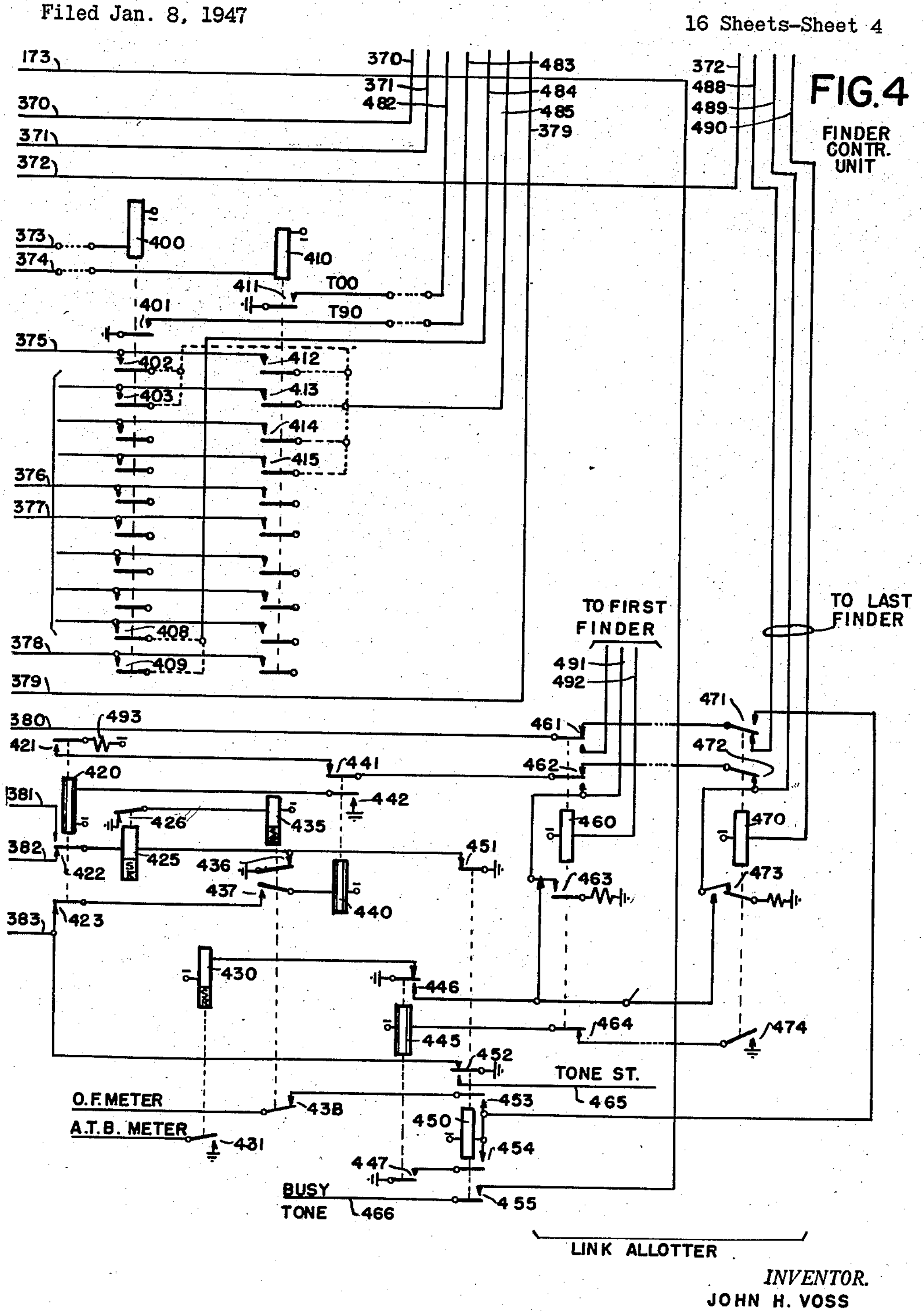

Thus, Figures 1 to 4 inclusive represent the line and linefinder equipment, and the finder control relays, Figure 1 showing the line equipment, Figure 2 the linefinder equipment, and Figures 3 and 4 the linefinder common control and allotter equipment.

Figure 5:
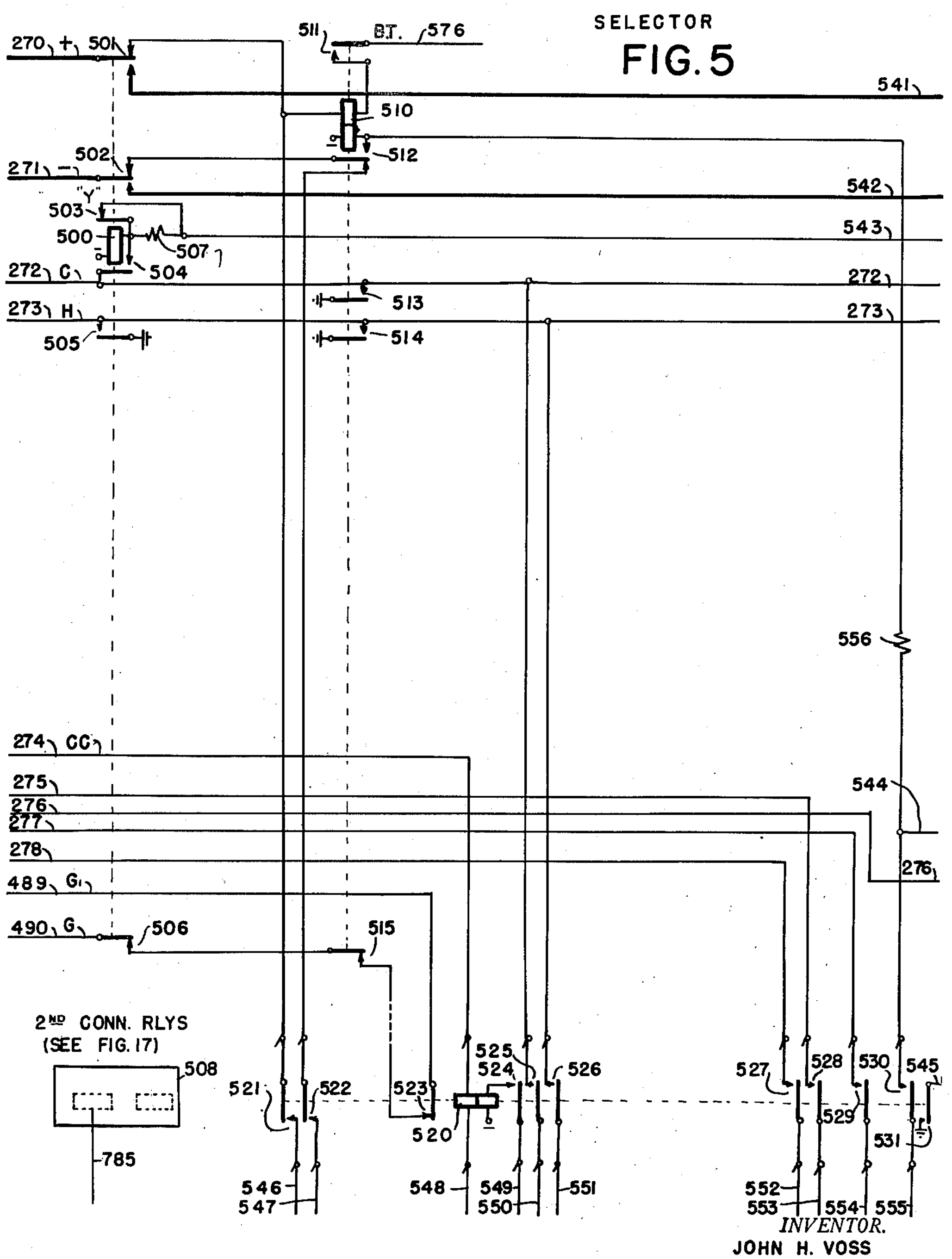
Figure 6:
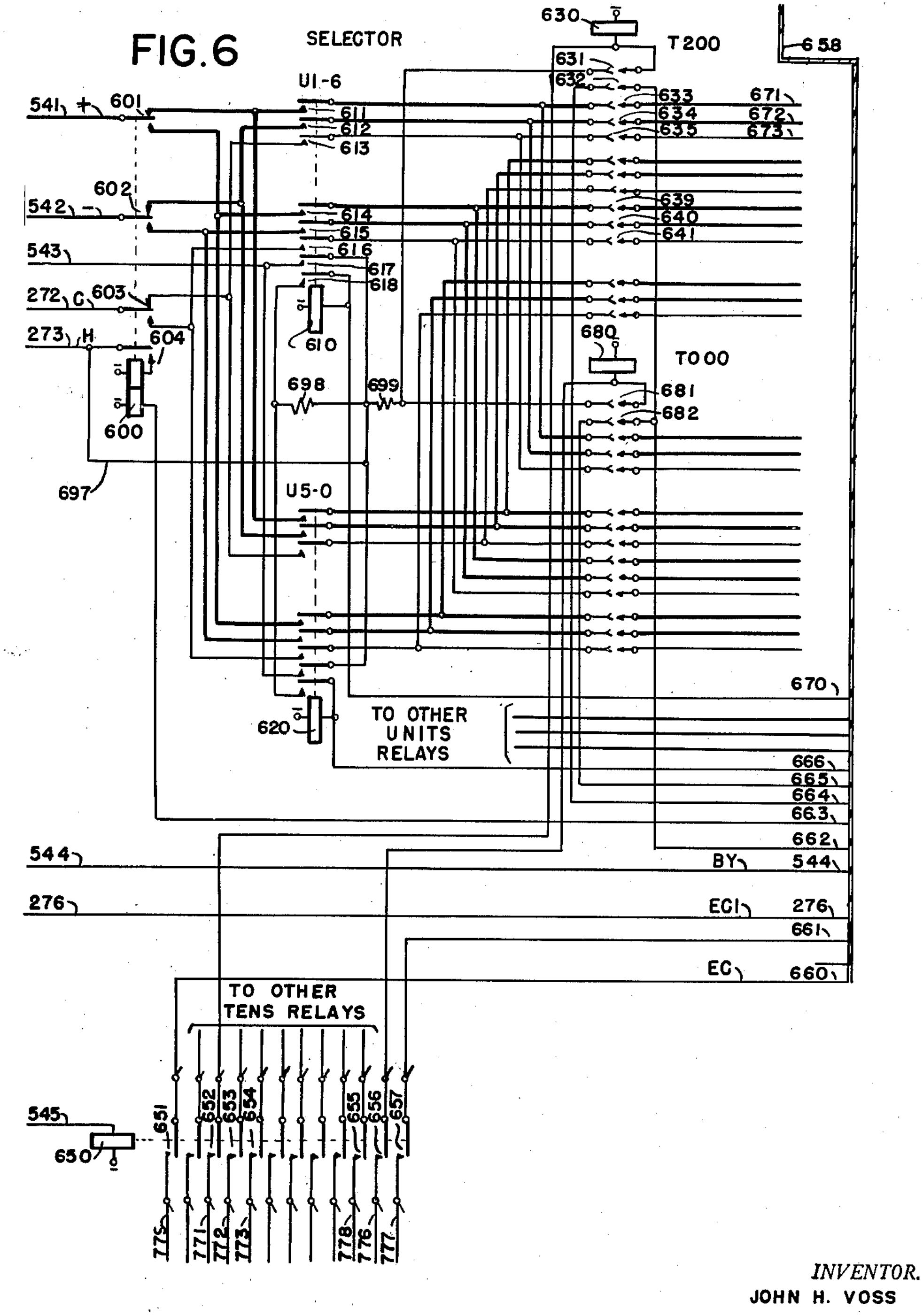
Figures 7, 8:
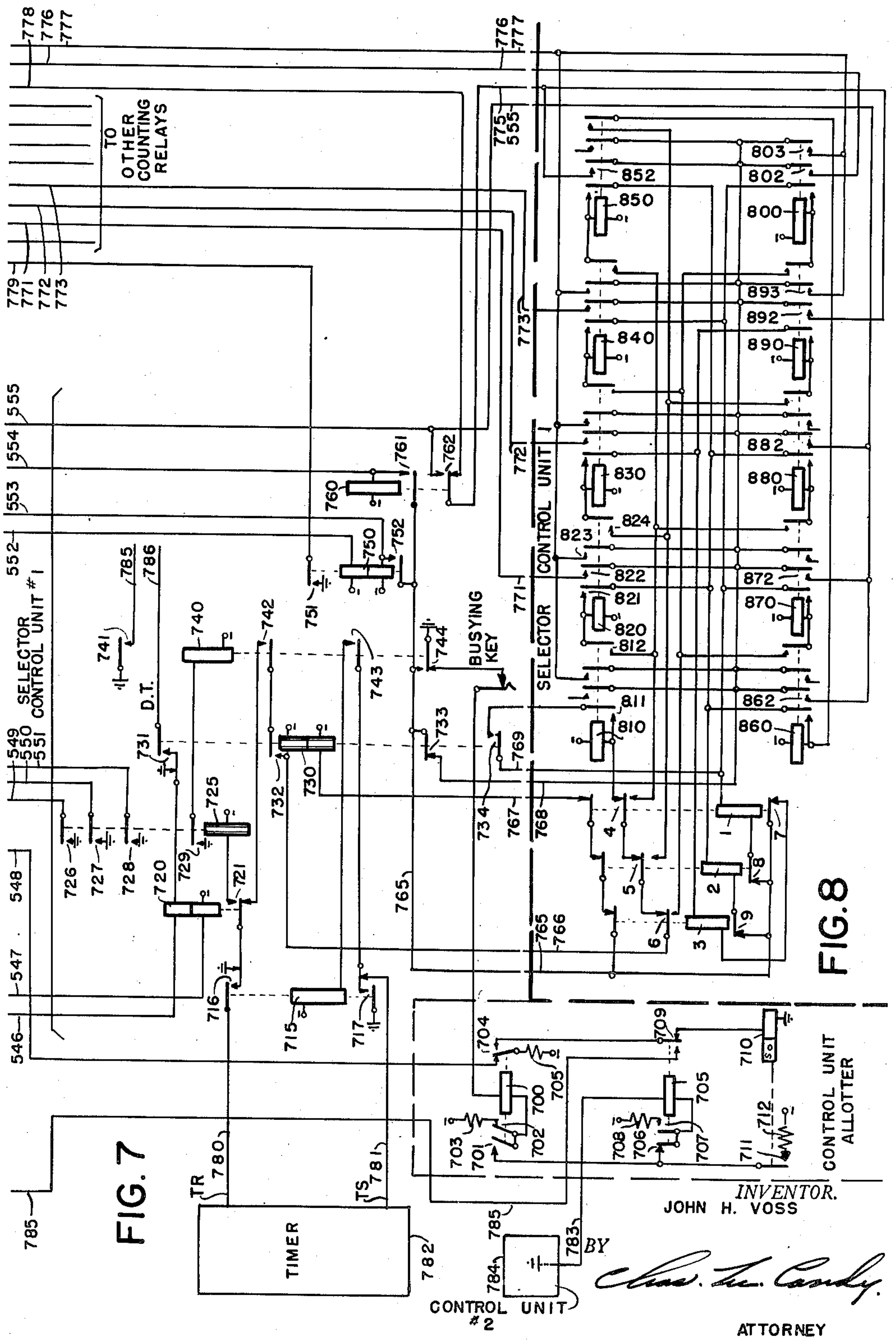

Similarly, Figures 5 to 8 inclusive show a selector and the associated common control equipment, with Figures 5 and 6 representing the selector and Figures 7 and 8 the selector common control unit or units.

Figure 9:
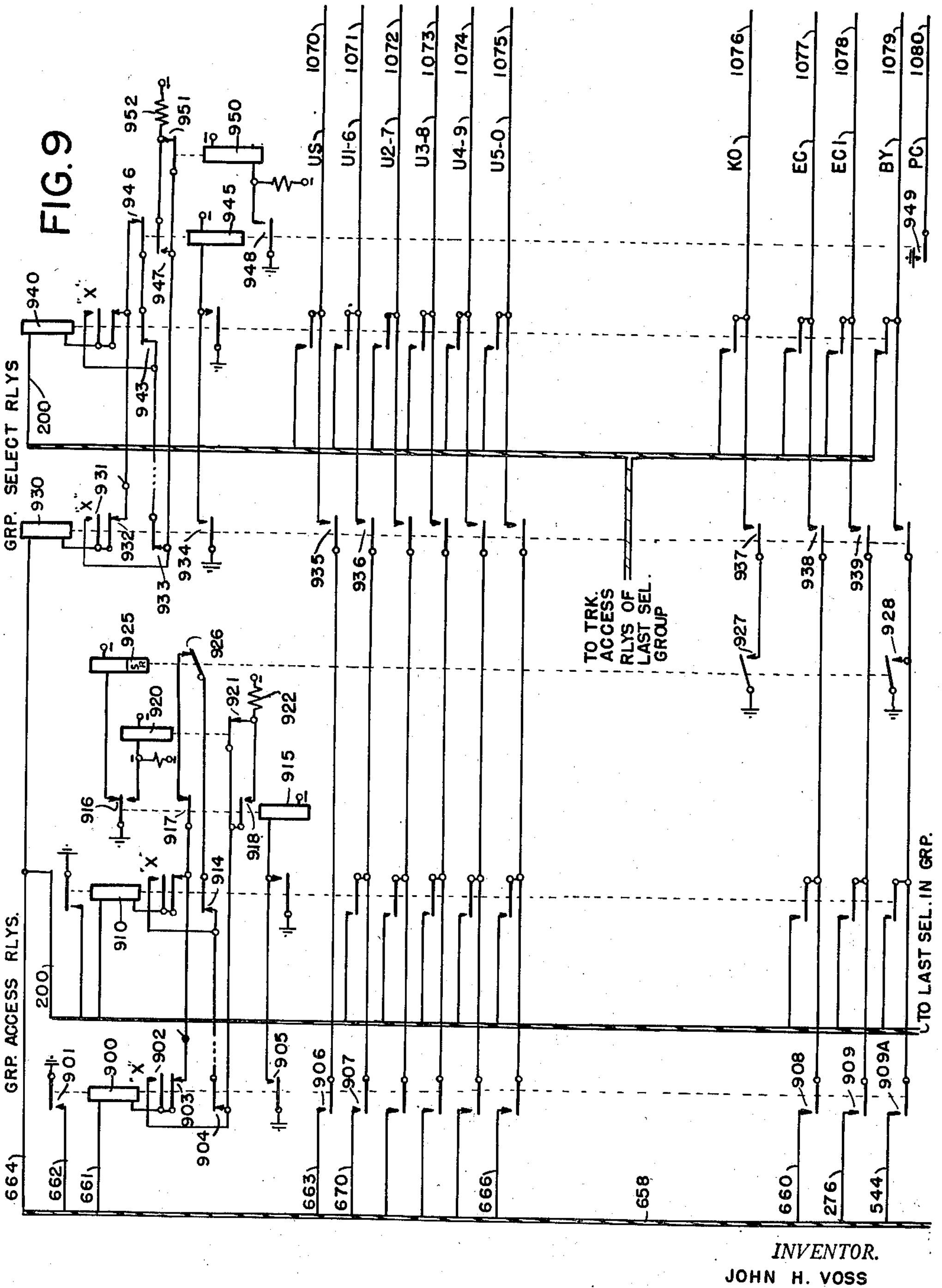
Figure 10:
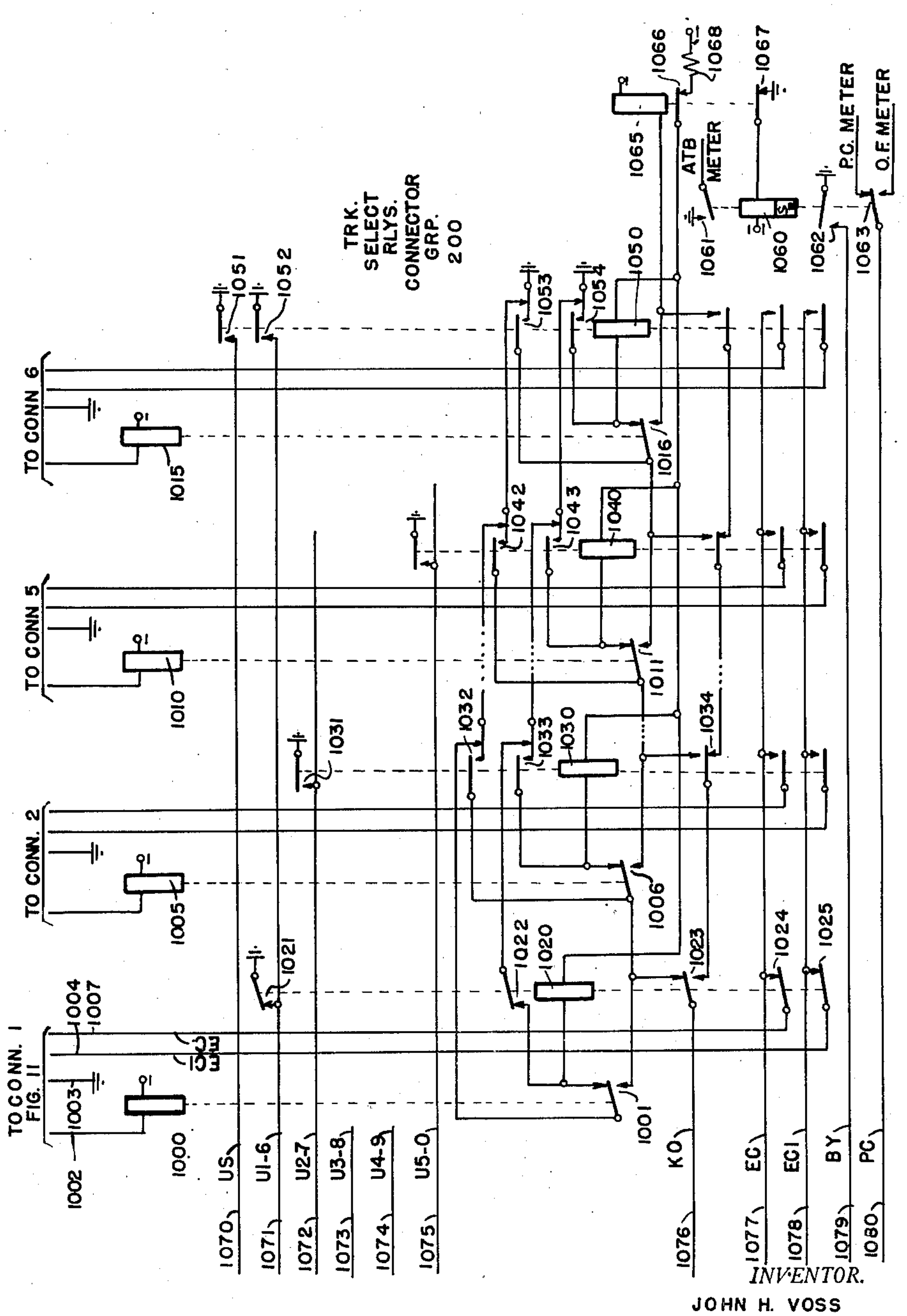

Figures 9 and 10 show the general arrangement of the common trunk selecting equipment associated with the selectors.

Figure 11:
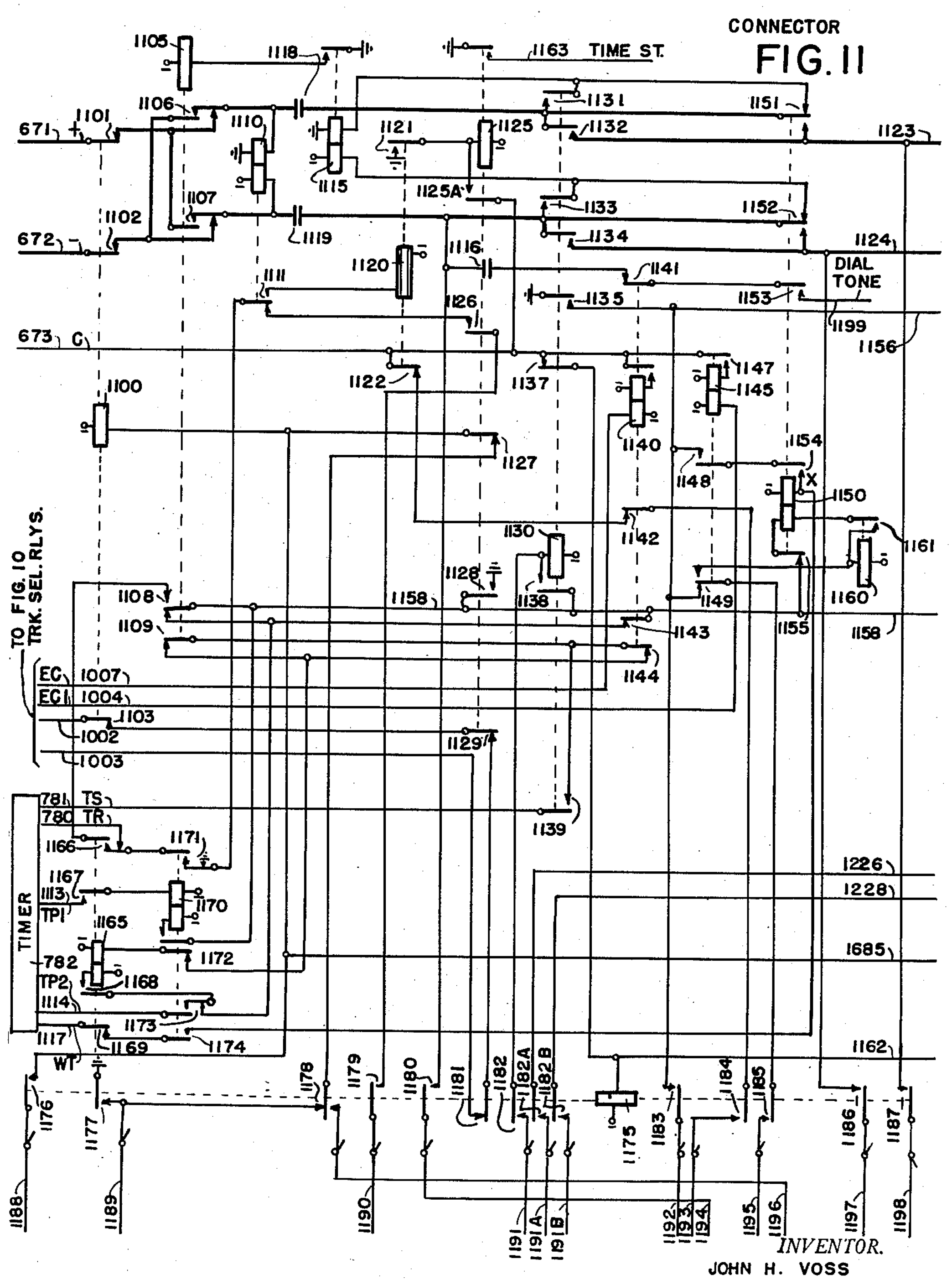
Figure 12:
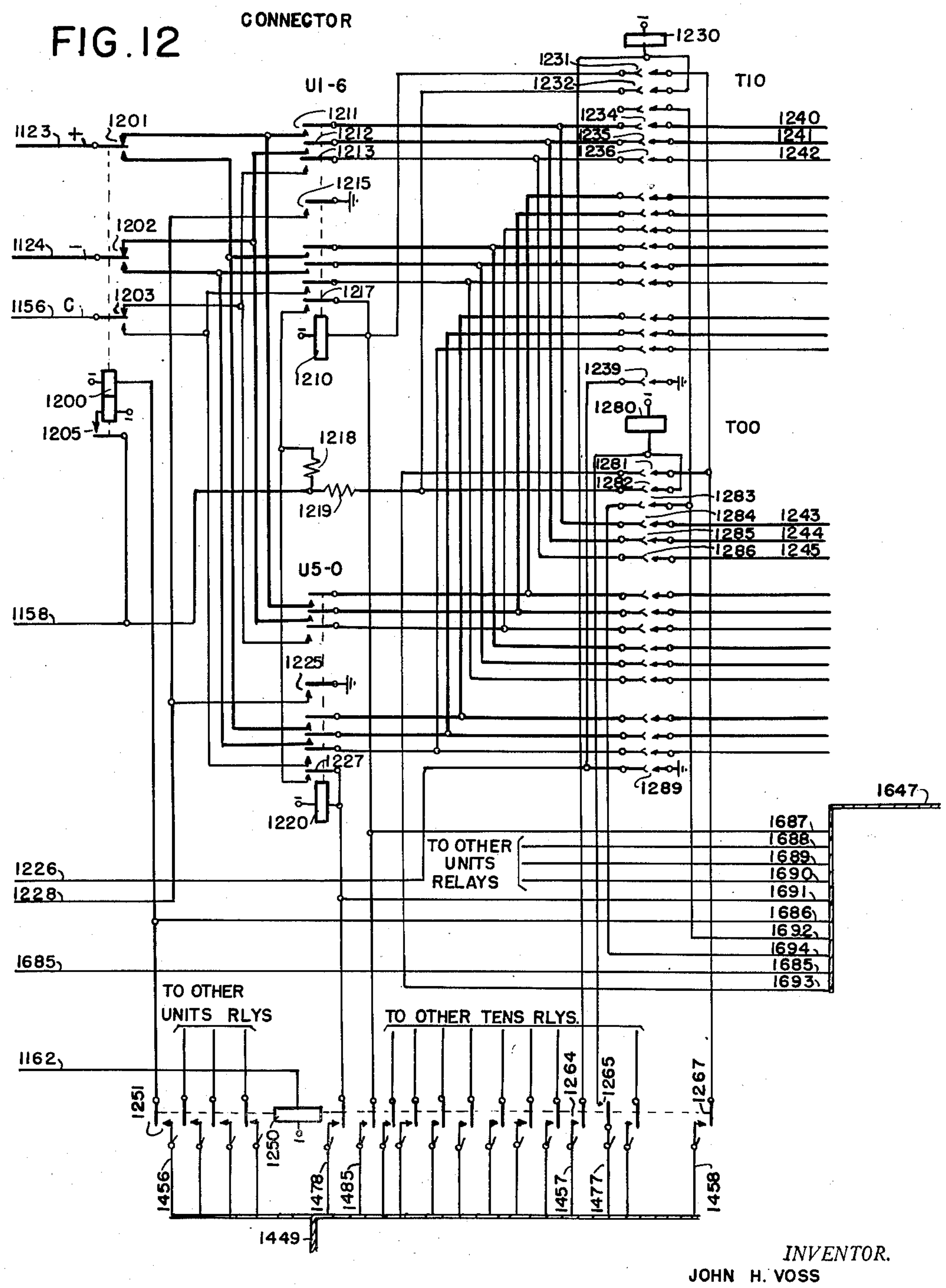
Figure 13:
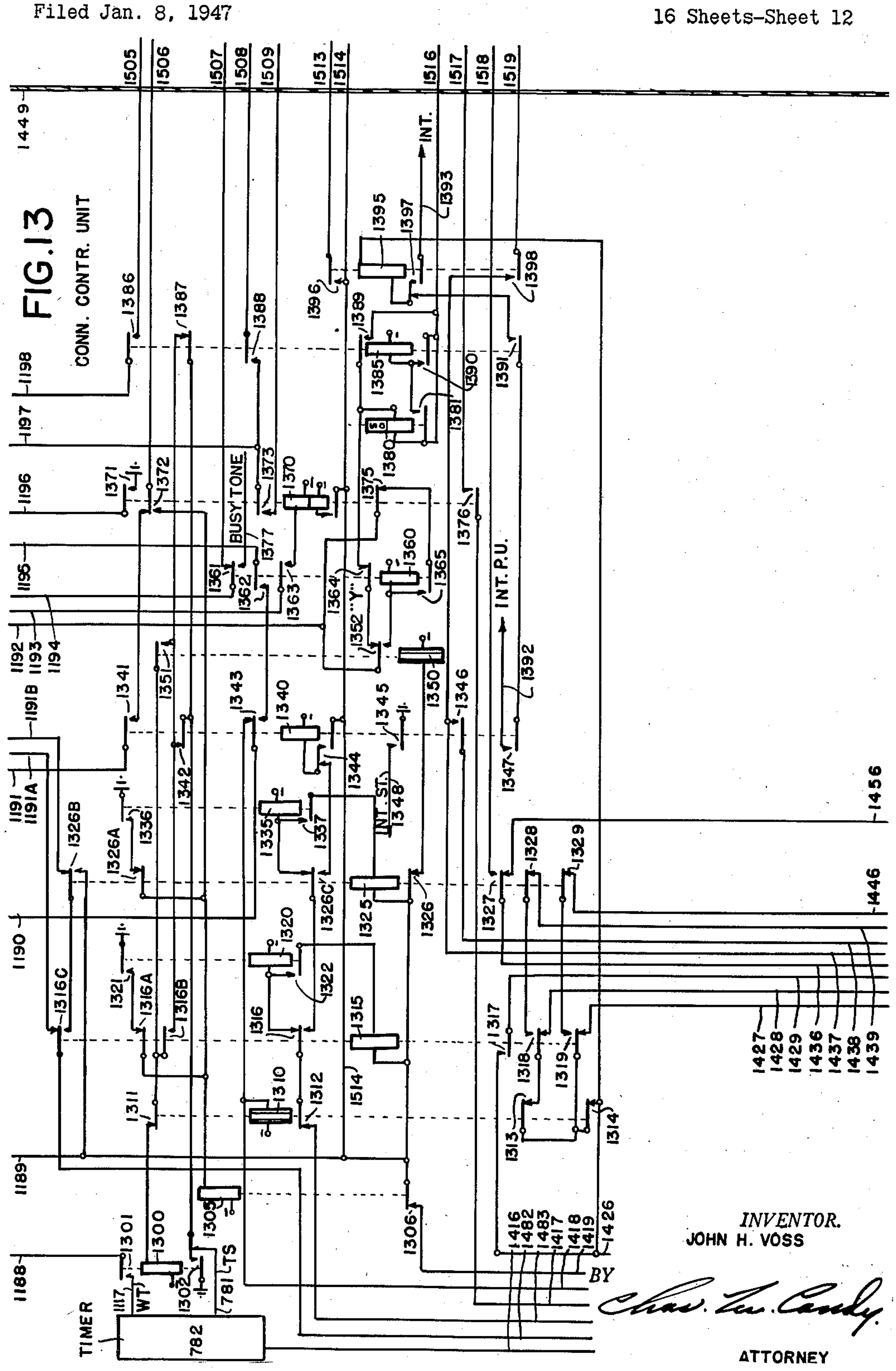
Figure 14:
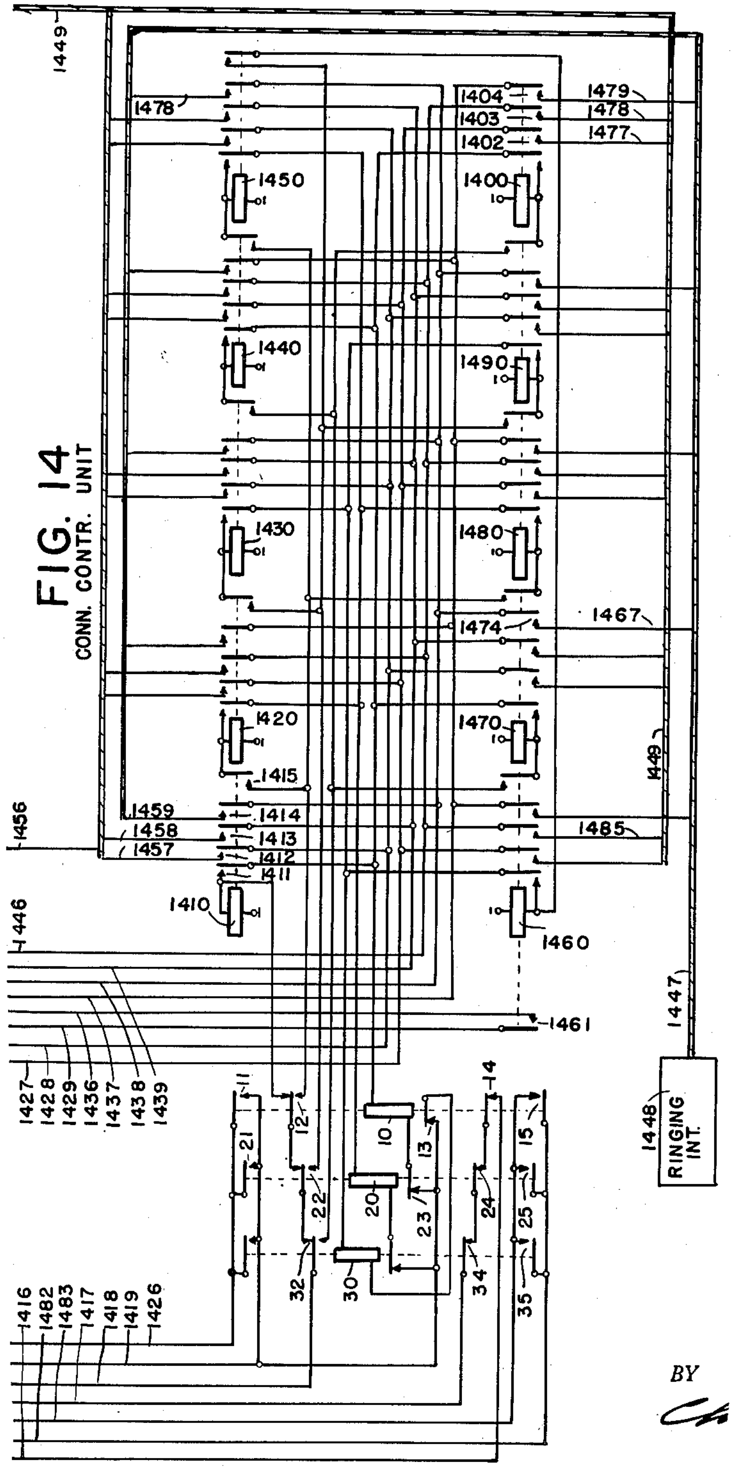
Figure 15:
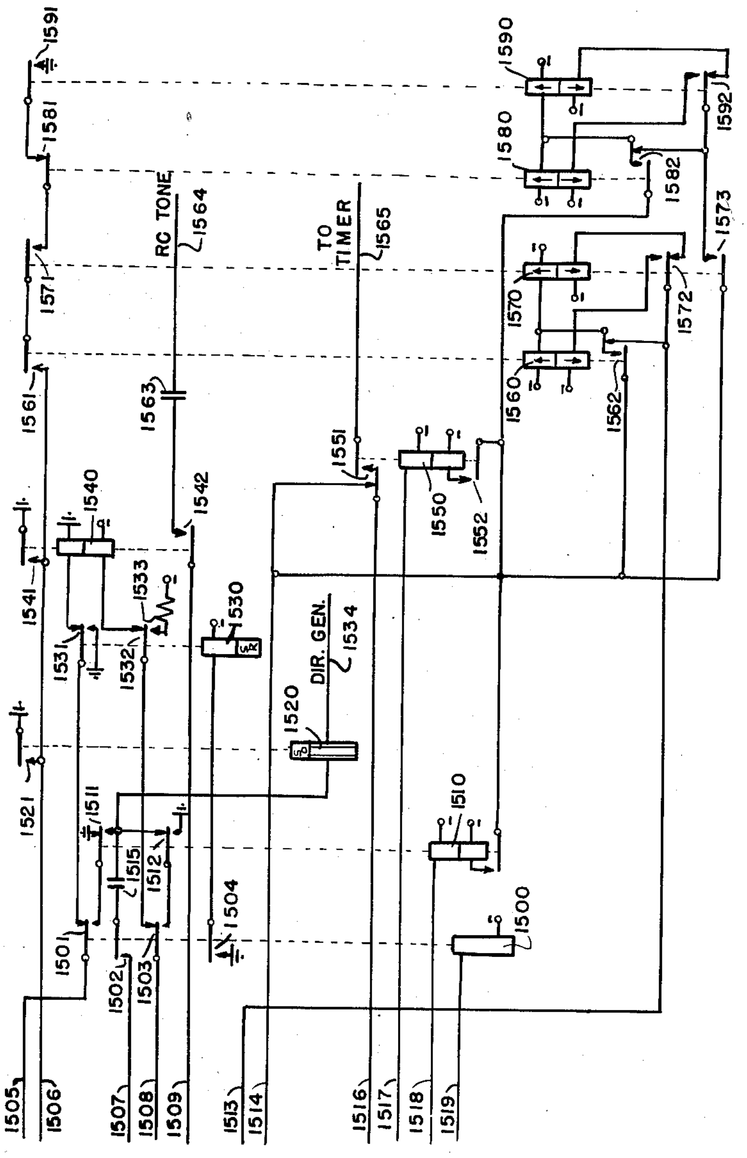

Figures 11 to 15 inclusive show one of the connectors of the system and the common control equipment associated therewith, Figures 11 and 12 being the connector and Figures 13, 14 and 15 the common control unit.

Figure 16 shows a common group of P. B. X trunk selecting relays associated with the connectors, while Figure 17 presents in somewhat more detail than the previously mentioned drawings, the manner in which a plurality of control units may be connected to a plurality of selectors.

To describe the equipment comprising the various figures of the drawing in more detail, Figure 1 shows two three-relay line circuits, consisting of the line relays 120 and 150, cutoff relays 110 and 140, and lockout relays 100 and 130 respectively. The upper line circuit may be considered as being connected to a trunk repeater such as the rectangle 171, with a multiple to the corresponding terminals on the tens relays of the selectors, while the lower line circuit may be considered as being connected to a subscriber's station such as indicated by the circle 170, with a multiple to the corresponding terminals of the tens relays in the connectors. There is nothing new or novel in these circuits.

Figure 2 shows one of the linefinders associated with the stated line circuits. This linefinder is also similar to others used previously with only minor circuit changes, and is shown in skeleton form with only seven relays. Relays 200 and 210 represent the "tens" or "group" relays, of which a full complement would be ten for each finder, each relay having line contacts for ten lines. Relays 220 and 230 represent two of the five "units" relays required, each units relay providing access to two line circuits through the contacts of each group relay. Relay 240 is the "units switching" or "sub-group" relay which serves to divide each group of ten lines into a "high" and a "low" sub-group, namely 1 to 5 and 6 to 0, and to select one of the two lines selected by any operated tens and units relays. Relays 250 and 260 are the "connect" relays, which operate upon the initiation of a call to connect the finder control and allotter equipment momentarily to this finder-selector link.

Figure 3 shows a portion of the finder control relays, including the tens and units marking relays, ten of each of these being required. Relays 300 and 310 represent two of the "tens marking" relays, which are operated from the line equipment, and serve to turn to operate the tens relays of the finders. Relays 320 to 350 inclusive represent four of the "units marking" relays, which also operate from the line equipment, through make contacts on the tens marking relays, and serve to control the units relays of the finders. Relay 360 is one of the miscellaneous control relays. It is operated from the connect relays in the finder and serves to prepare the release of the marking relays.

Figure 4, comprising relays 400 to 470 inclusive shows the balance of the finder control unit. Relays 400 and 410 represent two "service restriction marking" relays having to do with calls to and from trunks. They are operated from the tens marking relays of Figure 3, and their marking contacts, which are grounded from the units marking relays of Figure 3, are cross connected as required to operate corresponding service restriction relays in the selector contol units to mark certain calls as trunk calls, and to prevent certain subscribers from making trunk calls which other subscribers may be privileged to make. Relays 420, 425, 435 and 440 are "call passing" relays, which function whenever a calling line is not cut through promptly, to disengage the seized link and pass the call to the next idle link. Relay 430 is an "all-trunks-busy" relay which releases when all links are busy to operate a meter; relay 445 is a "reset" relay which operates on the seizure of the last link to reset the allotter; and relay 450 is an "overflow" relay which operates upon the initiation of a call with all links busy to operate an overflow meter, and to give a busy tone in case the call is from a trunk. Relays 460 and 470 represent the "allotter" relays, which preselect the next idle link to be used for a call from any line or trunk in the associated hundreds group. These relays, one of which is required for each link, are normally energized, and release in turn as the corresponding links are taken into use. When the last link is taken into use, the reset relay acts to reoperate all allotter relays whose associated links are idle, to again preselect the first idle link.

Figure 5 shows three of the selector miscellaneous relays, relay 500 being the "switching" relay, which operates from the selector "units" relays to switch a call through. Relay 510 is a "busy" relay, which may operate from either the comon control equipment or the trunk selecting equipment to give a busy tone to the calling line, and relay 520 is one of the "connect" relays, which operate from the finder to connect the link momentarily to an idle control unit. Two "connect" relays are required in each selector for each control unit associated therewith, the companion relay to relay 520 being relay 650 in Figure 6. A second pair of connect relays is represented by the rectangle 508 in Figure 5. For details of the interconnections of these relays, see Figure 17.

In Figure 6, the other half of the selector, relay 600 is the "units switching" relay corresponding to relay 240 in the finder, and is operated from the trunk selecting equipment. Relays 610 and 620 are "units" relays, also operated from the trunk selecting equipment, such as shown in Figures 9 and 10, and relays 630 and 680 are "tens" or group relays, operated from the counting relays in the control unit or units. Relay 650 is a "connect" relay, companion to the relay 520 as previously mentioned. It is operated directly from relay 520 and serves to connect the remainder of the control leads to the control unit upon the seizure of the selector. The line contacts of the various "tens" relays of the selector are connected to local connector trunks, or to outgoing or operator trunks as required. They may also be connected to other ranks of similarly arranged selectors, in case it is desired to apply the invention to larger exchanges.

Figure 7 shows the miscellaneous control relays for a selector control unit. For a small exchange, one such control unit might be sufficient. It is preferable, however, in all cases, to provide a plurality of such units, each associated with a vertical group of selectors comprising one or more selectors from each hundreds group of selectors, and in large exchanges, only one selector from any given hundreds group. Additional control units may be added for each vertical group of selectors as required, the control units of each group being preselected for use in rotation by a relay type allotter associated therewith. One such allotter is represented in Figure 7 by the relays 700, 705 and 710, relays 700 and 705 being the "selecting" relays which operate in turn to preselect an idle control unit. One of these relays is of course required for each control unit in the group. Relay 710 is a "pull-up" relay which operates the select relays one at a time in rotation, as the control units are taken into use. Relay 715 is a "release timing" relay which operates from the exchange timer to force the release of the switch train if dialing does not follow seizure within a given time; relay 720 is a "pulsing" relay which responds to the first digit dialled over the line; relays 725 and 740 are "release" relays which operate from the pulsing relay to hold the switch train; and relay 730 is a "transfer" relay, which operates from release relay 740 to prepare the pulsing circuit, and releases at the end of the first digit to open this circuit. Relays 750 and 760 are discriminating or service restriction relays which operate as previously mentioned from corresponding relays in the finder control equipment to identify trunk calls, and to prevent certain subscribers from making trunk calls.

In Figure 8 are shown the "counting" relays of the control unit partly shown in Figure 7. These counting relays operate from the pulsing relay 720 in response to the first digit, and serve in turn to operate the tens relays of the selectors in accordance with the digit dialled. These counting relays, together with relays 715 to 760 inclusive in Figure 7, constitute a first common control unit, a second similar and associated control unit being indicated by the rectangle 784 in Figure 7.

In Figure 9, relays 900 to 925 may be considered as the group access relays, and relays 930 to 950 as the group select relays. One "group access" relay such as 900 or 910 is required per selector group, for each selector in the group. These relays operate when seized by the associated selector and connect the units marking leads from the selector through to the associated group select relays. Relays 915 and 920 are "lockout" relays which operate momentarily when any access relay is operated, to open the circuit of the other access relays, while relay 925 is a normally energized "kickoff" relay, which restores to give the busy signal and preselect the next idle trunk in case an extended call is not cut through promptly.

Similarly, one "group select" relay such as 930 or 940 is required per selector group, for each "hundreds" trunk group. These relays operate from the tens relays of the selectors and extend the units marking leads from the operated "group access" relay through to the proper group of trunk select relays, such as those of Figure 10. Relay 945 and 950 are "lockout" relays like 915 and 920, which operate momentarily while any group select relay is operated, to open the circuit of the other group select relays.

Figure 10 represents a group of trunk select relays equipped to handle six trunks, relays being shown however, for trunks 1, 2, 5 and 6 only. In this circuit, a "trunk busy" relay such as 1000, 1005, 1010 or 1015 is required for each trunk in the group. Each trunk busy relay is normally operated through a series of break contacts in the associated connector or repeater as the case may be, and releases whenever the said connector or repeater is seized by a call. Likewise, a "trunk select" relay, such as 1020, 1030, 1040 or 1050 is required for each trunk. These relays operate one at a time in rotation under the control of the trunk busy relays, to preselect the next idle trunk. As each select relay operates, it releases the preceding select relay, and prepares an operate circuit to the proper selector "units" relay or relays. Relay 1060 is a meter relay for the control of traffic meters such as peg count, all-trunks-busy and overflow meters, where required, and relay 1065 is a reset relay, which operates on the seizure of the last trunk to reset the select relay chain. These trunk groups of course can be readily expanded, contracted, or rearranged in almost any manner, and the trunks do not have to start with the first terminal in the group, nor do they have to be assigned to consecutive terminals in the group.

Figure 11 shows the miscellaneous relays of the connector. Relay 1100 is a "forced release" relay, which is operated from the common control equipment on a reverting call, to disconnect the connector line relay. It also operates from the P. B. X trunk-selecting relays on a call to a P. B. X having all its trunks engaged. It also serves to force the release of the connector when dialing is delayed too long, and to momentarily busy the idle connectors associated with a given control unit while said control unit is in use. Relay 1105 is a "battery reversing" relay operated from the "back bridge" relay 1115 when a call is answered, to reverse the battery feed to the calling line for supervisory or metering purposes as required. Relay 1110 is a "line" relay controlled over the calling line; relay 1120 is a release relay controlled from the line relay; relay 1125 is a "hold" relay controlled from the release relay to hold the preceding switches; and relay 1130 is a "switching" relay operated from the control unit when a call is answered, to switch the call through to the called line. Relay 1140 is a "trunk call" relay which operates on all calls from trunks, to cut off the conversation timing. It is controlled from the service restriction relay 750 of Figure 7. Relay 1145 is a "toll trunk call" relay, which is operated from the finder on calls from a toll operator to permit verification service. Relays 1150 and 1160 are the "verification" relays, which may be operated by the toll operator, upon dialing an extra digit, in order to cut in on a busy line. These relays are controlled over a special pulsing lead from the control unit. Relays 1165 and 1170, at the lower left, are "conversation timing" relays, and relay 1175 is one of the "connect" relays, which operate upon the seizure of the connector to connect the control leads thereof to the control unit.

In Figure 12, which shows the other half of the connector, relay 1200 is the "units switching" relay, relays 1210 and 1220 are two of the "units" relays, and relays 1230 and 1280 are two of the "tens" relays. The "units" and "units switching" relays may be operated from the counting relays of the control unit, or from a group of P. B. X trunk-selecting relays, such as shown in Figure 16, while the "tens" relays are operated directly from the counting relays of the control unit. Relay 1250 is another connect relay also operated upon the seizure of the connector, to connect the rest of the control leads to the control unit. As many connect relays may be employed as required, and they may be connected in multiple as shown, or in tandem, as indicated for the selector circuit.

In Figure 13, are shown a portion of the miscellaneous control relays of the common control unit. In the embodiment of the invention illustrated, only one control unit is indicated for a given group of connectors. The connectors associated with any given control unit should preferably be taken however, from different hundreds groups, so that failure of a control unit will not affect an entire hundreds group of connectors.

Relay 1300, in Figure 13, is a "release timing" relay, which is controlled from the exchange timer to prevent the control unit being held by a call beyond a certain time. Relay 1305 is a "counting chain release" relay, which operates after each digit to release the counting relays of Figure 14. Relay 1310 is a "dialing transfer" relay, which operates at the start of each digit received from the connector line relay, and releases at the end of each digit, to close the operating circuits through the contacts of the counting relays. Relays 1315 to 1340 inclusive are "digit transfer" relays, which operate successively in pairs after each digit to prepare the proper ones of the operating circuits though the counting relay contacts. Relay 1350 is a "permanent timing" relay, which operates upon seizure of the control unit to connect the release timing relay to the timer. Relay 1360 is a "busy" relay which operates over the connector CN lead to give busy tone to the calling line if the called line is found busy, and relay 1370 is a "reverting call' relay which operates from the connector C lead on a reverting call, to cause the partial release of the connector when the calling party hangs up. Relay 1380 is an "idle test" relay which operates over the connector CN lead if the called line is idle, while relay 1385 is a switching relay which operates from the idle test relay to prepare an operating circuit for the "ring pickup" relay 1395, which then operates from the ringing interrupter to start the ringing.

In Figure 14 are shown the counting relays of the connector control unit. These relays operate from the connector line relay, and serve in turn to operate the connector tens and units relays and to select the proper ringing code, in accordance with the digits dialled into said connector.

Figure 15 shows the balance of the miscellaneous control relays of the connector control unit. Relay 1500 of this figure is a "coding" relay, which operates from the ringing interrupter, by way of the counting relays to ring the called line; relay 1510 is a "ring reversing" relay, which is also controlled from the counting relays to determine the side of the line to be rung; relay 1520 is a "ring cutoff" relay, which operates over the called line to stop the ringing, when the called party answers; and relay 1530 is a "drain" relay which operates from the "coding" relay to remove the condenser charge from the called line. Relay 1540 is an additional "back-bridge" relay which operates over the called line if the called party answers during a silent period, to cut off the ring, and to switch the call through. Relay 1550 is a "reverting call release timing" relay which operates from the timer on a reverting call, to force the release of the connector and the control unit after the called party has answered. Relays 1560 to 1590 inclusive are "ring limiting" relays which operate from the ring pickup relay to free the common equipment after three ringing cycles.

In the P. B. X trunk-selecting relays of Figure 16, relays 1600 to 1630 are group access relays, relays 1640 and 1650 are group select relays, and relays 1660 to 1680 are trunk select relays. One "group access" relay such as 1600 or 1610 is required per connector group, for each connector in the group. These relays operate when seized by the associated connector, and cut the units marking leads from the connector through to the associated group select relays. Relays 1620 and 1625 are "lockout" relays which open the operate circuits of the other "group access" relays momentarily when any access relay in the group operates, and relay 1630 is a "release forcing" relay, which falls away if an extended call is not switched through promptly, and releases the switch train.

Similarly, one "group select" relay such as 1640 or 1650 is required per connector group, for each P. B. X trunk group. These relays operate from the tens relays of the connectors and extend the units marking leads from the operated group access relay through to the proper group of trunk select relays.

Relays 1660 to 1680 inclusive represent a group of "trunk select" relays adequate for handling five trunks, one such relay being required for each trunk. They are normal when the associated trunks are idle, and operate one at a time as the corresponding trunks become engaged. The function of each of these relays is to prepare an operate circuit to the corresponding connector units relay, which circuit is completed upon the dialing of the P. B. X call number to select an idle trunk. Trunk rotation is not provided, and the first idle trunk is chosen in all cases. If more than five trunks are included in the group, the units switching relay of the connector will be operated, as well as the proper units relay, for calls directed to any trunk beyond the fifth. The break contacts of the last trunk select relay are strapped so that when all trunks are busy, all further calls will be directed to the last trunk, in order to operate the busy circuits.

Figure 17 shows in schematic form, two selectors of a group, and two common control units associated therewith, in order to show the manner in which the control circuits are multipled between the connect relays, the selectors, and the control units. The two selectors are represented by the dotted rectangles 1780 and 1785, and the two control units by the small rectangles directly below, numbered 1790 and 1795. In selector 1780, the relays 500 and 510 are the "switching" and "busy" relays of Figure 5, and relays 520 and 650 are the "connect" relays of Figures 5 and 6, serving the first common control unit 1790. Relays 1700 and 1710 in this selector, are similar connect relays serving the second common control unit 1795.

In the second selector 1785, relays 1720 and 1730 are again the "switching" and "busy" relays, relays 1740 and 1750 are the "connect" relays serving the first common control unit and relays 1760 and 1770 are the "connect" relays serving the second common control unit. The other selectors of the group would be connected in an identical manner, it being understood that each pair of control leads such as 1715 and 1716, shown passing through make contacts on each connect relay of Figure 17, represent all of the multipled control leads shown in connection with relays 520 and 650 of Figures 5 and 6 not otherwise indicated in Figure 17. To provide an additional control unit for the same group of selectors, would require, in addition to the extra control unit, another pair of "connect" relays in each selector, and an additional select relay such as 705, in the control unit allotter, inserted between the relay 705 and the reset relay 710.

The general description of the apparatus and its functions having been completed, a detailed description of the operation of the circuits will now be given, in order to provide a complete understanding of the invention.

*Subscriber to subscriber call*

Let it be assumed that the subscriber station represented by the circle 170 in Figure 1 shown connected to line terminals "06" in the finder of Figure 2, wishes to call another subscriber station having the call number 2111. Four-digit numbers are employed in this system for all subscriber numbers and P. B. X numbers, the first digit being the hundreds digit, the second the tens digit, the third the units digit, and the fourth the ringing-code-selecting digit.

When then, the subscriber at the said subscriber station 170 removes his receiver or handset, a circuit is immediately closed through the subscriber's telephone for the operation of the line relay 150 in the subscriber's line circuit, from ground through the upper winding of the line relay, break contacts 141, line conductor 163 left, the subscriber's telephone instrument, line conductor 164, break contacts 142, and the lower winding of line relay 150 to negative battery.

Line relay 150 upon operating, at make contacts 151 grounds the CN lead to make this line busy at the connector tens relays, and at make contacts 152 and 153 grounds the marking conductors 168 and 169 leading to Figure 3. The "00" tens marking relay 310 thereupon operates from ground from make contacts 152, through break contacts 131, conductor 169, winding of relay 310, break contacts 313, 361, 315 and 304, through break contacts of the other tens marking relays in series, and through the resistor 370 to negative battery.

The tens marking relay 310 operates over this circuit, and at its make first contacts 314 locks itself up to negative battery through the resistor 370. Relay 310 also, at break contacts 313 opens its own operate circuit, and at break contacts 315 disconnects the operate battery from the other tens marking relays momentarily in order to prevent the operating of any other of these relays at this time. Finally, relay 310, at make contacts 311 grounds conductor 374 to operate the service restriction relay 410, and at make contacts 316 completes a circuit to the sixth units marking relay 340. This circuit is from ground at make contacts 153 of the subscriber's line relay, break contacts 132, conductor 168, make contacts 316, winding of relay 340, break contacts 347, break contacts 362, series break contacts such as contacts 345 on all of the units marking relays, and the resistance 384 to negative battery.

The service restriction relay 410 upon operating at make contacts 411 prepares a circuit for the T00 tens relay 210 in the finder. Relay 410, at make contacts 412 to 415 prepares a toll trunk marking circuit, which will, however, be ineffective at this time, as only the first four line terminals of this tens group are assigned to toll trunks. In the case of tens groups containing neither restricted lines nor toll trunks, the tens marking conductors, would be connected straight through to the tens marking leads of the finder, so that the associated finder tens relays would be operated direct, through the contacts of the finder connect relays.

The units marking relay 340 upon operating, at make contacts 346 locks to negative battery at resistor 384, at break contacts 347 opens its own original operating circuit, and at break contacts 345 disconnects negative battery from the operate circuit of the other units marking relays. This also opens the circuit of the normally operated "blocked call" relay 425 momentarily. Relay 425 is made slow to release however, through the use of a copper slug on the core, and remains operated. Relay 340 also, at make contacts 341 grounds the marking conductor 371 to prepare the operation of the 1—6 units relay 220 in the finder; at make contacts 342 grounds conductor 372 to prepare the operation of the units switching relay 240 in the finder; at make contacts 343 grounds conductor 377 to open springs on the service restriction relays of Figure 4; and at make contacts 344 completes a finder start circuit for the operation of the finder connect relays 250 and 260. This circuit is from ground at make contacts 344, conductor 380, through break contacts 461 on the first allotter relay which is shown normal, through corresponding break contacts on the other allotter relays which are also assumed to be normal, make contacts 471 of the last allotter relay which is shown energized, start conductor 488, and the windings of relays 250 and 260 in parallel to negative battery. Relays 250 and 260 operate over this circuit.

Finder connect relay 250 upon operating connects up the finder tens relays, and at make contacts 251 completes a circuit for the operation of the tens relay 210, which extends from ground at make contacts 411 and conductor 482, through make contacts 251 and the winding of relay 210 to negative battery. Relay 250 also, at make contacts 253 connects ground to conductor 379 and thence to relay 360 which operates, and at break contacts 361 and 362 opens a further point in the negative battery side of the operate circuit of the tens and units marking relays, in order to prevent a new call from interfering with the proper release of these relays. Relay 360 also at make contacts 363 completes a circuit to a peg count meter, if such be employed, from ground at break contacts 452 by way of conductor 383.

Finder connect relay 260 upon operating connects up the finder units relays, and at make contacts 263 completes a circuit for the operation of the 1—6 units relay 220. This circuit is from ground at make contacts 341 of the sixth units marking relay, over conductor 371, through make contacts 263 and the winding of relay 220 to negative battery. Relay 260 also at make contacts 264 causes the operation of the finder units switching relay 240 from ground at make contacts 342, over conductor 372, make contacts 264 and the winding of relay 240 to negative battery. Finally relay 260, at make contacts 266 and 267 extends the service restriction leads to the selector but without effect, as these leads are not energized; at make contacts 268 places a holding shunt across the allotter relay 470 to prevent the premature release of this relay; and at make contacts 265 connects ground to the connect relays of the associated selector.

Control unit #1 being idle at this time, connect relay 520 thereupon operates over the following circuit; ground from make contacts 265, start conductor 274, left winding of relay 520, conductor 548, make contacts 704 of the operated selecting relay 700, and resistance 705 to negative battery. Relay 520 upon operating, at make contacts 531 closes an obvious circuit to connect relay 650 over conductor 545, and this relay also operates. The two relays 520 and 650 thereupon connect the selector control leads through to the first control unit. Relay 520 also, at make contacts 524 prepares a locking circuit for itself; at break contacts 523 prepares the release of the associated link allotter relay 470 now held at make contacts 268; and at make contacts 521 and 522 closes a circuit to the pulsing relay 720. This circuit may be traced as follows: ground at break contacts 731, upper winding of relay 720, conductor 546, make contacts 521, break contacts 501, the positive talking conductor 270, make contacts 241 on the operated units switching relay, make contacts 224 on the operated units relay, make contacts 215 on the operated tens relay, positive line conductor 163, the subscriber's telephone, the negative line conductor 164, make contacts 216, 225 and 242, negative talking conductor 271, break contacts 502 and 512, make contacts 522, conductor 547, and the lower winding of relay 720 to negative battery.

The pulsing relay 720 thereupon operates and at make contacts 721 closes an obvious circuit to release relay 725 which also operates. Relay 725 at make contacts 726 closes a locking circuit for connect relay 520 by way of conductor 549, and at make contacts 727 closes the following circuit to the cutoff and lockout relays of the subscriber's line circuit, which also operate: ground at make contacts 727, conductor 550, make contacts 525, conductor 272 left, make contacts 243, 226 and 217, the C conductor 165, and the windings of relays 140 and 130 in series to negative battery. Relay 725 also, at make contacts 728 closes a temporary locking circuit to the tens and units relays of the finder, by way of conductor 551, make contacts 526, conductor 273 left, contacts 227 and 218, and the winding of the operated tens and units relays to negative battery. Finally, relay 725 at make contacts 729 closes an obvious circuit to release relay 740, which operates.

Release relay 740 upon operating, at make contacts 741 connects ground to the tone and timer start lead 785 to start this equipment; at make contacts 742 closes a point in the pulsing circuit to the counting relays of Figure 8; and at make contacts 743 connects the release timing relay 715 to the timer, represented by the rectangle 782. Relay 740 also, at break contacts 744 opens the circuit of the control unit select relay 700 thereby causing the release of this relay, and at make contacts 744 closes a circuit to transfer relay 730 which operates. This circuit is from ground at make contacts 744, left on conductor 765, upper break contacts of the counting control relays 1, 2 and 3 of Figure 8, conductor 767, and the lower winding of relay 730 to negative battery.

Transfer relay 730 upon operating, at make contacts 731 connects dial tone and ground from conductor 786 to the calling line, by way of the upper winding of relay 720, conductor 546, make contacts 521, break contacts 501, talking conductor 270, through the finder and the calling line and back through the finder, talking conductor 271, break contacts 502 and 512, make contacts 522, conductor 547, and the lower winding of relay 720 to negative battery. Relay 730 also, at make contacts 732 closes a further point in the pulsing circuit to the counting relays, and at make contacts 734 prepares a special locking circuit for counting relay 810.

When select relay 700 in the control unit allotter releases, due to the operation of relay 740, make contacts 704 open and remove negative battery from the left winding of connect relay 520. Relay 520 remains locked however to the ground on conductor 549. At break contacts 704, relay 700 causes the operation of the pull up relay 710, from negative battery through resistor 705, break contacts 709 and the winding of relay 710 to positive battery. Relay 710, which is made slow to operate by the use of a copper slug on the armature end of the core, operates after a slight delay which insures the full release of relay 700, and at make contacts 711 causes select relay 705 to operate and preselect the second control unit indicated by the rectangle 784, provided this unit is idle at this time. The circuit for relay 705 is from negative battery through resistor 712, make contacts 711, break contacts 706, and the relay 705, which has ground connected to one side of its winding whenever the second control unit is idle, from contacts therein corresponding to break contacts 744 of the first control unit.

Select relay 705 upon operating, at make contacts 707 locks to its own negative battery through resistor 708, and at break contacts 706 disconnects the operate battery. Relay 705 also, at break contacts 709 opens the circuit of relay 710 thereby permitting the release of this relay, and at make contacts 709 connects the negative battery from break contacts 704 to conductor 785 and thence to another connect relay in Figure 5 corresponding to relay 520 and indicated in the rectangle 508. When control unit #2 is taken into use in turn, relay 705 will release and re-operate relay 710, and if the first control unit is again idle, select relay 700 will re-operate from make contacts 711, and again drop relay 710. If the first control unit is still busy however, relay 710 will remain operated, and will re-operate the select relay associated with the first unit to become free. If both control units should become free at the same time, both select relays may operate, and in this case, the first control unit will be taken for the next call. It is thus evident that a selector can be connected to only one control unit, on any given call. Figure 17 should also be referred to, in this connection.

Returning now to the subscriber's line circuit of Figure 1, the operation of the cutoff relay 140 disconnects the line relay 150 from the line, thereby causing the release of this relay. Relay 150 at break contacts 151 connects the test or C conductor 165 to the test normal or CN conductor to the connector, and thereby substitutes the ground from said conductor 165 for the busying ground at make contacts 151. Relay 150 also, at make contacts 152 and 153, opens the circuits of the operated tens and units marking relays of Figure 3, to cause the release of these relays. Lockout relay 130, at break contacts 131 and 132, further opens the circuits to the operated tens and units marking relays.

The tens and units marking relays 310 and 340 and the service restriction relay 410 now release and open the operate circuits to the tens and units relays in the finder, but these latter relays are now locked to conductor 273 and remain operated. The units marking relay 340 also, at make contacts 344 removes ground from conductor 380 and the connect relays 250 and 260, thereby causing the release of these relays, and the disconnection of the finder control unit from this finder. Relay 250 also, at make contacts 253, removes ground from conductor 379 and relay 360, whereupon this relay restores after a slight delay, and at break contacts 361 and 362 reestablishes the operate circuits of the tens and units marking relays, in readiness for the next call. Relay 260 also, at make contacts 265 removes ground from the pull up winding of connect relay 520 which however, remains locked to conductor 549. Finally, relay 260, at make contacts 266 and 267 opens the service restriction conductors 277 and 278, and at make contacts 268 opens the locking circuit of the allotter or link selecting relay 470, by removing the shunt from around the break contacts 523 which are open at this time, as previously stated.

The allotter relay 470 accordingly restores, and at break-make contacts 471 further opens the circuit to the finder connect relays 250 and 260, and prepares a circuit for the overflow relay 450. Relay 470 also, at make contacts 472 opens its "shunt-down" circuit, and at make before break contacts 473 further opens its locking circuit and prepares its pull up circuit. Finally relay 470 at break contacts 474 completes a circuit through series break contacts on the other allotter relays to the reset relay 445 which operates.

Reset relay 445 upon operating, at make contacts 446 connects ground to the pull up circuit of the allotter relays, and all allotter relays whose associated links are idle at this time will re-operate and lock to continue the pre-selection of idle links as indicated. In the case of allotter relay 460 for example and assuming the first link to be idle, this circuit would be from ground at make contacts 446, through back contacts 463, conductor 491, break contacts corresponding to 523, 515 and 506 in the selector of the said first link, conductor 492, and the winding of relay 460 to negative battery. Relay 460 at make contacts 461 and 462 prepares the connect and shunt-down circuits at make contacts 463 locks to its own ground, and at break contacts 464 opens the circuit to relay 445. This relay then restores and re-establishes the circuit of the slow-to-release relay 430 which it had broken temporarily, but without effect, since relay 430 will release only upon a prolonged interruption of its circuit.

Assuming however, that there are no idle links available in this group at the moment, the pull up circuits of all of the allotter relays will be open in the selectors, the allotter relays will therefore all remain de-energized, and the reset relay 445 will remain operated, and will hold open the circuit of the all trunks busy relay 430. Relay 430 will thereupon release, after the required delay, and at break contacts 431 will close a circuit to an all trunks busy meter.

If another call is initiated in this group at this time, with all links busy, ground on conductor 380 from make contacts corresponding to contacts 344 on the units marking relays will pass through break contacts 461 and 471 and similar contacts on the other allotter relays, and thence through the winding of the overflow relay 450 to negative battery. Relay 450 operates over this circuit and locks, by way of make contacts 447 and 454, and at make contacts 453 passes ground to an overflow meter, if employed, by way of make contacts 438. Relay 450 also, at break contacts 451 removes one of the multiple grounds from relay 425, but this is without effect at this time due to the alternate ground from make contacts 436. Relay 450 also at make contacts 452 starts the tone equipment, and at make contacts 455 connects busy tone to conductor 173. This is without effect however, unless the call is from a trunk, since conductor 173 is only connected to those line circuits associated with trunks. For subscribers, the absence of dial tone is considered an adequate indication of an all links busy condition.

The call passing relays 420, 425, 435 and 440 are caused to function, whenever, for any reason, a pre-selected link fails to find and seize the calling line and thereby operate the cutoff and lockout relays thereof. On a normal call, this occurs in a fraction of a second, so that the tens and units marking relays normally remain operated for only a very brief period, well within the release time of relay 425. The circuit of this normally operated relay, it will be remembered, is momentarily opened by the operation of any units marking relay. If however, the units marking relay fails to restore within the release time of relay 425, this latter relay will restore, and at make contacts 426 will open the circuit of the normally operated slow relay 435. Relay 435 will therefore also release, after a short delay. Relay 435 on releasing, at make contacts 436 removes one of the multiple grounds from the right side of relay 425, and at break contacts 437 closes a circuit to relay 440, from ground through break contacts 452 and 423.

Relay 440 operates over this circuit, opens its break contacts 441, and at make contacts 442 closes an obvious circuit to relay 420 which operates. Relay 420, at make contacts 421 prepares a "shunt-down" circuit for the allotter relays, at break contacts 423 opens the circuit of the slow to release relay 440, and at make contacts 422 connects negative battery from the tens marking relays to relay 425. Relay 425 thereupon re-operates over the following circuit: ground at break contacts 451, winding of relay 425, make contacts 422, conductor 381, and direct to resistor 370 and negative battery. Relay 425 causes the direct re-operation of relay 435, which causes the release of relay 440, which in turn causes the release of relay 420. Relays 440 and 420 are both made slow to release, by means of a copper sleeve on the core, and during the interval between the release of relay 440 and the consequent release of relay 420, a momentary shunting circuit is closed to the allotter relay which is handling the call. This circuit is from negative battery through the low resistance 493, make contacts 421, break contacts 441, make contacts on the stated allotter relay, make contacts corresponding to contacts 268 on the associated finder connect relay, and through the winding of the allotter relay to negative battery. This allotter relay is thereupon caused to release and free the link, and automatically passes the call to the next idle link. If another link is available, the only result of this as far as the calling party is concerned is an imperceptible delay in the return of dial tone.

If a subscriber attempts to make a call with all links busy, and no link is made available within the release time of relays 425 and 435, these relays will restore sequentially as previously explained for a blocked call. Relay 435, at make contacts 436 removes the other multiple ground from relay 425 to prevent its re-operation should the call be abandoned, and at break contacts 437 prepares the circuit of relay 440. Now when a link becomes free, the associated allotter relay will re-operate from the reset relay and open the operate circuits of both the reset relay 445 and the overflow relay 450. Relay 445 thereupon releases after a short delay, and opens the locking circuit of relay 450 which then also releases. Relay 450 thereupon opens the tone and meter circuits and reconnects ground to relay 425 to prepare its re-operation. Relay 450 also at break contacts 452 completes the circuit of relay 440 which operates and in turn operates relay 420. Relay 420, at make contacts 422, causes relay 425 to re-operate from the ground at contacts 451 to battery on conductor 381. Relay 425 pulls relay 435 as before to cause the sequential release of relays 440 and 420. This closes the shunt down circuits momentarily, but as the call will have been switched through already, this is without effect.

The calling subscriber, on hearing the dial tone, proceeds to dial the number of the called station, which was assumed to be 2111. The pulsing relay 720 in the selector control unit follows the impulses of the first digit, and at each pulse momentarily opens the circuit of release relay 725, and momentarily closes the pulsing circuit to the counting relays and to the upper winding of transfer relay 730. Both relays 725 and 730 are made slow to release, and therefore remain operated during the pulsing, but relay 730 will release at the end of the first digit.

Upon the first release of pulsing relay 720, break contacts 721 close an impulsing circuit to counting relay 810 as follows: ground at back contacts 716, break contacts 721, make contacts 742, make contacts 732, conductor 766, break contacts 6, 5 and 4 and the winding of relay 810 to negative battery. The upper winding of transfer relay 730 is energized in parallel with this circuit, as previously indicated, preparatory to the opening of the circuit to the pull up winding of this relay. Relay 810 operates over this circuit, prepares its own locking circuit at make contacts 811, and at make contacts 812 prepares the operate circuit of counting relay 820. Contacts 811 extend the operate ground for relay 810 to counting control relay 1 by way of make contacts 734, but relay 1 has ground also on the other side of its winding, from make contacts 744, and does nothing at this time.

Upon the re-operation of pulsing relay 720, at the end of the first impulse, the pulsing circuit is opened, at contacts 721. This removes the shunt from counting control relay 1, and this relay operates, in series with relay 810 over the following circuit: ground at make contacts 744, conductor 765, break contacts 8, winding of relay 1, conductor 769, make contacts 734, make contacts 811, and the winding of relay 810 to negative battery. Relay 1, at its upper break contacts opens the circuit to the lower winding of transfer relay 730, which is not affected thereby, and at break-make contacts 4 disconnects the now open pulsing circuit from the operate circuit of counting relay 810 and connects it to the operate circuit of counting relay 820, by way of make contacts 812. The opening of break contacts 7 is without effect at this time.

On the second release of pulsing relay 720, at the start of the second impulse, back contacts 721 again close the pulsing circuit to relay 730 and conductor 766. From pulsing conductor 766 ground from this circuit passes through break contacts 6 and 5, make contacts 4 and 812, and the winding of relay 820 to negative battery. Relay 820 operates, and at make contacts 821 prepares its own locking circuit and connects shunting ground to counting control relay 2. Relay 820 also, at make contacts 822 prepares a circuit to the proper tens relay in the selector, and at make contacts 823 prepares a circuit to the trunk selecting equipment of Figure 9.

Upon the re-operation of pulsing relay 720 at the end of the second impulse, the pulsing circuit is again opened, and the counting control relay 2 operates in series with counting relay 820 from the locking ground at make contacts 744 by way of the locking conductor 765, break contacts 9, winding of relay 2, make contacts 821, and the winding of relay 820 to negative battery. Relay 2 upon operating, at its upper break contacts opens another point in the operate circuit of transfer relay 730, preparatory to the release of relay 1. Relay 2 also at break-make contacts 5 further opens the operate circuit of counting relay 820 and prepares the operate circuit of the next counting relay 820. Finally relay 2 at break contacts 8 opens the locking circuit of relays 1 and 810 and both of these relays release.

Pulsing relay 720 now remains operated, thereby holding release relay 725. Transfer relay 730, however, now has the circuit to its upper winding open at break contacts 721, and the circuit to its lower winding open at the upper break contacts of relay 2, and this relay therefore releases after a slight delay. Relay 730, at make-before-break contacts 731 disconnects dial tone and re-connects direct ground to the upper winding of relay 720, at make contacts 732 further opens the pulsing circuit, and at make contacts 734 further opens the locking circuit of the first counting relay 810. Finally relay 730, at break contacts 733, connects ground to the selector operate conductor 768. This causes the operation of the selector tens relay 630 over the following circuit: ground at make contacts 744, break contacts 733, conductor 768, make contacts 822, conductor 771, make contacts 652, and the winding of relay 630 to negative battery. A branch of this same circuit also causes the operation of group access relay 900, by way of make contacts 823, conductor 777, make contacts 657, conductor 661, cable 658, winding of relay 900, break contacts 903, 917 and 926, series break contacts corresponding to contacts 914 and 904 on all the group access relays, break contacts 921, and resistor 922 to negative battery.

Tens relay 630 upon operating, prepares the connections to the trunks leading to the 200 group of connectors, and at make contacts 631 closes a locking circuit for itself. This locking circuit is from ground at make contacts 728, over conductor 551, through make contacts 526, conductor 273 right, conductor 697, resistor 699, make contacts 631, and the winding of relay 630 to negative battery. Relay 630 also, at make contacts 632, connects conductor 662 to conductor 664, to prepare the operation of group select relay 930.

Group access relay 900 upon operating, closes preliminary make contacts 902 and thereby locks itself direct to negative battery through break contacts 921 and resistor 922. Relay 900 also extends the units marking leads from the selector through to the springs of the group select relays, and at break contacts 903 opens its own pull up circuit. Relay 900 also at break contacts 904 removes negative battery from the pull up circuit of all of the group access relays momentarily to prevent their operation at this time, and at make contacts 905 closes an obvious circuit for lockout relay 915 which operates. Relay 915, at make contacts 918 puts a shunt around break contacts 921; at break contacts 917 opens another point in the pull up circuit to the group access relays; at make contacts 916 closes the circuit of lockout relay 920 which operates and opens break contacts 921; and at break contacts 916 relay 915 opens the circuit of the slow to release kickoff relay 925, which however, remains operated under normal conditions, due to the speed with which trunks are selected. Finally, group access relay 900, at make contacts 901 closes a circuit to group select relay 930 which may be traced as follows: ground at make contacts 901, conductor 662, cable 658, make contacts 632, conductor 664, cable 658 again, winding of relay 930, break contacts 932 and 946, break contacts 943 and 933 and similar break contacts on the intervening group select relays, break contacts 951, and resistor 952 to negative battery.

Group select relay 930 operates over this circuit, and at preliminary make contacts 931 locks itself to negative battery through break contacts 951 and resistor 952. Relay 930 also, at break contacts 932 opens its own pull up circuit, at break contacts 933 removes negative battery from the pull up circuit of the other group select relays, and at make contacts 934 closes a circuit to lockout relay 945. Relay 945 upon operating, at break contacts 946 opens another point in the pull up circuit of the group select relays, at make contacts 947 places a shunt around break contacts 951 preparatory to the opening of these contacts, at make contacts 949 closes a meter circuit, and at make contacts 948 closes a circuit for lockout relay 950. Relay 950 thereupon operates and opens its break contacts 951, but without effect at the moment, as these springs are now shunted by make contacts 947. Group select relay 930 also extends the units marking leads through to the trunk select relays of Figure 10, and at make contacts 936, assuming all trunks of the group to be idle, completes a circuit to the selector 1—5 units relay 610. This circuit may be traced as follows: ground at make contacts 1021 of the first trunk select relay, conductor 1071, make contacts 936 and 907, conductor 670, cable 658, conductor 670 again in the selector, and the winding of relay 610 to negative battery.

Units relay 610 operates over this circuit, and at make contacts 618 closes a locking circuit for itself similar to that previously described for the tens relay 630. This locking circuit for the units relay is from ground at make contacts 728, conductor 551, make contacts 526, conductor 273 right, conductor 697, resistor 698, make contacts 618, and the winding of relay 610 to negative battery. Relay 610 also at make contacts 617, extends this same ground to the switching relay 500, by way of conductor 543 and break contacts 503, to cause the operation of this relay. Finally, relay 610 extends the selector talking and test conductors 541, 542 and 272 through to the connector of Figures 11 and 12 by way of break contacts 601, 602 and 603, make contacts 611, 612 and 613, make contacts 633, 634 and 635, and the trunk conductors 671, 672 and 673. Ground on the test conductor 272, from make springs 727, thereupon causes the operation of connect relays 1175 and 1250 in the selected idle connector over test conductor 673, break contacts 1137, and the winding of relays 1175 and 1250 in parallel to negative battery.

Connect relays 1175 and 1250 upon operating, connect the control leads of the connector through to the connector control unit of Figures 13, 14 and 15. Relay 1175 also, at break contacts 1181 opens the circuit of the trunk busy relay 1000 which is normally held operated over conductors 1002 and 1003, and relay 1000 thereupon releases. Relay 1175 also, at make contacts 1177 connects ground to conductor 1189 which is multipled to all of the connectors associated with this control unit. The forced release relays 1100 of all of the idle connectors in the group are thereupon operated by way of contacts corresponding to break contacts 1178 and 1127 in each connector, and busy said idle connectors momentarily, by opening their contacts 1103, and thereby releasing the associated trunk busy relay in the associated trunk select relays. The relay 1100 in the connector under discussion is not affected by this ground, due to the open break contacts 1178 on this connector. Similarly, the relays 1100 in connectors already busy are not affected, due to break contacts 1127 being open in such connectors. This ground from contacts 1177 on conductor 1189 also passes into the control unit to provide a locking ground for the counting relays. A branch of this circuit also passes through break contacts 1326 to operate permanent timing relay 1350, and the latter relay, at make contacts 1351 connects the timer to the release timing relay 1300, and at make contacts 1352 prepares a circuit for the busy relay 1360.

The selector switching relay 500, upon operating, at break contacts 506 opens another point in the circuit of allotter relay 670 preparatory to the release of connect relay 520; at make contacts 505 connects an additional ground to the hold conductor, preparatory to the release of the control unit; at make contacts 504 locks to test conductor 272, now grounded from the selector control unit; and at the break last contacts 503 removes the shunt from resistor 507 to insert this resistor in the pull up circuit of relay 500, thereby in effect disabling this circuit. Relay 500 also, at break contacts 501 and 502 opens the circuit of the pulsing relay 720, which restores to free the control unit. Finally, relay 500 at make contacts 501 and 502 extends the calling line through to the connector line relay 1110 which operates. The complete operating loop for this relay may be traced as follows: ground through the upper winding of relay 1110, break contacts 1106 and 1101, positive conductor 671, make contacts 633 and 611, break contacts 601, positive talking conductor 541, make contacts 501, conductor 541, make contacts 501, conductor 270, make contacts 241, 224 and 215 in the finder, positive line conductor 163, through the calling telephone and back over the negative line conductor 164, make contacts 216, 225 and 242 in the finder, conductor 271, make contacts 502, negative talking conductor 542, break contacts 602, make contacts 612 and 634, negative conductor 672, break contacts 1102 and 1107, and the lower winding of relay 1110 to negative battery.

Connector line relay 1110 upon operating, at make contacts 1111 closes a circuit to release relay 1120 from ground at back contacts 1171. Relay 1120 operates and at break contacts 1122 disconnects the test conductor 673 from the connector control unit. Relay 1120 also, at make contacts 1121 closes a direct circuit to the hold relay 1125. Relay 1125 operates, at its uppermost make contacts grounds the tone and timer start conductor 1163, and at its make contacts 1125A connects its own operating ground to the test conductor 673 to hold the finder and selector after the release of the selector control unit, which is now in process. Relay 1125 also, at make contacts 1126 prepares the pulsing circuit to the counting relays in the connector control unit, at break contacts 1127 opens another point in the circuit of relay 1100, at make contacts 1128 grounds the locking conductor 1158, and at break contacts 1129 opens another point in the circuit of the trunk busy relay 1000, preparatory to the release of the connect relay 1175 and the connector control unit.

Meanwhile, as stated in the second last paragraph preceding, pulsing relay 720 in the selector control unit #1 has released, due to the operation of switching relay 500 in the selector. Relay 720 thereupon opens its make contacts 721 and hence the circuit of release relay 725. Release relay 725 therefore also releases after a slight delay sufficient to permit the connector to send back ground to the test conductor 272. Relay 725 at make contacts 727 removes ground from the test conductor 272, now grounded by the connector hold relay 1125; at make contacts 728 removes ground from the hold conductor 273, now grounded from make contacts 505 in the selector; at make contacts 726 opens the locking circuit of connect relay 520 which restores and releases connect relay 650; and at make contacts 729 opens the circuit of release relay 740.

Release relay 740 upon restoring at make contacts 741 opens the tone and timer start circuit, now energized from the connector; at make contacts 742 opens an additional point in the pulsing circuit already open at contacts 732; at make contacts 743 opens the timing circuit to relay 715; at back contacts 744 prepares a circuit for the re-operation of select relay 700; and at make contacts 744 removes ground from the operating conductor 768 and the locking conductor 765. Removal of ground from conductor 765 causes the release of relays 2 and 820, and the control unit #1 is now again normal, and ready to receive another call, as soon as relay 700 reoperates, which it will do as soon as select relay 705 restores. Should control unit #2 be idle and relay 705 normal at the time relay 740 restores, relays 700 and 705 will both operate from make springs 711, and again pre-select control unit #1, since negative battery from break-make springs 704 would be on conductor 548, but not on conductor 785.

The removal of ground from the selector operate conductor 768 at make contacts 744, opens the operate circuits of tens relay 630 and the group access relay 900, which are opened further, immediately thereafter by the release of relays 820 and 650 and the opening of their contacts 822 and 652, and 823 and 657. Tens relay 630 is not affected, being locked locally in the selector, but the group access relay 900 promptly restores. Relay 900 opens the units marking leads, and at make contacts 905 opens the circuit of lockout relay 915 which restores, releases relay 920, re-energizes kickoff relay 925 to hold the latter operated, and re-connects pull-up negative battery to the other group access relays. This latter circuit is completed however, only on the release of relay 920, in order to prevent premature re-seizure of these relays. Finally relay 900, at make contacts 901 opens the circuit to group select relay 930, which restores.

Group select relay 930, upon restoring, further opens the units marking leads, and at make contacts 934 opens the circuit of lockout relay 945 which also restores. Lockout relay 950 then restores, and at break contacts 951, re-connects battery through resistor 952 to the pull up circuit of the group select relays, by way of break contacts 933—943, and 946.

Trunk busy relay 1000, which also releases as previously mentioned, upon the seizure of the connector, at make contacts 1001 opens the operate circuit of the operated trunk select relay 1020. This relay however remains locked over the following circuit: ground through back contacts 1054, back contacts 1043 and 1033 and similar contacts on the intervening select relays, make contacts 1022, winding of relay 1020, break contacts 1066, and resistor 1068 to negative battery. Trunk busy relay 1000 also, at break contacts 1001 completes an operate circuit for select relay 1030. This circuit is through back contacts 1053, back contacts 1042 and 1032 and similar back contacts on the intervening select relays, break contacts 1001, make contacts 1006, and the winding of relay 1030 to negative battery at break springs 1066.

Trunk select relay 1030 therefore operates and at make contacts 1031 grounds the open 2—7 units marking conductor 1072 to prepare the seizure of the second trunk for the next call. Relay 1030 also at make before break springs 1032 closes a second operate circuit for itself and opens the original circuit through break contacts 1001. Relay 1030 also, at make-before-break contacts 1033, completes a locking circuit for itself, and opens the locking circuit of select relay 1020. Relay 1020 thereupon releases, and at make contacts 1021 removes ground from the open 1—6 units marking conductor 1071. Relay 1020 also, at make contacts 1022 further opens its locking circuit, at break-make contacts 1023 extends the reset or kickoff circuit to the succeeding relays, and at make contacts 1024 and 1025 opens the service restriction leads to the first connector.

The next call routed to this group of connectors by the dialing of a first digit "2" will therefore cause the operation of the selector 2—7 units relay, not shown, from the ground at make contacts 1031 on the marking conductor 1072, in order to select the second trunk. On the seizure of the second connector, trunk busy relay 1005 will release, causing the operation of the next select relay, and the release of select relay 1030. Succeeding calls will continue to operate the select relays in succession in like manner until the fifth call, when select relay 1050 will operate, and release select relay 1040. On the sixth call to this group therefore, ground from make contacts 1052 will again operate the 1—6 units relay over conductor 1071, while the ground at make contacts 1051 will operate the units switching relay 600. This latter circuit is by way of marking conductor 1070, make contacts 935 and 906, conductor 663, cable 658, conductor 663 in the selector, and the lower winding of relay 600 to negative battery. Relay 600 upon operating will lock and reverse its break-make contacts to cut the call through to the sixth connector of the group, via make contacts 601, 602 and 603, make contacts 614, 615 and 616 and make contacts 639, 640 and 641.

Trunk busy relay 1015 will restore upon the seizure of the last connector and at make contacts 1016 will open the operate circuit of select relay 1050 which however remains locked to make contacts 1054. At break contacts 1016 relay 1015 also closes a circuit to reset relay 1065 from ground at make contacts 1053. Reset relay 1065 upon operating, at break contacts 1066 disconnects negative battery from select relay 1050 causing the release of this relay. Ground through back contacts 1053 will now pass through the chain contacts of the other relays to re-operate the first select relay if the first connector is idle at this time, or if it is not idle, to the select relay corresponding to the first idle connector. If no connectors are idle at the moment, relay 1065 remains operated, and will, in due course, cause the release of metering relay 1060, which is made slow to release. Relay 1060 at break contacts 1061 closes a circuit to an all-trunks-busy meter if employed, and at break contacts 1062 and 1063 prepares the busy circuit and an overflow meter circuit. If still another call arrives while all connectors are thus busy, these latter circuits become effective to operate an overflow meter if used, and also the busy relay 510 in the selector of the link being used for the call. The operation of the busy circuits will be explained in more detail in another section.

When the calling subscriber dials the second digit "1," the connector line relay 1110 restores and re-operates once. On the release of relay 1110, break-make contacts 1111 open the circuit of release relay 1120 momentarily, and at the same time close the pulsing circuit to the counting relays of the connector control unit. Relay 1120, being slow to release remains operated, and counting relay 1410 operates in parallel with transfer relay 1310, over the following circuit: ground at back contacts 1171, break contacts 1111, make contacts 1126, contacts 1179 on the connect relay, conductor 1190, break contacts 1343, winding of relay 1310 to battery, conductor 1418, break contacts 32, 22 and 12, and the winding of relay 1410 to negative battery.

Transfer relay 1310 upon operating at break contacts 1311 opens the circuit of the release timing relay 1300, at break contacts 1312 opens the circuit to the tens digit transfer relay 1320, and at break contacts 1313 and 1314 opens the connector operate circuits to the springs of the counting relays. Counting relay 1410, at make springs 1411 extends its own operating ground to counting control relay 10, thereby shunting this relay, which now has ground also on the other side of its winding from make contacts 1177, by way of conductors 1189 and 1419. Relay 1410 also at make contacts 1412, prepares a circuit to the connector tens relay 1230, and at make contacts 1415 prepares the operate circuit of the second counting relay.

Upon the re-operation of line relay 1110 at the end of the pulse, make contacts 1111 re-close the circuit to release relay 1120 thereby holding this relay, while break contacts 1111 open the pulsing circuit. The opening of the pulsing circuit opens the operate circuit to counting relay 1410. This removes the shunt from counting control relay 10, and this relay operates, and locks in series with relay 1410 over the following circuit: ground at make contacts 1177, conductor 1189, break contacts 1306, conductor 1419, break contacts 23, winding of relay 10, make contacts 1411 and the winding of relay 1410 to negative battery. Relay 10 at make contacts 11 grounds the connector operate conductor 1426, at break-make contacts 12 transfers the pulsing circuit to the second counting relay, at break contacts 13 opens the circuit of relay 30 now normal, at break contacts 14 opens the circuit of the reverting call release timing relay 1550 now also normal, and at make contacts 15 prepares a circuit for digit transfer relay 1320.

Transfer relay 1310 now releases, after a short delay, at break contacts 1311 re-connects relay 1300 to the timer and at break contacts 1313 and 1314 connects ground from conductor 1426 to conductors 1427 and 1428 and thus to the springs of the counting relays. The ground on conductor 1427 encounters only open contacts, but the ground on conductor 1428 passes through make contacts on the first counting relay and causes the operation of the connector tens relay 1230, over the following circuit: ground at make contacts 1177, conductor 1189, break contacts 1306, conductor 1419, make contacts 11, conductor 1426, break contacts 1314, 1313 and 1318, conductor 1428, make contacts 1412, conductor 1457, cable 1449, conductor 1457 in the connector, make contacts 1264, and the winding of relay 1230 to negative battery.

Tens relay 1230, upon operating over this circuit, extends the associated subscriber lines through to the springs of the units relays, preparatory to the selection of one of these lines by the next digit. Relay 1230 also, at make contacts 1231 prepares a circuit for the operation of the 1—6 units relay 1210, in case the next digit is a "1," and at make contacts 1232 completes a locking circuit for itself from ground at make contacts 1128 on the hold relay, via conductor 1158, resistor 1219, make contacts 1232, and the winding of relay 1230 to negative battery. Relay 1230 also, at make contacts 1239 closes a circuit for the operation of the tens digit transfer relay 1320. This circuit is from ground at make contacts 1239, conductor 1226, make contacts 1182A, conductor 1191A, break contacts 1316C, conductor 1482, make contacts 15, conductor 1483, break contacts 1312 and 1316, and the winding of relay 1320 to negative battery.

Tens digit transfer relay 1320 upon operating, at make contacts 1322 prepares the operation of tens digit transfer relay 1315, which now has ground on both sides of its winding, from make contacts 1322 and from make contacts 1177 and conductor 1189. Relay 1320 also, at make contacts 1321 closes a circuit through break contacts 1316A to the counting chain release relay 1305 which operates.

The counting chain release relay 1305 upon operating, at break contacts 1306 removes locking ground from conductor 1419, thereby causing the release of the counting chain, and opening the operate circuit of the connector tends relay 1230. The release of relay 10 and the opening of make contacts 15 also removes ground from the operate circuit of relay 1320. This removes the shunt from the tens digit transfer relay 1315, which thereupon operates and locks in series with relay 1320, from ground on conductor 1189, through the winding of relay 1315, make contacts 1322 and the winding of relay 1320 to battery.

Tens digit transfer relay 1315 upon operating, at break contacts 1316A opens the circuit of the counting chain release relay 1305 which restores. Relay 1315 also at make contacts 1316B closes an alternative timing circuit to relay 1300 preparatory to the release of relay 1350 which occurs at the end of the next digit. Relay 1315 also, at break make contacts 1316C, switches conductor 1482 from conductor 1191A to conductor 1191B to prepare the units digit transfer circuits. Relay 1315 also, at break-make contacts 1316, switches the now open conductor 1483 to the units digit transfer relay 1335 to prepare the operation of this relay. Relay 1315 also, at break-make contacts 1318 and 1319 opens the circuits to the tends springs of the counting relays, and prepares circuits to the units springs of these relays. Make contacts 1317 also close, to prepare a circuit for the units switching and ring reversing relays in case either of the final digits is above "5."

When the calling subscriber dials the third digit of the call number "2111," the connector line relay 1110 again restores and re-operates once, to again operate transfer relay 1310 and counting relay 1410. On the re-operation of the line relay, counting control relay 10 again operates, and locks as before in series with relay 1410, while transfer relay 1310 restores, after the usual slight delay.

Transfer relay 1310 upon releasing, at break contacts 1311 again connects relay 1300 to the timer, and at break contacts 1312 further prepares the circuit of relay 1335. Relay 1310 also, at break contacts 1313 and 1314 connects ground to conductors 1439 and 1446 and thence to the springs of the counting relays. This circuit is from ground at make contacts 1177, via conductor 1189, break contacts 1306, conductor 1419, make contacts 11, conductor 1426, break contacts 1314 and 1313, make contacts 1318 and 1319, and break contacts 1328 and 1329, to said conductors 1439 and 1446. The ground on conductor 1446 encounters only open contacts at the counting relays, but the ground on conductor 1439 passes through make contacts on the first counting relay to cause the operation of the 1—6 units relay 1210 in the connector, over the following circuit: make contacts 1413, conductor 1458, cable 1449, conductor 1458 in the connector, make contacts 1267, make contacts 1231, and the winding of relay 1210 to negative battery.

The connector 1—6 units relay 1210, upon operating over this circuit, at make contacts 1217 locks to "hold" relay ground from make contacts 1128 via conductor 1158 and resistor 1218, and at the same time extends the connector talking and test conductors through to the called line, by way of back contacts 1201, 1202 and 1203, make contacts 1211, 1212 and 1213, and make contacts 1234, 1235 and 1236. Relay 1210 also at make contacts 1215 completes a circuit for the operation of the units digit transfer relay 1335. This circuit is from ground at make contacts 1215, over conductor 1228, through make contacts 1182B, conductor 1191B, break contacts 1326B, make contacts 1316C, conductor 1482, make contacts 15, conductor 1483, break contacts 1312, make contacts 1316, break contacts 1326C, and the winding of relay 1335 to negative battery.

Units digit transfer relay 1335 upon operating, at make contacts 1337 prepares the operation of units digit transfer relay 1325, which is now shunted by ground on both sides of its winding, from make contacts 1337 and conductor 1189. Relay 1335 also at make contacts 1336 closes a circuit through break contacts 1326A to the counting chain release relay 1305 which again operates.

The counting chain release relay 1305 upon operating, at break contacts 1306 again removes locking ground from conductor 1419, thereby releasing the counting chain and opening the operate circuit of the connector units relay 1210. The release of relay 10 opens contacts 15 and thereby removes ground from the operate circuit of relay 1335. This removes the shunt from relay 1325, and this relay thereupon operates and locks in series with relay 1335, from ground on conductor 1189, through the winding of relay 1325, make contacts 1337 and the winding of relay 1335 to negative battery.

Units digit transfer relay 1325 upon operating, at break contacts 1326A opens the circuit of the counting chain release relay 1305, which restores. Relay 1325 also, at break contacts 1326B disconnects the grounded conductor 1191B from conductor 1482, and at break-make contacts 1326C switches the now open conductor 1483 to the ringing digit transfer relay 1340 to prepare the operation of this relay. Relay 1325 also, at break-make contacts 1327 opens the "units switching" conductor 1456, and prepares a circuit for the ring reversing relay 1510, by way of conductor 1518. Finally relay 1325, at break contacts 1328 and 1329 opens the circuits to the units controlling springs of the counting relays, and at break contacts 1326 opens the circuit of relay 1350 which releases after a short interval, to prepare a circuit for the idle-test relay 1380.

If the called line is busy, at the time the connector units relay operates, ground on the test conductor of the called line will cause busy relay 1360 to operate and lock, before slow relay 1350 can release. This busy circuit is from ground on conductor 1242, through make contacts 1236 and 1213, break contacts 1203, conductor 1156, make contacts 1183, conductor 1192, make contacts 1352, and the winding of relay 1360 to negative battery. Relay 1360 upon operating, at make contacts 1365 locks to conductor 1192 through break contacts 1375, and at break contacts 1364 opens the circuit of the idle test relay 1380. Relay 1360 also at make contacts 1363, prepares a circuit for the reverting call relay 1370, and at make contacts 1362 prepares a circuit for the verification relay 1160 in the connector, but these circuits are not required on the present call. Finally relay 1360, at break contacts 1361 opens the ring-back circuit, and at make contacts 1361 connects busy tone to the calling line from conductor 1377, by way of said make contacts 1361, conductor 1194, make contacts 1180, and talking condenser 1119. The calling subscriber on hearing the busy tone, will then release the connection. If he fails to hang up, the release of the connector and control unit will be forced, after an interval, by the timer 782, in a manner to be explained in another section on call timing.

Assuming however, that the called line is idle, negative battery through the cutoff and lockout relays of the line equipment of this line will be on the test conductor, and therefore the busy relay will not operate. When relay 1350 releases however, test relay 1380 will operate in series with the cutoff and lockout relays over the following circuit; ground at make contacts 1177, conductors 1189 and 1514, back contacts 1551, conductor 1516, winding of relay 1380, break contacts 1364 and 1352, conductor 1192, make contacts 1183, test conductor 1156, break contacts 1203, make contacts 1213 and 1236, test conductor 1242 of the called line, and the windings of the cutoff and lockout relays to negative battery. The cutoff and lockout relays clear the called line of attachments by disconnecting the line relay, and test relay 1380, at make contacts 1381 passes its own operating ground to the switching relay 1385 which operates.

Switching relay 1385 upon operating, at make contacts 1386 and 1388 prepares a path for the ringing current; at break contacts 1387 opens a point in the timing circuit now closed through break contacts 1342; at make contacts 1390 locks to the ground on conductor 1516; and at make contacts 1389 connects direct ground from conductor 1516 to the test conductor, by way of break contacts 1364 and 1352. This ground shunts out test relay 1380 which restores. Finally relay 1335, at make contacts 1391, prepares a circuit for pickup relay 1395.

When the calling subscriber dials the fourth digit of the call number "2111," the connector line relay 1110 restores and re-operates once, as before, and again operates transfer relay 1310, and counting relay 1410. On the completion of the pulse, when the line relay re-operates and remains operated, counting control relay 10 again operates and locks, in series with relay 1410, and transfer relay 1310 after the usual slight delay, restores to normal. Transfer relay 1310, at break contacts 1311 again prepares the timing circuit, and at break contacts 1312 completes a circuit to the ringing digit transfer relay 1340, from ground at make contacts 1177, by way of conductor 1189, make contacts 1326B and 1316C, conductor 1482, make contacts 15, conductor 1483, break contacts 1312, make contacts 1316, make contacts 1326C, back contacts of the make-before-break springs 1344, and the winding of relay 1340 to negative battery. Break contacts 1313 and 1314 of relay 1310 also close as before, but are without effect at this time, due to the open contacts 1328 and 1329.

The ringing digit transfer relay 1340 upon operating, at make contacts 1341 prepares a circuit to the switching relay 1130 in the connector, and at break contacts 1342 opens the permanent timing circuit, break contacts 1387 being also open at this time, as previously stated. Relay 1340 also at break-make contacts 1343 opens the pulsing circuit to the counting relays and prepares a "cut-in-on-busy" or "verification" pulsing circuit for use by a toll operator, as will be described in another section. Relay 1340 also, at make contacts 1344 locks to ground on conductor 1514, at make contacts 1345 grounds the interrupter start lead 1348, at make contacts 1346 connects together the ring coding conductors 1437 and 1438, and at make contacts 1347 connects the pickup lead 1392 from the ringing interrupter to the ring pickup relay 1395.

The ringing interrupter, represented by the rectangle 1448 in the lower part of Figure 14, now starts, if not already in operation from another source. This interrupter, the general type of which is immaterial as far as the invention is concerned, proceeds therefore to connect ground pulses representing the different ringing codes to the various ring coding conductors comprising the cable 1447, and thence to the springs of the counting relays. The ringing interrupter also, at the start of each ringing cycle, connects a short pulse of negative battery to the ring pickup lead 1392 associated with make contacts 1347. The ringing interrupter further connects negative battery to the ring hold lead 1393 at the start of each ringing cycle or code, and removes it at the end of each cycle, and the pickup relay locks to this circuit. This arrangement prevents the mutilation of codes.

When therefore, the interrupter connects the negative pickup pulse to the pickup lead 1392, just before the start of the next code cycle following the operation of ringing digit transfer relay 1340, pickup relay 1395 operates over the following circuit: negative battery on conductor 1392, make contacts 1347 and 1391, back contacts 1397, winding of relay 1395, conductor 1426, make contacts 11, conductor 1419, break contacts 1386 and conductor 1189, to ground at make contacts 1177. Pickup relay 1395 upon operating, at make contacts 1396 extends ground from conductor 1514 to conductor 1513 and thence through back contacts 1562 to the upper winding of the ring limiting or ring counting relay 1560 which operates. This same ground is also impressed on both windings of ring limiting relay 1570, but as the windings of this relay are connected in opposition, relay 1570 remains unoperated. Pickup relay 1395 also, at make contacts 1397 locks to negative battery from the interrupter on conductor 1393, and at break contacts 1397 disconnects the pickup conductor. Finally, relay 1395, at make contacts 1398 connects the ring coding relay 1500 to the coding conductors 1437 and 1438 from the coding springs of the counting relays, all of said coding springs being open however at this time, except make springs 1414 on the first counting relay.

Ground pulses representative of the first ringing code now pass from the ringing interrupter 1448 to the coding relay 1500, from ground at the coding springs of the interrupter, cable 1447, coding conductor 1459, make contacts 1414, conductor 1438, make contacts 1346, make contacts 1398, conductor 1519, and the winding of relay 1500 to negative battery. For this first code, normally used for ringing on single party and P. B. X lines also, each code cycle consists merely in one long ring of about two seconds duration followed by a silent period of about three seconds. This is repeated intermittently until cut-off occurs, due to the called party answering, or otherwise. The other codes, which are used on calls to party lines, consist of various combinations of long and short rings for the different stations, and their selection depends on the value of the fourth digit of the call number.

The coding relay 1500 follows the code pulses, and on each energization connects ringing current to the called line over the following circuit: negative battery, the ringing generator, not shown, conductor 1534 in the center of Figure 15, winding of the ring cutoff relay 1520, break contacts 1512, make contacts 1503, conductor 1508, make contacts 1388, conductor 1197, make contacts 1186, negative talking conductor 1124, back contacts 1202, make contacts 1212 and 1235, negative line conductor 1241, ringing condenser and ringer of the called telephone and back over the positive line conductor 1240, make contacts 1234 and 1211, break contacts 1201, positive talking conductor 1123, make contacts 1187, conductor 1198, make contacts 1386, conductor 1505, make contacts 1501, and break contacts 1511 to ground. The bell at the called station rings in response to this current.

Ring coding relay 1500 also at make contacts 1502 completes a circuit for impressing ring-back tone on the calling line. A portion of the ringing current passes back over this circuit which is as follows: ringing generator, conductor 1534, ring cutoff relay 1520, low capacity condenser 1515, make contacts 1502, conductor 1507, break contacts 1361, conductor 1194, make contacts 1180, talking condenser 1119, break contacts 1107 and 1102, conductor 672, through the selector and finder by way of talking conductors 542 and 271 to the line conductor 164, through the calling telephone and back over the other line conductor 163, back through the finder and selector by way of talking conductors 270 and 541 to talking conductor 671, break contacts 1101 and 1106, and the upper winding of connector line relay 1110 to ground. The ringing current is thereby made audible in the receiver of the calling telephone as a low tone, to indicate that the called line is being signalled.

Coding relay 1500 also, at make contacts 1504 completes an obvious circuit for operating drain relay 1530. Relay 1530 will accordingly follow the pulsations of the coding relay, but due to being made slow to release, relay 1530 will remain operated for a short interval after each release of relay 1500. During this interval, at the beginning of each silent period, ground and negative battery from make contacts 1531 and 1532, are connected momentarily across the called line, by way of break contacts 1501 and 1503. This drains the condenser charge from the line caused by the ringing, and thereby prevents the building up of these charges and the premature operation of the ring cutoff relay, which might otherwise result.

On calls to party lines, the other low numbered ringing codes, up to the fifth inclusive, will also ring out over the negative line conductor in the foregoing manner. For the last five codes however, selected by a final digit six or more, the operation of the sixth counting relay will close a circuit "on the run" to the ring reversing relay 1510, which will operate and lock and reverse its contacts 1511 and 1512, to ring out over the positive side of the line. Assuming a ringing digit 7 for example, relays 1410 and 10 will operate on the first pulse, 1420 and 20 on the second pulse, 1430 and 30 on the third pulse, 1440 and 10 on the fourth pulse, and 1450 and 20 on the fifth pulse. At the start of the sixth pulse relay 1460 operates and closes make springs 1461 shown at the left of this relay. This completes a circuit for the operation of relay 1510 from ground at make contacts 1177, over conductor 1189, through break contacts 1306, conductor 1419, make contacts 21, conductor 1426, make contacts 1317, conductor 1429, make contacts 1461, conductor 1436, make contacts 1327, conductor 1518, and the upper winding of relay 1510 to negative battery. Relay 1510 thereupon operates, locks through its lower winding to ground on conductor 1514, and in an obvious manner reverses the generator and ground connections to the make contacts 1501 and 1503 on the coding relay 1500. (In the case of a high third digit, such as 6 to 0 inclusive, this same circuit will cause a similar operation, "on the run," of the units switching relay 1200, by way of break contacts 1327, conductor 1456, through cable 1449, make contacts 1251, and the upper winding of relay 1200, which operates and locks to select a high numbered line.) Relay 30 will operate in series with relay 1460 during the second half of the sixth pulse, in the normal manner, and on the seventh pulse relays 1470 and 10 will operate. After the end of the last pulse, transfer relay 1310 will release and start the ringing in the manner previously described. In this case, however, ground pulses representative of the seventh ringing code are impressed on the coding relay, from ground at the coding springs of the interrupter, through the cable 1447, conductor 1467, make contacts 1474, conductor 1438, make contacts 1346 and 1398, conductor 1519 and relay 1500 to battery. The called line will thus be rung with the seventh code, with generator current through relay 1520 now impressed on the positive line conductor 1240, instead of on the negative line conductor 1241 as previously.

In order to prevent the call from holding the control unit too long, in case the called party does not answer promptly, the circuit is arranged to cut off the ring and release the control unit after the third ringing cycle, by means of the ring limiting relays 1560 to 1590. As was already mentioned, relay 1560 was operated at the start of the first ringing cycle, when the pickup relay 1395 operated and closed its make contacts 1396 to ground conductor 1513. At the same time, ground on both windings of relay 1570, connected opposing, prevented the operation of this relay. At the end of the first ringing cycle, when the interrupter removes negative battery from conductor 1393 and hence from the locking contacts 1397, the pickup relay restores, and removes the ground from conductor 1513. This opens the circuit to the lower winding of relay 1570 which thereupon operates, being held energized in multiple with the upper winding of relay 1560, from ground on conductor 1514, through make contacts 1562. Relay 1570 at make contacts 1572 prepares the release of relay 1560 and at make contacts 1573 completes a circuit for relay 1580 which operates. This circuit is from ground on conductor 1514, through make contacts 1573, back contacts 1582, and the upper winding of relay 1580 to negative battery. This same ground also energizes both windings of relay 1590, the lower winding being energized through break contacts 1592. Relay 1590 remains unoperated however, since its windings are also connected in opposition. The ring limiting relays now operated are: 1560, 1570 and 1580.

At the start of the second ringing cycle, pickup relay 1395 again operates from the pickup pulse and locks as before to conductor 1393. At make contacts 1396 relay 1395 again connects ground from conductor 1514 to conductor 1513. This ground passes through make contacts 1572 and energizes the lower winding of relay 1560, which thereupon releases, due to both windings being energized in opposition. At its make-before-break contacts 1562, relay 1560 re-connects the upper windings of itself and relay 1570 to the ground on conductor 1513, and disconnects them from conductor 1514. The ring limiting relays now operated are: 1570, 1580.

At the end of the second ringing cycle, the removal of negative battery from conductor 1393 again unlocks pickup relay 1395 whose make contacts 1396 again remove ground from conductor 1513. This removes ground from both windings of relay 1560 at the same time, and this relay therefore remains normal. It also removes ground from the upper winding of relay 1570 and this relay releases. Relay 1570 at make contacts 1573 removes ground from the lower winding of relay 1590, and this relay operates from its upper winding, which is energized in multiple wtih the upper winding of relay 1580, from ground on conductor 1514, through make contacts 1582. The ring limiting relays now operated are: 1580, 1590.

At the start of the third ringing period, the pickup relay 1395 again grounds conductor 1513, and again operates relay 1560, relay 1570 being also energized, but in opposition as before. Ring limiting relays now operated are: 1560, 1580, 1590.

At the end of the third ringing cycle, pickup relay 1395 again unlocks and disconnects ground from conductor 1513. This removes ground from the lower winding of relay 1570 and this relay operates from its upper winding, which is energized in multiple with the upper winding of relay 1560, through make contacts 1562. Relay 1570 upon operating, passes ground from conductor 1514 through make contacts 1573 and 1592 to the lower winding of relay 1580, also connected in opposition, and this relay releases. Ring limiting relays now operated are: 1560, 1570, 1590.

Ground from make contacts 1591 is now passed to switching relay 1130, by way of break contacts 1581, make contacts 1571 and 1561, conductor 1506, break contacts 1372, make contacts 1341, conductor 1191, make contacts 1182, and the winding of relay 1130 to negative battery. Switching relay 1130 operates over this circuit, and locks to hold relay ground from make contacts 1128. Relay 1130 also at make contacts 1132 and 1134 connects the calling line through to the called line, through the talking condensers 1118 and 1119; at make contacts 1131 and 1133 connects the back bridge relay 1115 to the called line in shunt with break contacts 1151 and 1152; at make contacts 1135 places a direct ground on the test conductor 1156; and at break contacts 1137 opens the circuit of the connect relays 1175 and 1250 which restore and free the control unit which also releases all operated relays, and is thereby made available for another call. The opening of make contacts 1177 on connect relay 1175 also "unbusies" the other idle connectors of the group. If the called party should now answer, with the calling party still waiting on the line, the connection is completed immediately, and the back bridge relay 1115 is operated over the called line loop, and operates relay 1105 to reverse the battery feed to the calling line, for supervisory or metering purposes as required.

Assuming however, that the ring is not cut off in the foregoing manner, and that the called line answers before the end of the third ringing cycle, if said answer occurs while ringing current is actually on the line, ring-cutoff relay 1520 operates. The removal of the receiver or handset at the called station completes a direct current circuit through the hook springs of the telephone, in the well known manner, from negative battery through the ringing generator on conductor 1534 out over the called line and back to ground at make contacts 1511, over the previously traced ringing circuit.

Ring cutoff relay 1520 operating over this circuit, closes make contacts 1521 and thereby completes a circuit for the operation of switching relay 1130, by way of conductor 1506, break contacts 1372, make contacts 1341, conductor 1191, make contacts 1182 and the winding of relay 1130. Switching relay 1130, at make contacts 1138 locks to ground from make contacts 1128; at make contacts 1132 and 1134 connects the calling and called lines; at make contacts 1131 and 1133 closes an alternative circuit for back bridge relay 1115 over the called line loop; at make contacts 1135 grounds the test conductor 1156, preparatory to the release of the control unit from which it was previously grounded; at make contacts 1137 opens the circuit to the connect relays which release; and at make contacts 1139 prepares the conversation timing circuit, which will be discussed in a separate section.

The connect relays 1175 and 1250 upon releasing, disconnect the control leads between the connector and the control unit, in order to free the control unit and make it available for another call, all of the operated relays in said control unit releasing immediately when make contacts 1177 remove ground from conductor 1189. This also removes the artificial busy from the idle connectors of the group, which as previously stated, had their relays 1100 operated from the ground at make contacts 1177 by way of their back contacts 1178 and 1127. The control unit may now be seized by any of the other connectors associated therewith.

Back bridge relay 1115 also operates, as soon as the called line answers, from ground through its upper winding, break contacts 1151, make contacts 1132, conductor 1123, break contacts 1201, make contacts 1211 and 1234, line conductor 1240, hookswitch of the called telephone, line conductor 1241, make contacts 1235 and 1212, break contacts 1202, conductor 1124, make contacts 1134, break contacts 1152, and the lower winding of relay 1115 to battery. Relay 1115 operates relay 1105, and the latter relay, at make before break springs 1106 and 1107 reverses the battery feed from line relay 1110 to the calling line in the usual manner. Relay 1105 also, at contacts 1108 and 1109 further prepares the call timing circuits. The calling and called lines are now connected together in a talking connection which extends from the calling telephone, through the line conductors 163 and 164, springs of the tens and units relays in the finder, link conductors 270 and 271, make contacts of the selector switching relay 500, talking conductors 541 and 542, contacts of the selector tens and units relays, trunk conductors 671 and 672, break contacts 1101 and 1102, make contacts 1106 and 1107, talking condensers 1118 and 1119, make contacts 1132 and 1134, talking conductors 1123 and 1124, contacts of the connector tens and units relays, and line conductors 1240 and 1241 to the called telephone. Talking battery is fed to the calling line from line relay 1110, and to the called line from back bridge relay 1115. Busying ground is maintained on the test conductor of the calling line from test conductor 673 in the connector now held grounded from make contacts 1121 of the connector release relay 1120 and make contacts 1125A of the hold relay 1125, while busying ground on the test conductor of the called line is now maintained from make contacts 1135 of the connector switching relay 1130.

If instead of answering while ringing current is on the line, the called party answers during a silent period, the operation of cutting off the ring is slightly different, since both the coding relay 1500 and the drain relay 1530 may be assumed to be normal at this time. In such a case, the circuit for the ring cutoff relay 1520 is open at make contacts 1501 and 1503, and instead, the auxiliary back bridge relay 1540 finds itself connected to the called line, and is thereby caused to operate. The circuit for relay 1540 is from ground through its upper winding, break contacts 1531 and 1501, conductor 1505, make contacts 1386, conductor 1198, make contacts 1187, conductor 1123, break contacts 1201, make contacts 1211 and 1234, line conductor 1240, hookswitch of the called telephone, line conductor 1241, make contacts 1235 and 1212, break contacts 1202, conductor 1124, make contacts 1186, conductor 1197, make contacts 1388, conductor 1508, break contacts 1503 and 1532, and the lower winding of relay 1540 to battery. Relay 1540, at make contacts 1541 grounds conductor 1506 and causes the operation of switching relay 1130 in the connector, exactly as already described. The operation of the back bridge and battery reversing relays 1115 and 1105, and the release of the control unit, are also as previously described.

If the called party hangs up first, nothing occurs except the release of relays 1115 and 1105, the latter again reversing battery to the calling line, for purposes of supervision, in case the call should happen to be from an operator. When the calling party hangs up however, the opening of the calling loop releases the connector line relay 1110, which then restores release relay 1120 and hold relay 1125, after a slight delay. Relay 1120 opens make contacts 1121, and thereby removes ground from test conductor 673 leading back through the selector. Relay 1125, at make contacts 1128 removes locking ground from conductor 1158 to cause the release of the connector tens and units relays and the switching relay 1130. Relay 1125 also at break contacts 1129, re-establishes the operate circuit of trunk busy relay 1000 in the trunk select relays, and this relay re-operates. Meanwhile, the removal of ground from test conductor 673 also removes it from the test conductor 272 in the selector, thereby opening the locking circuit to switching relay 500 and causing the release of this relay. Relay 500 opens make contacts 505, thereby removing locking ground from the hold conductor 273 to which are now locked the tens and units relays of both the finder and the selector. These relays thereupon release and restore the link to normal. Relay 500 also, at break contacts 506 prepares the pull up circuit for allotter relay 470, and the latter relay will in due course re-operate, on the next pull up ground pulse from reset relay 445.

*Subscriber to P. B. X call*

A call to a P. B. X is identical with a call to an ordinary subscriber, as described in the preceding section, except for the selection of trunks on the third digit, when a plurality of trunks are involved, as is usual. P. B. X trunk groups may be assigned to any tens group in the connectors, and while it is generally considered preferable for maintenance purposes to start such trunks on the first terminal of the tens group and continuing in direct numerical sequence, this is not necessary, and the trunks may be arranged in any order, or scattered and intermingled with other lines in almost any way desired, since any trunk select relay can be arranged to select any units relay.

In the present instance, a group of P. B. X trunks controlled from the P. B. X trunk select relays of Figure 16, is assumed to be connected to the first five sets of line terminals of the T00 tens relay 1280 of the 200 group connector of Figures 11 and 12. To make a call to this P. B. X, a calling subscriber, such as the one of the previous call at station 170 in Figure 1, will be required to dial the four-digit call number "2011."

When the calling subscriber removes his receiver, the line relay 150 operates as before, to busy the line, and to pull up the tens and units marking relays 310 and 340 in the finder control unit. Assuming the position of the allotter relays to be the same as for the previous call, with relay 470 operated, and the preceding relays normal, the finder control unit will again select the link associated with the finder and selector of Figures 2, 5 and 6. Connect relays 250 and 260 thereupon operate as before, from ground at make contacts 344, and cause the operation of the finder tens and units relays 210, 220 and 240, from ground at make contacts 411 which pass on the tens marking ground from contacts 311, and from units marking grounds at make contacts 341 and 342.

Assuming selector control unit #1 to be available as before, connect relay 260 also at make contacts 265 causes the operation of connect relays 520 and 650 in the selector, thereby seizing the said control unit. Pulsing relay 720 thereupon immediately operates over the calling line loop, and again causes the operation of release relays 725 and 740 and transfer relay 730. The circuit for the latter relay it will be remembered, is from ground at make contacts 744, over conductor 765, through the upper break contacts of the counting control relays of Figure 8, and conductor 767 to the lower winding of relay 730. Relay 730 passes dial tone back to the calling line, and relay 725 grounds the test and hold conductors of the link, exactly as previously described, to hold the finder, and free the finder control unit.

When the calling subscriber dials the first digit of the call number "2011," pulsing relay 720 follows the pulses and operates the counting relays as before, by way of make contacts 742 and 732. At the end of the second pulse, counting relay 820 and counting control relay 2 again find themselves locked up in series, from ground at make contacts 744. When relay 730 releases shortly thereafter, it disconnects the dial tone as before and again connects ground through its break contacts 733 to the closed make contacts 822 and 823 of the second counting relay. The ground on make contacts 822 causes the operation of tens relay 630 in the selector, by way of conductor 771 and make contacts 652, and the ground on make contacts 823 causes the operation of group access relay 900 as before by way of conductor 777, make contacts 657, and conductor 661. Group access relay 900 operates group select relay 930 via conductor 662, make contacts 632 and conductor 664. Thereupon, assuming the first connector of the group to be again available the 1—6 units relay in the selector operates as before from ground at make contacts 1021 by way of conductor 1071, make contacts 936 and 907, and conductor 670.

Units relay 610 upon operating, passes ground on the test conductor 272, from make contacts 727, through to test conductor 673 and to the connector, where connect relays 1175 and 1250 are caused to operate as before, via break contacts 1137, and relay 1175 pulls relay 1350 by way of conductor 1189 and break contacts 1326. Units relay 610 also, at make contacts 617 causes the operation of switching relay 500 from ground at make contacts 728, by way of conductor 551, make contacts 526, conductors 273 and 697, make contacts 617 and conductor 543. Switching relay 500 upon operating grounds the hold conductor 273 to lock up the finder tens and units relays locally, at break contacts 501 and 502 opens the circuit of pulsing relay 720 in the control unit, thereby to cause the release of this equipment, and at make contacts 501 and 502, extends the calling line through to the connector, whose line relay 1110 immediately operates, and causes the operation of the release and hold relays 1120 and 1125 exactly as before.

When therefore, the calling subscriber dials the second digit of the P. B. X call number "2011," line relay 1110 will respond and will operate the counting relays of Figure 14 accordingly. The pulsing circuit to the counting relays, it will be remembered, is from ground at back contacts 1171, through break contacts 1111, make contacts 1126 and 1179, conductor 1190, break contacts 1343 and conductor 1418. Transfer relay 1310, being connected in multiple with this circuit, and being slow to release, will operate immediately on the first pulse of each digit dialed into the connector and will release shortly following the last pulse of each digit, as previously indicated.

Counting relay 1410 and counting control relay 10 operate on the first pulse in the manner already described. Similarly, relays 1420 and 20 operate on the second pulse, relays 1430 and 30 on the third pulse, 1440 and 10 again on the fourth pulse, 1450 and 20 on the fifth pulse, 1460 and 30 on the sixth pulse, 1470 and 10 on the seventh pulse, 1480 and 20 on the eighth pulse, 1490 and 30 on the ninth pulse, and 1400 and 10 on the tenth and last pulse. Relay 1460, at this time, does not cause the operation of the units switching relay in the connector, due to the open make contacts 1317, on the as yet unoperated tens digit transfer relay 1315.

Upon the release of transfer relay 1310, shortly after the completion of the tenth and last pulse, this relay causes the operation of the T00 tens relay 1280 in the connector, from ground at make contacts 1177, by way of conductor 1189, break contacts 1306, conductor 1419, make contacts 11, conductor 1426, break contacts 1314 and 1319, conductor 1427, make contacts 1402, conductor 1477, cable 1449, conductor 1477 in the connector, make contacts 1265, and the winding of relay 1280 to negative battery.

Tens relay 1280 upon operating, extends the associated line and trunk conductors to the springs of the units relays, and at make contacts 1282 locks itself to "hold" relay ground at make contacts 1128, by way of conductor 1158 and resistor 1219. Relay 1280 also at make contacts 1281 prepares a circuit for group access relay 1600, and at make contacts 1289 closes a circuit for the operation of the tens digit transfer relay 1320, by way of conductors 1226, 1191A, 1482 and 1483, as before.

Tens digit transfer relay 1320 upon operating, prepares a circuit for operating tens digit transfer relay 1315, and at make contacts 1321 closes a circuit to counting chain release relay 1305. Relay 1305 then operates and restores the counting chain to normal. Release of the counting chain removes operating ground from relays 1280 and 1320, but both of these relays remain operated. Removal of ground from the operate circuit of relay 1320 by the opening of make contacts 15, permits tens digit transfer relay 1315 to operate and lock in series with relay 1320, to prepare circuits for the units digit. Relay 1315 also at break contacts 1316A opens the circuit of the counting chain release relay 1305 which restores, to re-prepare the locking circuits of the counting chain.

When the calling subscriber dials the third digit of the P. B. X call number "2011," the counting relays count off one step, leaving relays 1410 and 10 operated and locked to conductor 1419. When therefore, transfer relay 1310 restores, after the usual delay period, it causes the operation of the group access relay 1600 in the P. B. X trunk selecting equipment of Figure 16. The circuit for relay 1600 is as follows: ground from make contacts 1177 on conductor 1189, break contacts 1306, conductor 1419, make contacts 11, conductor 1426, break contacts 1314 and 1313, make contacts 1318, break contacts 1328, conductor 1439, make contacts 1413, conductor 1458, through cable 1449, make contacts 1267, make contacts 1281, conductor 1693, through cable 1647, winding of relay 1600, break contacts 1602, 1622, make contacts 1631, break contacts 1613 and 1603, and similar contacts on any intervening access relays, and finally to negative battery through break contacts 1626 and resistor 1627.

Group access relay 1600 upon operating, at make contacts 1604 causes the operation of group select relay 1650, by way of conductor 1692 and cable 1647, make contacts 1283, conductor 1694, cable 1647, and the winding of relay 1650 to battery. Relay 1600 also at make contacts 1605 causes the operation of lockout relays 1620 and 1625, whose function is to disable the other access relays momentarily, as previously described for relays 915 and 920. Group select relay 1650 upon operating, extends the units marking conductors through to the connector, where, assuming that the first trunk is idle, the 1—6 units relay is immediately operated, from ground at break contacts 1662, through make contacts 1655 and 1607, conductor 1687 via cable 1647, and the winding of relay 1210 to negative battery.

The 1—6 units relay 1210 upon operating over this circuit, locks to "hold" relay ground on conductor 1158 by way of resistor 1218 and make contacts 1217, and at the same time extends the talking and test conductors 1123, 1124 and 1156 of the connector through to the trunk by way of break contacts 1201, 1202 and 1203, make contacts 1211, 1212 and 1213, and make contacts 1284, 1285 and 1286. Relay 1210 also, at make contacts 1215 completes the previously traced circuit to the units digit transfer relay 1335, by way of conductors 1228, 1191B, 1482 and 1483, and break contacts 1312, make contacts 1316, and break contacts 1326C.

Units digit transfer relay 1335 upon operating, prepares the operation of units digit transfer relay 1325, and at make contacts 1336 closes a circuit to the relay 1305, which again operates and releases the counting chain. Release of the counting chain opens the operate circuits of relays 1335 and 1600. Removal of operating ground from relay 1335 permits units digit transfer relay 1325 to operate and lock in series with relay 1335, to prepare circuits for the ringing digit. Relay 1325 also, at break contacts 1326A, opens the circuit of the counting chain release relay 1305, which restores. Relay 1325 also at break contacts 1326 opens the circuit of timing relay 1350 which releases after a slight delay, and switches the test conductor 1192 from the busy relay 1360 to the idle test relay 1380. Removal of operating ground from group access relay 1600 causes the release of this relay. Relay 1600 on releasing, opens the units marking leads, thereby opening the operate circuit of units relay 1210, which however, remains locked operated. Relay 1600 also opens make contacts 1604 and 1605, and thereby releases relays 1620, 1625 and 1650 to make the trunk selecting equipment available for another call.

Upon the release of permanent timing relay 1350, shortly after the operation of the units digit transfer relay 1325, negative battery from the P. B. X trunk line equipment on the test conductor 1245 causes the operation of test relay 1380 in the control unit, by way of make contacts 1286 and 1213, break contacts 1203, conductor 1156, make contacts 1183, conductor 1192, break contacts 1352 and 1364, and the winding of relay 1380 to ground on conductor 1516 from make contacts 1177 by way of conductors 1189 and 1514. Relay 1380 upon operating, pulls the switching relay 1385 exactly as for the preceding call, and thereupon releases, as before, due to being shunted by make springs 1389.

The dialing of the fourth digit "1" and the ringing on the P. B. X trunk are as described for the previous call to a regular subscriber's line. Briefly, relays 1310, 1410 and 10 operate from the single pulse as repeated by line relay 1110, and on the release of transfer relay 1310 following the completion of the dialing, ringing digit transfer relay 1340 operates, from ground on conductor 1189, by way of make contacts 1326B and 1316C, conductors 1482 and 1483, break contacts 1312, and make contacts 1316 and 1326C. This battery pickup pulse from the interrupter then operates ring pickup relay 1395, which relay connects the coding or ringing relay 1500 to the coding conductor 1459, by way of make contacts 1414, conductor 1438, make contacts 1346, and 1398, and conductor 1519, as before. Ringing then proceeds, through ring cut-off relay 1520, which, being made sluggish or slow to operate is not affected thereby. When the P. B. X answers, however, ring cutoff relay 1520 or back bridge relay 1540 operates, depending on whether the trunk loop is closed during a ringing period or a silent period, as previously described. Either of these relays upon operating, ground conductor 1506 to operate the switching relay 1130 in the connector. Relay 1130 upon operating locks up as before, completes the connection and releases the control unit.

Returning now to the trunk selecting equipment of Figure 16, upon the seizure of the first trunk of the P. B. X trunk group as just described, the line equipment of this trunk causes the operation of trunk select relay 1660, by grounding conductor 1663. Relay 1660 thereupon reverses its contacts 1662 to prepare the selection of the second trunk. If therefore, another call is made to this P. B. X while the first trunk is still engaged, the operation of relays 1600 and 1650 on the dialing of the third digit, will cause the operation of the connector 2—7 units relay, not shown, from ground through make contacts 1662, break contacts 1667, make contacts 1654 and 1606, and conductor 1688. Seizure of the second trunk will result, and will cause the operation of trunk select relay 1665, to prepare the selection of the third trunk, and so on.

Should all five trunks become busy, ground from make contacts 1662 will be connected to conductor 1696, which may be connected to an all-trunks-busy meter. On each call to this group also, make contacts 1657 of the group select relay connect ground to conductor 1695, which may be employed to operate a peg count meter. Of course, an overflow meter may be connected to conductor 1696 in preference to an all trunks busy meter, in which case ground through make contacts 1657 should be connected to contacts 1662 instead of direct ground. In this case, the overflow meter would operate from make contacts 1682 whenever with all trunks busy, additional calls were made to this P. B. X. Also, on each such additional call, regardless of the metering connections, units operating ground, passing through the jumper 1683 around break contacts 1682, now open, will pass through make contacts 1651 and cause the operation of the 5—0 units relay 1220 on the connector, by way of make contacts 1601, conductor 1691 and cable 1647 and the winding of relay 1220 to negative battery. Relay 1220 will cut the connector through to the last trunk, which, being busy as stated, has ground on its test conductor. Ground on the test conductor will cause operation of the busy relay 1360 in the control unit, by way of make contacts 1183, conductor 1192, and make contacts 1352, following the dialing of the third digit, to give busy tone to the calling party. As soon as a trunk becomes free however, the corresponding trunk select relay releases immediately, and again prepares its marking circuit. It will thus be obvious, that with any trunks idle, all P. B. X calls to this trunk group are directed always to the first idle trunk, and that with all trunks busy, all calls to this trunk group are directed always to the last trunk, which being busy, causes a busy signal to be returned to the calling party. The release of the counting chain, following the third digit of the call number, immediately releases group access relay 1600 whether the call is directed to an idle trunk or to a busy trunk.

*Subscriber to trunk call*

To make a call to a trunk, such as a direct trunk to a distant office, or a trunk to a toll operator, a calling subscriber, for example, the subscriber at station 170, dials a single digit number, in this case a "9" for an inter-office trunk, or an "0" for a trunk to a toll operator. The trunk select relays of Figures 9 and 10 will thereupon act automatically to select an idle trunk in the trunk group called, and the connectors of the system are not affected by the call. Any subscriber may call a toll operator, but certain subscribers may be restricted as to making direct calls to the distant office, by means of suitable cross connections between the finder control unit marking relays and the service restriction relay 400.

Assuming first, that the subscriber at station 170 is to make an interoffice call, upon the removal of the receiver the line equipment, the finder selector link, and the finder control unit are affected exactly as for the previous calls. The line relay 150 first operates over the line loop, and causes the operation of the 00 tens marking relay 310, and the U6 units marking relay 340 in the finder control unit, relay 310 also operating relay 410 as before. Ground from make contacts 344 will now pass through the allotter to seize the first available finder such as that of Figure 2, and will operate connect relays 250 and 260 therein. The finder "00" tens relay 210, the 1—6 units relay 220, and the units switching relay 240 thereupon operate as before from grounds at make contacts 411, 341 and 342 respectively. Connect relay 260 also, at make contacts 265 causes the operation of the connect relays of the selector, such as relays 520 and 650, which seize the associated selector control unit. The pulsing relay 720 of the control unit thereupon operates over the calling line loop, and causes the operation of relays 725, 730 and 740 as before. Relay 730 connects dial tone to the calling line, and relay 725 locks up the selector connect relays, and also connects lock-up ground to the test and hold conductors of the link. Ground on the test conductor also causes the operation of the cutoff and lockout relays of the line circuit of the calling line, which releases the line relay 150, frees the finder control unit, and advances the allotter to the next available idle link.

When the calling party hears the dial tone he will dial the digit "9." Pulsing relay 720 in the selector control unit follows the pulses in the usual manner, to operate the counting relays. On the first pulse relays 810 and 1 operate, on the second pulse relays 820 and 2, on the third pulse relays 830 and 3, on the fourth pulse relays 840 and 1 again, on the fifth pulse relays 850 and 2, on the sixth pulse relays 860 and 3, on the seventh pulse relays 870 and 1, on the eighth pulse relays 880 and 2, and on the ninth and last pulse relays 890 and 3 operate, the last previously operated pair releasing of course, at each step.

Shortly, after the last pulse of the digit, transfer relay 730 restores. This relay it will be remembered, has the circuit to its lower winding opened on the first pulse by the opening of the upper break springs of the counting control relays and is held open thereafter by the springs of one or the other of these relays. It is then held operated therefore, only by the pulsing into its upper winding. Relay 730 on releasing, disconnects dial tone and at break contacts 733 closes a circuit for the operation of the T900 tens relay, not shown, in the selector, from ground at make contacts 744, through contacts 733, conductor 768, make contacts 892, conductor 775, back contacts 762, conductor 778 and make contacts 655. This same ground also passes through make contacts 893 and causes the operation of group access relay 900, by way of conductor 777, make contacts 657, conductor 661 and cable 658. Group access relay 900 operates the group select relay corresponding to the wanted trunk group, not shown, by way of conductor 662 and make contacts on the operated T900 tens relay in the selector. Thereupon, assuming the first trunk of the group to be available, the 1—6 units relay in the selector is operated from the trunk select relays in the usual manner by way of conductor 670.

The operation of the units relay 610 now extends the selector talking and test conductors through to the trunk, not shown, and at the same time causes the operation of the selector switching relay 500 from ground at make contacts 723, by way of conductor 551, make contacts 526, conductors 273 and 697, make contacts 617 and conductor 543. Relay 500 upon operating, at make contacts 501 and 502 switches the calling line through to the trunk, which returns ground on the test conductor, and at break contacts 501 and 502 disconnects pulsing relay 720 which releases and frees the control unit, which in turn releases the connect relays 520 and 650. Switching relay 500 also at make contacts 505 locks up the tens and units relays of the finder and the selector. The call is now extended to the distant office and the subscriber may proceed as necessary to complete the call.

If a restricted subscriber, such as the subscriber assigned to the line terminals "90" in the finder, were to dial "9" in an attempt to make the foregoing call to a distant office, the call would not be switched through, and the calling party would be given the busy signal, in the following manner.

Upon lifting the receiver, the tens and units marking relays 300 and 350 in the finder control unit, would operate from the calling subscriber's line relay, and relay 300 would operate relay 400, from ground at make contacts 301. Finder start ground from make contacts 354 will now operate the connect relays 250 and 260 in the first available finder, whereupon the finder "90" tens relay 200, the 5—0 units relay 230, and the units switching relay 240 operate, from grounds at make contacts 401, 351 and 352 respectively. The connect relays 520 and 650 of the selector then operate, followed by the usual operation of relays 720, 725, 730 and 740 in the selector control unit. This time however, the service restricting relay 760 of the control unit also operates, from ground at make contacts 353, over conductor 378, through make contacts 409, conductor 484, make contacts 266, conductor 277, make contacts 529, conductor 554, and the winding of relay 760 to negative battery. Relay 760 locks to make contacts 744 and reverses its contacts 762. Meanwhile, relay 730 has passed dial tone back to the calling line, and relay 725 has grounded the test conductor 272, to pull up the cutoff and lockout relays of the line circuit and release the finder control unit.

Now, when the calling party dials the digit "9" to call the distant office, pulsing relay 720 will follow the pulses in the usual manner, and the counting relays will count off nine steps, leaving the relays 890 and 3 operated as before, and all other relays of the counting chain normal. When however, transfer relay 730 restores, shortly after the last pulse, instead of closing a circuit to the selector T900 tens relay as before, it closes a circuit to the selector busy relay 510. This circuit is from make contacts 744, through break contacts 733, conductor 768, make contacts 892, conductor 775, make contacts 762, conductor 555, make contacts 530, resistor 556, and the winding of relay 510 to negative battery.

Busy relay 510 upon operating, at make contacts 511 connects busy tone and ground from the secondary of a busy tone induction coil, to the calling line, by way of conductor 576. This circuit is from said conductor 576, through make contacts 511, upper winding of relay 510, break contacts 501, conductor 270, make contacts 241, 234 and 204, the calling line and telephone, make contacts 205, 235 and 242, conductor 271, break contacts 502, make contacts 512, and the lower winding of relay 510 to negative battery. Relay 510 locks over this circuit, which also causes busy tone to be heard in the receiver of the calling telephone. Relay 510 also at make contacts 513 and 514 grounds the test and hold conductors, and at break contacts 512 opens the circuit to pulsing relay 720, thereby freeing the selector control unit which restores to normal and releases connect relays 520 and 650. The calling party on hearing the busy tone, will now hang up and release the link.

A call to a toll trunk is exactly as described for a non-restricted call to an inter-office trunk except that the digit "0" is dialed instead of "9" to select the proper trunk group. Pulsing relay 720 follows the dial pulses in the usual manner, and the counting relays count off ten steps, leaving relays 800 and 1 operated. Now when transfer relay 730 restores shortly after the final pulse, it completes a circuit for the selector T000 tens relay 680, by way of break springs 733, conductor 768, make contacts 802, conductor 776, make contacts 656, and the winding of relay 680 to battery. The same ground, from make contacts 744, also passes through make contacts 803 to conductor 777, and hence to the group access relay 900 or its equivalent which operates, and causes the operation in turn, of the group select relay associated with the toll trunk group, not shown, by way of conductor 662, make contacts 682, and conductor 665. Thereupon, the associated trunk select relays cause the operation of the selector units relay which has been preselected by this equipment, and the call is switched through to the associated idle toll trunk in the usual manner.

*Call from a regular operator*

On a call from a regular operator, say, at some nearby exchange, the operation is no different than that described for a call from a non-restricted subscriber, with the exception that on calls from an operator the "trunk call" relay 1140 will operate in the connector to cut off the conversation timing feature, to be described in detail in a separate section on "Call Timing."

Assuming for example that an operator making a call to this exchange comes in through the repeater designated by the rectangle 171 in Figure 1, which is shown connected to line terminals "91" in the finder, line relay 120 of the associated line equipment will operate over the trunk loop in the usual manner.

Line relay 120 upon operating, at make contacts 121 busies the line, and at make contacts 122 and 123 grounds the tens and units marking conductors 166 and 167. The ground on conductor 167 causes the operation of the T90 tens marking relay 300, as well as the service restriction relay 400, while the ground on conductor 166 passes through make contacts 305 to operate the U1 units marking relay 320. Finder start ground from make contacts 324 will now pass through the chain springs of the allotter relays 460 etc. to seize an idle finder. If no finder is available, this ground on conductor 380 will pass on to the overflow relay 450 causing its operation. Relay 450 will thereupon, at make contacts 453 pass ground to the overflow meter circuit, at make contacts 452 connect ground to conductor 465 to start the tone equipment, and at make contacts 455 will connect busy tone from conductor 466 to the calling trunk by way of conductor 173 and condenser 172. This busy signal, as previously indicated, is not given to subscribers, but only to operators, the indication of an all links busy condition being limited to the absence of dial tone in the case of a call from a subscriber.

Assuming however that a link is available such as the one shown in the drawings, finder start ground will cause the operation of the connect relays 250 and 260 in the selected link in the usual manner. Thereupon, the ground from make contacts 401 will cause the immediate operation of the finder "90" tens relay 200, by way of conductor 483 and make contacts 252. The finder "1—6" units relay 220 also operates at the same time, from ground at make contacts 321, by way of conductor 371 and make contacts 263. The line and test conductors of the trunk are now connected through to the finder talking and test conductors via make contacts 201, 202 and 203, make contacts 221, 222 and 223, and break contacts 241, 242 and 243.

Finder connect relay 260 also, at make contacts 265 passes ground to the selector connect relays 520 and 650 which operate to seize a selector control unit. Pulsing relay 720 in the control unit now operates over the trunk loop, and causes the operation of relays 725, 730 and 740 in the usual manner. Trunk call relay 750 in the control unit, also operates at this time, over the following circuit: ground at make contacts 322, conductor 375, make contacts 402 and the dotted jumper wires, conductor 485, make contacts 267, conductor 278, make contacts 527, conductor 552, and the upper winding of relay 750 to negative battery. Relay 730 passes dial tone back to the calling trunk, and relay 725 grounds the selector test and hold conductors as before to operate the cutoff and lockout relays of the line circuit and release the finder control unit. Relay 750 at make contacts 752 locks up through its lower winding to ground at make contacts 744, and at make contacts 751 prepares the trunk call circuit to the trunk selecting equipment.

The operator, upon hearing the dial tone, will proceed to dial the call number of the desired party, which may be assumed to be, as for the described subscribed to subscriber call, "2111." Pulsing relay 720 will follow the first digit and pulse into the counting relays of Figure 8, leaving relays 820 and 2 operated. At the end of the second pulse when transfer relay 730 restores, it passes ground to make contacts 822 and 823 as before to operate tens relay 630 in the selector, and relay 900 or the equivalent, in the trunk selecting equipment. The operation of these two relays causes the operation of relay 930 in the trunk selecting equipment, whereupon ground from the trunk selecting relays of Figure 10 passes back over the preselected units marking conductor to the proper units relay in the selector, which operates to seize an idle connector. The operation of the units relay of course also pulls switching relay 500 in the selector, which thereupon cuts the calling trunk through to the connector, and releases the control unit. Line relay 1110 in the connector now operates, followed quickly by release relay 1120 and hold relay 1125. Connect relays 1175 and 1250 also operate, from ground on the test conductor. Trunk call relay 1140 also operates, upon seizure of the connector, from ground at make contacts 751, by way of conductor 779, make contacts 651, conductor 660, cable 658, conductor 660 in the trunk selecting equipment, make contacts 908 and 938, conductor 1077, and, assuming the call has been passed to the first connector of the group, through make contacts 1024, conductor 1007, and the lower winding of relay 1140 to battery.

Trunk call relay 1140 upon operating, locks through its upper winding to test conductor 673; at break contacts 1141 opens the warning tone circuit; at break contacts 1142 opens the circuit to the reverting call relay in the control unit, and at break contacts 1143 and 1144 partly opens the conversation timing circuit, preparatory to the opening of break contacts 1108 and 1109 which are opened when the called party answers. Otherwise the action of relay 1140 is without effect, and the call proceeds in the usual manner, with the tens relay 1230 operating on the second digit of the assumed call number "2111," the units relay 1210 operating on the third digit, and the ringing taking place on the fourth digit precisely as described for the original subscriber call to this number.

Now when the called subscriber answers, switching relay 1130 operates as before from the control unit and locks to switch the calling trunk through to the called line, and releases the connect relays 1175 and 1250, to free and release the control unit. Relay 1115 now operates over the called line, operating relay 1105, which reverses battery to the trunk and opens break contacts 1108 and 1109 to complete the opening of the conversation timing circuits. The connection is now complete, and conversation proceeds.

*Call from a toll operator*

On a call from a toll operator, the operation is similar to that just described for a call from a regular operator, except that on calls from a toll trunk, the "toll trunk call" relay 1145 in the connector also operates, to provide certain special features, such as "cut-in-on-busy" and "alarm checking," which are made available to such operators only.

Assuming, for example, that such a toll operator comes in on a toll trunk associated with line terminals "01" in the finder, the operation of the line relay of the line equipment, not shown, associated with this trunk, will ground the tens and units marking conductors 169 and 174. The ground on conductor 169 causes the operation of the T00 tens marking relay 310, which in turn pulls service restriction relay 410 as before, from make contacts 311. The ground on conductor 174 now passes through make contacts 312 and operates the U1 units marking relay 320. Finder start ground from make contacts 324 now passes through the allotter chain contacts, to seize an idle finder by operating the connect relays thereof in the usual manner. Connect relays 250 and 260 upon operating, cause the immediate operation of the "00" tens relay 210 and the "1—6" units relay 220, from make contacts 411 and 321, respectively. The line and test conductors of the trunk are now cut through to the finder talking and test conductors, by way of make contacts 211, 211A and 211B, make contacts 221, 222 and 223, and break contacts 241, 242 and 243.

Connect relay 260 also, at make contacts 265 grounds conductor 274, thereby causing connect relays 520 and 650 in the selector to operate and seize an idle control unit. Pulsing relay 720 then operates over the trunk loop, and causes relays 725, 730 and 740 to operate in the usual manner. Trunk call relay 750 in the control unit also operates at the same time, from ground at make contacts 322, by way of conductor 375, make contacts 412 and conductors 485, 278 and 552. Relay 730 passes back dial tone to the calling trunk; relay 725 grounds the test and hold conductors of the selector to operate the line cutoff and lockout relays and release the finder control unit, as before; and relay 750 at make contacts 751 and 752 prepares circuits to both the trunk call and toll trunk call relays 1140 and 1145 in the connector, by way of the trunk selecting equipment.

The toll or control operator, upon hearing the dial tone, will proceed to dial the number of the wanted party, which may again be taken as "2111." On the first digit, relay 720 again responds and steps the counting chain two steps, leaving relays 820 and 2 operated. Now, when transfer relay 730 restores, at the end of this first digit, it again grounds make contacts 822 and 823 to operate tens relay 630 and a group access relay 900 corresponding to the link employed, in the trunk selecting equipment. Trunk access relay 930 then operates from ground at make contacts 901, by way of conductor 662, make contacts 632, and conductor 664. Upon the operation of relay 930, ground from the trunk selecting relays is passed back over one of the units marking leads to the preselected units relay in the selector, which operates immediately, and cuts the selector through to the selected idle connector. The units relay also pulls the switching relay 500 via make contacts 617 and conductor 543, which cuts the calling toll trunk through to the connector, and opens back contacts 501 and 502 to release relay 720 and the associated control unit. Line relay 1110 in the connector now operates over the trunk loop, causing the operation of release relay 1120 and hold relay 1125 in the usual manner. Connect relays 1175 and 1250 also operate as before, from ground on the test conductor 673, passing through break contacts 1137 on the connector switching relay.

Trunk call relay 1140, and toll trunk call relay 1145 also both operate, from relay 750 in the selector control unit, before the latter can release. The circuit for relay 1140, is as before, from make contacts 751, via conductor 779, make contacts 651, conductor 660, through cable 658, make contacts 908 and 938, conductor 1077, and assuming that the preselected connector is again the first connector, through make contacts 1024 and conductor 1007 to relay 1140 and battery. The circuit for relay 1145, which has not previously been traced, is from ground at make contacts 744, through make contacts 752, conductor 553, make contacts 528, conductor 275, make contacts 219 on the operated finder tens relay, conductor 276 across Figures 5 and 6 and through cable 658, make contacts 909 and 939, conductor 1078, make contacts 1025, and conductor 1004 to the lower winding of relay 1145 and battery.

Trunk call relay 1140 upon operating, locks through its upper winding to the test conductor; at break contacts 1141 opens the warning tone circuit; at break contacts 1142 opens the circuit to the reverting call relay 1370; and at break contacts 1143 and 1144 prepares the opening of the conversation timing circuit, exactly as for a call from a regular operator.

Toll trunk call relay 1145 upon operating, likewise locks through its upper winding to the test conductor. Relay 1145 also at make contacts 1148 prepares a locking circuit for verification relay 1150, and at make contacts 1149 prepares an operate circuit for verification relay 1160. The action of relays 1140 and 1145 is therefore without direct effect at the moment, and the call proceeds, with the T10 tens relay 1230 operating on the second digit of the assumed call number "2111," the U1—6 units relay 1210 operating on the third digit, and the ringing taking place on the last digit, exactly as described for the original subscriber call to number "2111."

When the subscriber answers, switching relay 1130 operates from the control unit as before, switches the calling toll trunk through to the called line, and at the same time releases connect relays 1175 and 1250, to free the control unit. Back bridge relay 1115 now operates over the called line and pulls relay 1105, which reverses battery to the trunk, and at break contacts 1108 and 1109 completes the opening of the conversation timing circuits.

Should the called line be busy, however, ringing will not take place, and at the end of the third digit of the call number, ground on the test conductor of the called line will be passed back through the springs of the connector tens and units relays to test conductor 1156, and thence by way of make contacts 1183, conductor 1192 and make contacts 1352 to busy relay 1360. Relay 1360 upon operating over this circuit, locks to busy ground on conductor 1192, at make contacts 1361 connects busy tone to the calling trunk, and at make contacts 1362 prepares the cut-in-on-busy circuit.

If the toll operator wishes to break in on the busy connection, she proceeds to dial the ringing digit, whereupon the ringing digit transfer relay 1340 will operate in the usual manner from ground on conductor 1189, by way of make contacts 1326B and 1316C, conductors 1482 and 1483, and make contacts 1316 and 1326C, locks to conductors 1514 and 1189, and at make contacts 1343 further prepares the cut-in-on-busy circuit. The ring pickup relay 1395 is prevented from operating by the open make contacts 1391 on the switching relay of the control unit.

The toll operator will now dial an additional digit "1," causing connector line relay 1110 to pulse once in the usual way. The original pulsing circuit is now open at break contacts 1343, but relay 1110 passes a pulse of current to verification relay 1160, which operates. This momentary circuit to relay 1160 is from the ground at back contacts 1171, through break contacts 1111, make contacts 1126, 1179, conductor 1190, make contacts 1343 and 1362, conductor 1195, make contacts 1185, 1149, and the winding of relay 1160 to negative battery. Relay 1160, at make contacts 1161 prepares an operate circuit to the lower winding of verification relay 1150, which is now shunted by ground on both sides of itself, through make contacts 1161 and break contacts 1155.

The cessation of the pulse now opens the operate circuit to relay 1160. This also removes the shunt from relay 1150 which promptly operates in series with relay 1160, from ground on conductor 1158, through break contacts 1155, winding of relay 1150, make contacts 1161 and the winding of relay 1160 to battery. Relay 1150 at preliminary make contacts 1154 locks through its upper winding to the busy ground on test conductor 1156, and then opens break contacts 1155 to open the locking circuit of relay 1160 which restores. Relay 1150 also, at break-make contacts 1151 and 1152 disconnects the back bridge relay and connects the operator to the called line through the talking condensers 1118 and 1119. The operator may now speak with the called party without disturbing the existing connection otherwise. If the parties to the existing connection thereupon hang up, the busy ground will be removed from the test conductor, busy relay 1360 and verification relay 1150 will thereupon unlock and release, and the connector and control unit will proceed to ring and switch through in the regular way.

This circuit may also be used for verification purposes by a toll operator who has been called by a local subscriber wishing to make an outgoing toll call. After requesting the number of the calling party, the operator dials this number back to the exchange, but over a different trunk than the one over which the call was received. Another selector similar to the one employed to call the operator accordingly responds and seizes an idle connector and its control unit. These in turn respond to the succeeding digits of the call number to establish connection with the calling line. The calling line, being of course busy, causes busy tone to be returned to the operator over the second trunk, whereupon the operator dials the additional digit as just described for "cut-in-on-busy," and requests the calling subscriber to hang up for a moment. This removes the busy marking from the calling line and permits the connector to ring as before, and to switch through when the calling party again removes his receiver. This procedure guards against the possibility of a calling station giving a wrong number in the hopes of avoiding the toll charge. The original selector of course releases when the calling party hangs up at the operator's request, and the operator then releases the first trunk.

*Reverting calls*

In the case of a reverting call, where a subscriber on a party line wishes to call another subscriber on the same line, the calling party will dial the regular directory number of the wanted party in the regular manner, and then hang up to permit the ringing to start, and after a reasonable interval, will come back in on the line.

Let it be assumed for example, that the line indicated in the upper right hand corner of Figure 12 is a party line, and that one subscriber on this line has called another subscriber on the same line whose number is "2117." Upon the completion of dialing, the connector finds itself with the following relays operated: line relay 1110, release relay 1120, hold relay 1125, connect relays 1175 and 1250, tens relay 1230 and units relay 1210. The connector talking and test conductors are therefore connected through contacts of the tens and units relays to the terminals of the calling line, whose line relay though deenergized, still maintains ground on the test normal conductor. In the control unit, after the final pulse has died away, we find the following relays operated: tens digit transfer relays 1315 and 1320, units digit transfer relays 1325 and 1335, ringing digit transfer relay 1340, busy relay 1360, and counting relays 1470 and 10.

Now when the calling subscriber hangs up his receiver, the connector line relay 1110 immediately restores. A locking circuit for the hold relay 1125 is thereby established, which prevents the release of this relay which is still held operated from relay 1120. This locking circuit may be traced as follows: ground through back contacts of springs 1171, break contacts 1111, make contacts 1126 and 1179, conductor 1190, make contacts 1343 and 1362, conductor 1195, make contacts 1185, break contacts 1149, test conductor 1156, contacts of the tens and units relays, line test conductor and break contacts such as 151 of the line relay in the line equipment, contacts of the finder tens and units relays, test conductor 272, contacts of the selector tens and units relays, test conductor 673, make contacts 1125A, and the winding of relay 1125 to negative battery. This ground also holds the cut-off and lockout relays in the line equipment.

The connector release relay 1120 now releases, after a short delay, and at break contacts 1122 closes a circuit to reverting call relay 1370, from the same ground on test conductor 673, by way of break contacts 1142, make contacts 1184, conductor 1193, make contacts 1363 on the busy relay, and the upper winding of relay 1370 to battery.

Reverting call relay 1370 upon operating over this circuit locks through its lower winding to ground on conductors 1514 and 1189, and at make contacts 1371 closes a circuit to the forced release relay 1100, which operates to clear the line for ringing, by disconnecting the connector line relay 1110, at break contacts 1101 and 1102. The circuit for relay 1100 is from ground at make contacts 1371, over conductor 1196, make contacts 1178, break contacts 1127 and the winding of relay 1100 to battery. Relay 1370 also at make contacts 1372 prepares a circuit for the operation of the counting chain release relay 1305, at make contacts 1373 prepares the reverting call tone circuit, at break contacts 1375 opens the locking circuit of the busy relay, and at make contacts 1376 prepares a circuit for the reverting call release timing relay 1550.

Busy relay 1360 now releases, and at break-make contacts 1361 opens the busy tone circuit and prepares the ring-back circuit. Relay 1360 also, at its "close first" break contacts 1364 connects idle test relay 1380 to the test conductor, and at make contacts 1362 removes direct ground from the test circuit to permit the operation of relay 1380. Relay 1380 thereupon operates in series with the line cutoff and lockout relays, which remain operated. The circuit for relay 1380 is as before from ground on conductor 1189 and 1514, through back contacts 1551, conductor 1516, winding of relay 1380, break contacts 1364 and 1352, conductor 1192 and make contacts 1183 to test conductor 1156. Relay 1380 upon operating, pulls switching relay 1385, which prepares the pickup and ringing circuits, locks to conductor 1516, and connects direct ground from the same conductor 1516 to the test conductor, as for a normal call. Ringing now proceeds, with the aid of pickup relay 1395 and ringing relays 1500 and 1510, and the seventh ringing code is sent out over the line to signal the called station.

When the called party answers, ring cutoff relay 1520 operates in the usual way, over the line loop, and at make contacts 1521 passes ground to counting chain release relay 1305, by way of conductor 1506 and make contacts 1372. Relay 1305 thereupon operates, and releases the counting chain to stop the ringing. On the release of coding relay 1500, ring cutoff relay 1520 is disconnected, and back bridge relay 1540 is connected to the line loop. Relay 1540 thereupon operates, at make contacts 1541 places another ground on conductor 1506 to hold relay 1305 operated, and at make contacts 1542 connects reverting call tone to the line momentarily to advise the called subscriber he is answering a reverting call. A distinctive signal is induced in the line by connecting ground and negative battery alternately to conductor 1564, through resistors and a choke coil, not shown. This causes capacitor 1563 to charge and discharge across the line, by way of make contacts 1542, conductor 1509, make contacts 1373, conductor 1197, make contacts 1186 and conductor 1124, and this is heard as a steady clicking sound in the receiver at the called station.

The release of the counting chain, in addition to stopping the ringing, also connects the reverting call release timing relay 1550 to the timer, by way of conductor 1517, make contacts 1376, conductor 1417, break contacts 34, 24 and 14, and conductor 1416, to which the timer connects a one second ground pulse approximately every three seconds. The next such pulse on conductor 1416 therefore, causes relay 1550 to operate and lock to conductor 1514. Relay 1550 also, at make-before-break springs 1551, opens the original locking circuit for the switching relay 1385, and locks relay 1385 instead to conductor 1565, also leading to the timer and to which said timer connects a three second ground pulse at the same time it grounds conductor 1416.

When therefore the timer removes ground from conductor 1565 at the end of the three second interval, switching relay 1385 restores, and at make contacts 1386 and 1388 disconnects back bridge relay 1540 which also restores. The removal of ground from conductors 1565 and 1516 also removes ground from conductor 1192 and test conductor 1156. Removal of ground from test conductor 1156 opens the circuit to the cutoff and lockout relays of the line equipment, and hence, from the locking circuit maintaining the connector hold relay 1125 operated, over test conductor 673 and make contacts 1125A. The connector thereupon releases, and frees and releases the control unit. The finder and selector also release, as does the cutoff relay in the line equipment. The line relay of the line equipment thereupon re-operates over the line, from the called station, and locks up the lockout relay, such as relay 130, before it can release, by way of make contacts 152 and 131. The line is now locked out, and when the calling party comes back in on the line, the connection is completed over the line, with talking battery fed from the line relay. The line is at the same time made busy at the connector by ground on the test normal from make contacts 151.

*Call timing*

"Permanents," or shorted lines, which cause seizure of the switches but no dialing, and partly completed calls, where for some reason, sufficient digits are not dialed, or too long a time elapses between digits, will cause a common timer to force the release of the switches involved, and lock out and make busy the offending line. Conversation timing is also provided in the connector, for calls from subscribers lines, as previously indicated. The timer is represented by the rectangle 782 shown in the left in Figure 7 of the selector control unit, in Figure 11 of the connector, and in Figure 13 of the connector control unit. Corresponding timing conductors are given the same number designations in each case.

With regards to the permanent timing in the selector control unit, it will be noted that two timing conductors extend from the timer 782 in Figure 7, namely, the TR conductor 780, and the TS conductor 781. The TR conductor 780 normally has ground on it from the timer, which removes this ground momentarily every two minutes during the operation of the timer. The TS conductor 781 has ground placed on it momentarily every two minutes by the timer, shortly after the ground is replaced on the TR conductor.

When a finder-selector link is seized by a call, or by a shorted line, or any similar cause, the pulsing relay 720 in the selector control unit operates, as previously explained. Relay 720 thereupon causes the operation of: release relay 725, which locks up the link; release relay 740, which starts the timer and prepares the pulsing and timing circuits; and transfer relay 730, which completes the dial tone circuit and further prepares the pulsing circuit. The release-timing relay 715 is now connected to the timer by way of make contacts 743, back contacts 717, and the TS conductor 781. The TR conductor 780 is open at make contacts 716.

If dialing does not occur before the ground pulse appears on conductor 781, which may happen any time within two minutes of seizure, depending on the starting position of the timer, relay 715 will be operated by said pulse. Relay 715 at make before break contacts 717 will lock operated, and at make before break contacts 716 will lock up the release relay 725 to the ground on conductor 780, while disconnecting the normal ground for this relay. If dialing still does not occur, the timer, after two minutes will remove the ground from conductor 780, thereby releasing relay 725 and the link. The cutoff relay of the faulty line then restores, and the line relay re-operates, to lock up the lockout relay, and thereby lock out said line from any further service, until the trouble is remedied and the short removed from the line.

The connector and its control unit are similarly guarded against failure to complete the dialing process, or excessive delays between digits, by the release timing relay 1300 and the TS and WT timing conductors 781 and 1117 in Figure 13. The timer grounds the TS conductor 781 momentarily every two minutes, as previously indicated, and also grounds the WT conductor 1117 momentarily, about one minute later, and also one and a half minutes later.

When a connector and the control unit are seized by a call, the only relay to operate immediately in the control unit, is the permanent timing relay 1350 which operates from ground on conductor 1189 through break contacts 1326. Relay 1350, in addition to preparing the busy test circuit at make contacts 1352 also at make contacts 1351 connects the TS timing conductor 781 to the release timing relay 1300 by way of back contacts of the make before break springs 1302, break contacts 1342 and 1387 in multiple, make contacts 1351, and break contacts 1311.

Since a ground pulse appears on conductor 781 every two minutes, while the timer is operating, it is possible that relay 1300 may operate at any time between seizure of the control unit and completion of the connection. If dialing follows seizure however, in the normal way, each digit causes transfer relay 1310 to operate and open its break contacts 1311, so that if relay 1300 has operated, it will thereupon release, and start a new timing cycle. After the tens digit, transfer relays 1320 and 1315 operate, and relay 1315 at make contacts 1316B shunts make contacts 1351 in the timing circuit preparatory to the release of relay 1350. Following the units digit, transfer relays 1335 and 1325 operate, and relay 1325, at break contacts 1326, cause the release of relay 1350 which opens its make contacts 1351, now shunted however, by make contacts 1316B. If the switching relay 1385 now operates, it will open break contacts 1387, to prepare the final disconnection of the timer. When therefore the ringing digit is dialed and transfer relay 1340 operates, break contacts 1342 open, and open the timing circuit to relay 1300, from conductor 781.

Should the dialing of any digit be delayed however, for a period of one minute following any operation of relay 1300, or should the called line be busy and the calling party fail to hang up on hearing the busy tone, the timer will ground the WT timing conductor 1117, and operate the forced release relay 1100, from said ground, through make contacts 1301, conductor 1188, make contacts 1176, and the winding of relay 1100 to battery. Relay 1100, at break contacts 1101 and 1102 forces the release of the connector and the control unit, and this in turn causes the release of the selector and finder, and the calling line is thereupon locked out in the manner already explained, until the calling party restores his receiver.

The conversation timing leads, shown at the lower left in Figure 11, are: the now familiar TS conductor 781 which the timer grounds momentarily every two minutes; the normally grounded TR conductor 780 from which the timer removes ground momentarily some two minutes after grounding conductor 781; the TP1 conductor 1113 to which the timer connects a short pulse of ground some two minutes after grounding the TS conductor 781; the normally grounded TP2 conductor 1114 from which the timer removes ground momentarily some two minutes after grounding the TP1 conductor 1113; and the WT conductor 1117 which the timer grounds momentarily about one minute after the ground is removed from the TP2 conductor 1114.

Conversation timing starts when a call is switched through, by the operation of the connector switching relay 1130 from the control unit, after the called party has answered. The operation of relay 1130 also, at break contacts 1137 releases the control unit, and at make contacts 1139 connects conductor 781 to conversation timing relay 1165, by way of break contacts 1144 and 1172.

Now, when the timer grounds the TS conductor 781, any time within two minutes following the operation of relay 1130, depending on the position of the timer at the moment the call is switched through, relay 1165 operates. Relay 1165 thereupon locks over its lower winding through make contacts 1168, back contacts 1173, break contacts 1143 (break contacts 1108 and 1109 are open), and make contacts 1128 to ground. Relay 1165 also at make before break contacts 1166 prepares an alternative holding circuit for release relay 1120, at make contacts 1167 connects the TP1 conductor 1113 to the upper winding of relay 1170, and at break contacts 1169 opens the WT conductor 1117.

Approximately two minutes after the operation of relay 1165, the timer grounds the TP1 conductor momentarily, operating the conversation timing relay 1170 which also locks to ground at make contacts 1128 on the hold relay. Relay 1170 also, at make-before-break contacts 1171, removes the normal ground from release relay 1120 and replaces it with ground from make contacts 1128, by way of make contacts 1108, 1166, 1171 and 1111. Relay 1170 also, at break contacts 1172 opens the operate circuit of relay 1165, at make-before-break contacts 1173 switches the locking circuit of relay 1165 to the grounded TP2 conductor 1114, and at make contacts 1174 prepares a circuit to the warning tone relay 1150, which also serves, it will be remembered, as the verification relay on calls from a toll operator.

Approximately two minutes after the operation of relay 1170, if the conversation still continues, the timer removes ground momentarily, from the TP2 conductor 1114, unlocking relay 1165, which releases. Relay 1165, at make before break springs 1166 transfers the holding circuit of release relay 1120 to the normally grounded TR conductor 780, and at make contacts 1167 opens the operate circuit of relay 1170. Relay 1165 also, at make contacts 1168 further opens its own locking circuit, and at break contacts 1169 connects the WT lead 1117 to the upper winding of relay 1150.

Approximately one minute after the release of relay 1165, the timer places a short pulse of ground on the WT conductor 1117. This ground pulse passes through break contacts 1169 and make contacts 1174 and causes the warning tone relay 1150 to operate briefly. Relay 1150 upon operating, at make contacts 1153 places a short splash of dial tone from dial tone conductor 1199 on the connection, by way of break contacts 1141 and condenser 1116, as a warning to the parties that they are about to be cut off.

And, approximately on half minute after the first warning tone is given, if the conversation has still not been terminated, the timer, which continues to operate from the upper make contacts of the hold relay 1125, again grounds the WT conductor 1117, and again operates relay 1150 to give a second short warning tone. Immediately thereafter, the timer removes ground momentarily from the TR conductor 780. This causes release relay 1120, which is now locked to this ground, to restore and release the connection. Conversations, on ordinary subscriber to subscriber calls, are thus limited to some six to eight minutes, depending on the time required to operate relay 1165 at the start of the conversation.

*Blocked call*

A call is blocked, when, due to a fault, it fails to switch through, at any point in its progress, although idle links or trunks are available, and the called station is free. In the case of a finder failing to find the calling line, the finder control unit, as described in the section covering a subscriber to subscriber call, shunts down the allotter relay involved and passes the call to another link, should the calling line not be cut through within the release time of relay 425. Thus to repeat, should relay 425 fall away, it releases relay 435, which causes relay 440 to operate, and relay 440 pulls relay 420. Relay 420 re-operates relay 425, which reoperates relay 435, which causes the release of relay 440, which in turn releases relay 420. And during the interval between the release of relay 440 and that of relay 420, both slow to release, the allotter relay handling the call is shunted down by the negative battery at make contacts 421, and the call is automatically passed to the next idle finder.

In the case of a selector, which, for some reason, fails to switch through to an idle trunk or to an idle connector switch, the situation is handled by the trunk selecting equipment, such as shown in Figures 9 and 10. Since the selector fails to switch through, the selector control unit remains operated, and so prevents the release of the trunk access relay involved, such as relay 900, within the release time of the slow to release kickoff relay 925, whose circuit is held open by operated lockout relay 915.

The kickoff relay 925 thereupon releases, and at make contacts 926 opens another point in the pull up circuit of the group access relays, to assure that the circuit will be completely reset before any other of these relays will be permitted to operate. Relay 925 also at break contacts 927 grounds the kickoff conductor, to advance the trunk select relays to the next idle trunk. Thus, for example, if all trunks are idle and trunk select relay 1020 alone is operated, as shown, to mark the first trunk, this ground from make contacts 927 will pass through make contacts 937, conductor 1076, make contacts 1023, make contacts 1066, and the winding of trunk select relay 1030 to battery at break contacts 1066. Relay 1030 thereupon operates and locks, to mark the second trunk, and releases relay 1020.

Finally, relay 925, at break contacts 928 grounds the busy conductor back to the selector and causes the operation of the busy relay 510, by way of make contacts 909A, conductor 544, cable 658, resistor 556, and the lower winding of relay 510 to battery. Relay 510 upon operating, at make contacts 514 grounds the hold conductor 273 to hold the link, at make contacts 513 grounds the test conductor 272 to hold the cutoff and lockout relays off the calling line, and at break contacts 512 opens the circuit of the pulsing relay 720 to release and free the selector control unit. Relay 510 also, at make contacts 511 and 512 locks itself up to the calling line, and at the same time connects busy tone to the calling line, over the same circuit, which is from busy tone and ground on conductor 576, through make contacts 511, the upper winding of relay 510, break contacts 501, positive talking conductor 270, through the finder to the calling telephone, back through the finder to the negative talking conductor 271, through break contacts 502, make contacts 512 and the lower winding of relay 510 to negative battery. The calling party must now hang up and dial again, whereupon the call will be routed automatically to the second trunk.

Should a connector fail to cut through, on a call to a regular subscriber, whose line is idle at the time, ringing will not take place, and the calling subscriber, hearing neither ring-back tone or busy tone, should hang up and try again. Otherwise, after the proper time interval, the release will be forced by the release timing relay 1300 as explained in the section on "Call Timing."

On a call to a P. B. X, should a connector units relay fail to operate following the third digit of the call number, the units digit transfer relay 1335 will not operate, to pull the counting chain release relay 1305. The counting chain will thus remain operated, and will therefore fail to restore group access relay 1600 promptly, thereby holding lockout relay 1620 also operated, beyond the normal release time of the slow-to-release "release forcing" relay 1630. Relay 1630 thereupon restores, and at break contacts 1632 connects ground to relay 1100 in the connector, by way of make contacts 1609 and conductor 1685. Relay 1100 operates over this circuit, forces the release of the switch train, and locks out the calling line, compelling the calling party to hang up and try again.

*Digit absorption*

Provision is made in the selector control unit, to prevent the use of a first digit "1," or rather to prevent a first digit "1" from having any untoward effect. This is done by means of the make contacts 734 on the transfer relay 730, and its chief purpose is to prevent preliminary impulses from the switch hook of the calling telephone from causing a wrong number call.

Assuming for example, that the selector and control unit shown have been seized by a call, and the relays 720, 725, 730 and 740 operated in the usual manner, when a single impulse causes pulsing relay 720 to release and re-operate once. Upon the release of relay 720, counting relay 810 operates by way of contacts 721, 742, 732, conductor 766 and contacts 6, 5 and 4. Upon the re-operation of pulsing relay 720, the pulsing circuit is opened, counting control relay 1 operates in series with relay 810, and both relays lock operated over the following circuit: ground at make contacts 744, conductor 765, contacts 8, winding of relay 1, conductor 769, make contacts 734, make contacts 811, and the winding of relay 810 to negative battery. The circuit to both windings of transfer relay 730 being now open, the upper winding at break contacts 721, and the lower winding at the upper break contacts of relay 1, relay 730 releases after a slight delay, and unlocks relays 1 and 810. Relays 1 and 810 thereupon restore, and relay 1 at its upper break contacts again closes the circuit to the lower winding of relay 730, from ground at make contacts 744. Relay 730 quickly re-operates, and the control unit is as before. A single pulse is therefore without effect, as far as the control unit is concerned, and does not hinder normal dialing.

*Calls to unused trunk groups*

Provision is made in the selector and control unit for giving a busy signal to the calling party in case the first digit dialed corresponds to an unused selector trunk group. In the drawing, this feature is shown applied to the "T500," "T600," "T700" and "T800" groups, which would normally be controlled from the counting relays 850, 860, 870 and 880.

Assuming for example that a subscriber dials a first digit "5," the counting relays of the selector control unit will count off five steps leaving counting relay 850 operated. Now when the transfer relay 730 restores after the usual delay it closes a circuit to busy relay 510 as follows: ground at make contacts 744, break contacts 733, conductor 768, make contacts 852, conductor 555, make contacts 530, resistor 556, and the lower winding of relay 510 to battery.

Busy relay 510 thereupon operates and locks to the calling line over the line loop, through its make contacts 511 and 512, connects busy tone to the calling line through said make contacts 511, and at break contacts 512 opens the circuit to pulsing relay 720, which releases and frees the control unit. The busy relay 510 will operate similarly on a first digit "6," "7" or "8" through make contacts 862, 872 or 882 on their respective counting relays.

What is claimed is:

1. In an automatic telephone system, subscriber's lines, automatic switches for making connections between said lines, group and units relays in said switches, talking conductors incoming to each of said switches, switching stages into which said switches are divided according to rank and position in the establishment of a call, a control unit for each switching stage common to a plurality of switches in said switching stage, means for connecting said control units temporarily to a switch in each associated switching stage in response to the seizure of such switch by a calling line, means in said control units responsive to impulses received by said connected switches over the associated talking conductors for operating the group and units relays of said connected switches to complete a call, means for freeing said control units progressively, and means for freeing any of said control units automatically after a given time interval in case a call is not completed promptly through the associated switching stage.

2. In an automatic telephone system, subscribers' lines, linefinder, selector and connector switches of the all-relay type comprising successive switching stages for establishing connections between said subscribers' lines speech conductors incoming to each of said switches, control equipment units individual to each switching stage and common to a plurality of the switches in each said switching stage for controlling the relays in said switches responsive to controls exercised over said switches' respective speech conductors to complete a connection, means for connecting respective ones of said control units in succession to an idle switch in each switching stage as the call progresses, and means for freeing said control units from said switches in succession as the call progresses through its successive switching stages.

3. In a telephone system, lines, a group of relay finders, a group of relay selectors and a group of relay connectors for extending connections from calling to called ones of said lines, a control unit for each said group, means responsive to the initiation of a call for connecting said finder control unit to an idle one of said finders to cause said finder to extend the calling line to an idle one of said selectors, means responsive to the operation of said finder for connecting said selector control unit to said selector and for freeing said finder control unit, means in said connected selector control unit responsive to dial pulses over said extended calling line for causing said selector to further extend said calling line to an idle one of said connectors, means responsive to the operation of said selector for connecting said connector control unit to said connector and for freeing said selector control unit, means in said connector control unit responsive to dial pulses over said further extended calling line for causing said connector to connect with the called line, and means responsive to said called line answering for completing the connection and for freeing said connector control unit.

4. In a telephone system, subscribers' lines, a plurality of all-relay finders, selectors and connectors for establishing connections between said lines, a finder control unit common to said finders, a selector control unit common to said selectors, means responsive to the initiation of a call for causing the seizure of an idle on of said finders and an idle one of said selectors and connecting said control units thereto, tens and units relays in said finders and selectors, an incoming speech circuit for each of said selectors, means for operating the tens and units relays of said one finder from said connected finder control units to extend the calling line over said one selector's incoming speech circuit to said selector control unit, a hold conductor and a test conductor in said selector, means in said selector control unit responsive to the extension of said calling line thereto to ground said hold and test conductors to hold said finder and disconnect said finder control unit therefrom, a switching relay in said selector, means in said connected selector control unit responsive to dial pulses over said extended calling line and said selector speech circuit to operate the tens and units relays and the switching relay of said one selector to extend the calling line to an idle one of said connectors, means responsive to the operation of said switching relay for disconnecting said selector control unit and grounding said hold conductor at the selector to hold the operated tens and units relays of both finder and selector, and means in said one connector responsive to the extension of the calling line thereto for returning ground on the test conductor to hold said switching relay after the disconnection of said selector control unit.

5. In a telephone system having subscriber lines and trunk lines, all-relay type selectors and connectors for extending calls from said lines, a control unit common to said selectors, means responsive to the initiation of a call for seizing an idle one of said selectors and causing it to seize said control unit temporarily, a speech circuit incoming to said one selector, counting relays in said control unit operated in response to dial pulses incoming to said one selector over said speech circuit for causing said selector to extend the call to an idle one of said connectors, and a marking relay in said control unit operated in response to the seizure of said one selector by a call from a trunk line to mark the call as a trunk call in said one connector.

6. In a telephone system, subscriber lines and trunk lines including a restricted subscriber line and a restricted trunk line, a plurality of all-relay finders and selectors for extending calls to said trunk lines, tens and units relays in said finders and selectors, a finder control unit common to said finders and a selector control unit common to said selectors, means responsive to the initiation of a call by any one of said lines for causing seizure of said finder control unit from said line, circuits in said last unit completed in response to such seizure for causing such unit to be connected to an idle one of said finders relay contacts in said finder operated responsive to such connection for causing said selector control unit to be connected to an idle one of said selectors, and for operating the tens and units relay of said one finder from said finder control unit to extend the call to said one selector, a pair of speech conductors incoming to said selector, counting relays in said selector control unit operated in response to dial pulses passed through said finder and over said speech conductors to cause said one selector to extend the call to one of said trunk lines by operating the tens and units relays therein, a first discriminating relay in said finder control unit operated in response to the initiation of a call from said restricted subscriber line, a second discriminating relay in said selector control unit operated from said first relay, and circuits controlled by said second operated relay for preventing the extension of such a call to said restricted trunk line.

7. In a telephone system, a pair of impulse controlled relay type switches of equal rank having group and units relays for extending connections, a separate pair of speech conductors incoming to each of said switches, control equipment common to said switches and normally disconnected therefrom, operate circuits for said group and units relays, connect relays operated in response to the extension of a call to either one of said switches for seizing said control unit and extending said switch's speech conductors and operate circuits thereto, and pulsing and counting relays in said control equipment operated in response to dial pulses incoming thereto over said extended speech conductors for controlling the operation of the said group and units relays of said one switch over said extended operate circuits to extend the call.

8. In a telephone system, relay type switches having group and units relays for extending calls, control equipment common to said switches and normally disconnected therefrom, means responsive to the seizure of any one of said switches for connecting said common equipment to such switch, a pair of line conductors incoming to each of said switches, means in said common equipment responsive to dial pulses from a calling line over said one switch's incoming line conductors for controlling the operation of said group and units relays in said switch to extend the call, and relay means operated in any idle ones of said switches in response to the seizure of said common equipment for artificially busying such idle switch or switches temporarily.

9. In a telephone system, trunk groups, links including relay type selectors for extending calls to said trunk groups, talking conductors incoming to each of said selectors, control equipment common to said selectors, circuits completed responsive to the seizure of an idle one of said links by a call to connect said common equipment to the selector of said one link, means in said common equipment responsive to dial pulses received over said selector's talking conductors for controlling the operation of said selector to extend the call to an idle trunk in one of said trunk groups, means in said selector to disconnect said common equipment as soon as the call has been extended to said trunk, and means in said common equipment to cause disconnection of said common equipment in case the call is not extended to an idle trunk within a given time interval.

10. In a telephone system, trunk groups links including finders and, relay type single-digit selectors for extending calls to said trunk groups, a speech circuit incoming to each of said selectors, a control unit common to a plurality of said selectors, relay means operated responsive to the seizure of an idle finder by a call to connect said control unit to the selector associated with such finder, means in said control unit responsive to said connection to return dial tone to the calling line, means in said control unit responsive to dial pulses passing over said selector's incoming speech circuit to cause said selector to select a particular trunk group, trunk selecting equipment common to said selectors for automatically directing the call to an idle trunk in said group, and means for giving a busy signal and freeing said control unit in case all trunks in the called group are busy.

11. In a telephone system, local and interoffice trunk groups, links including finders and associated relay type selectors for extending calls to said trunk groups, a pair of incoming line conductors for each said selector, a control unit common to a plurality of said selectors, circuits in said finder and selectors completed responsive to the seizure of an idle finder by a call for connecting said control unit to the selector associated with said seized finder, counting relays in said control unit responsive to dial pulses received by way of said selector's incoming line conductors to cause said selector to select a particular trunk group, means for directing such calls automatically to an idle trunk in the called trunk group, and means in said selector controlled from said counting relays for giving a busy signal and disconnecting said control unit in case the digit dialed has not been assigned to any trunk group.

12. In a telephone system, local and interoffice trunk groups, links including relay-type single-digit selectors, each having a speech circuit incoming thereto, trunk selecting equipment associated with said selectors, a control unit common to a plurality of said selectors, means operated in response to the seizure of one of said links by a call to connect said control unit to said link's selector, an impulse register in said control unit operated in response to dial pulses passing over the said speech circuit to said one selector to cause said selector and said trunk selecting equipment to direct the call to an idle trunk in one of said trunk groups, and means in said selector controlled from said control unit for giving a busy signal and releasing said control unit in case the digit dialed has not been assigned to any trunk group, a restrict relay in said control unit operated in response to the seizure of said link by a call from a subscriber restricted against calling a particular trunk group and means including said operated restrict relay and said register for operating said signal and releasing means in case the digit dialled is that assigned to said particular trunk group.

13. In a telephone system having subscriber lines and trunk groups, a restricted subscriber line and a restricted trunk group, selector switches of the all-relay type for extending calls to said trunk groups, line conductors incoming to said selector switches, a control unit common to said selector switches, a connect relay in each selector switch, means for operating such connect relay in any one of said selector switches in response to the seizure of said one selector switch by a call to connect said control unit momentarily to said one selector switch, a register in said control unit operated responsive to dial pulses passed thereto by way of said one switch's incoming line conductors to cause said selector to extend the call to an idle trunk in one of said trunk groups, a discriminating relay in said control unit operated in response to a call from said restricted subscriber line, and circuits controlled by said operated discriminating relay to prevent the extension of such a call to a trunk in said restricted trunk group.

14. In a telephone system, trunks, a group of all-relay type selectors for extending calls to said trunks, speech circuits incoming to said selectors, a plurality of control units associated with said selectors but normally disconnected therefrom, a connect relay in each said selector for each of said control units, means for preselecting said control units one at a time, means responsive to the seizure of any one of said selectors by a call to operate the connect relay in such selector associated with the preselected control unit in order to connect said seized selector to said preselected control unit, and means in such connected control unit operated in response to dial pulses passed thereto over the speech circuit incoming to said connected selector to control the operation of such connected selector to extend the call to an idle one of said trunks.

15. In a telephone system, trunk groups, relay type selectors for extending calls to idle trunks in said trunk groups, line conductors incoming to said selectors, relay type selector-control units common to a plurality of said selectors and normally disconnected therefrom, connect relays in each said selector operated in response to the seizure of such selector to connect one of said control units thereto and to the line conductors thereof, a relay type allotter for causing said control units to be taken into use one at a time in rotation, relay controlled circuits for making a connected control unit unavailable to the other selectors, group and units relays in said selectors, and pulse counting means in said connected control unit operated responsive to dial pulses passing over the line conductors of the connected selectors to said connected control unit to control the operation of said last named relays in said connected selector to extend a call to an idle trunk in one of said trunk groups.

16. In an automatic telephone system, trunks, relay type selectors for extending calls to said trunks, line conductors incoming to each said selector, group and units relays and a switching relay in each said selector, a control unit common to said selectors, a line relay and a dial tone relay in said control unit, connect relays in each said selector operated in response to the seizure of such selector to connect such selector to said control unit and operate said line relay over said line conductors, means in said control unit for causing the operation of said dial tone relay in response to the operation of said line relay to connect dial tone to said line conductors, counting relays in said control unit operated in response to dial pulses over said line conductors to said line relay to cause said group and units relays to select one of said trunks, means to operate said switching relay in response to the operation of said units relays, and means controlled by said operated switching relay to extend said line conductors to said selected trunk and disconnect and release said line relay and said control unit.

17. In a telephone system, subscriber lines, relay type connector switches each having a pair of incoming line conductors for completing connections to said subscriber's lines, a relay type control unit common to a plurality of said switches for controlling the operation thereof, counting relays in said control unit operated in response to dial pulses from a calling line over the line conductors of any one of said connectors for causing said one connector to connect with a called line, and relay means in said control unit for connecting ringing signals to said called line if idle.

18. In a telephone system, subscriber lines, connectors each having an incoming speech circuit, a control unit common to said connectors, means responsive to the seizure of one of said connectors for connecting said control unit to said one connector, means in said control unit operated in response to dial pulses received over the speech circuit of said one connector for causing said one connector to connect with a called line, means in said control unit for connecting ringing signals to said called line if idle, means in said control unit for stopping the ringing signals and for freeing the control unit in response to subscriber answering, and means in said control unit for stopping the ringing signals and for freeing the control unit after a given number of ringing signals in case the call is not answered.

19. In a telephone system, subscriber lines, relay type connectors for extending calls to said lines and each having a pair of line conductors incoming thereto, a control unit common to said connectors, means for connecting said control unit to one of said connectors in response to the extension of a call to said connector, group and units relays in said connector, a register in said control unit operated responsive to dial pulses over said one connector's line conductors to cause said relays to make connection with the called line, means in said control unit operated responsive to connection with a busy line to pass a busy signal back to the calling line, means in said control unit for passing ringing signals to the called line if idle, means in said control unit to cause disconnection of said control unit when the called line answers, means in said control unit to cause disconnection of said control unit after a given number of ringing cycles if the called line does not answer when rung, and means in said control unit to disconnect said control unit after a given time if the calling line does not hang up when given the busy signal.

20. In a telephone system, subscriber lines, relay type connectors having incoming line conductors for completing connections to said lines, a control unit common to said connectors and normally disconnected therefrom, relay means operated responsive to the seizure of one of said connectors to connect said control unit thereto, group and units relays in said connector, ringing control relays in said control unit, a counting chain in said control unit responsive to dial pulses over said incoming line conductors for operating said group and units relays to make connection with a called line and for operating said ringing control relays to connect ringing signals to said line, means in said control unit for causing disconnection of said control unit when the called line answers, and means in said control unit for forcing disconnection of said control unit and release of said connector if dialing does not follow seizure within a given time, and also if each succeeding digit is not received within a given time after its immediately preceding digit.

21. In a telephone system, multi-station subscriber lines, a plurality of all-relay connectors for extending connections thereto, a control unit, connect relays in said connectors for connecting said control unit momentarily to any one of said connectors in response to the extension of a call to said one connector, means in said control unit operated in response to a calling subscriber transmitting impulses representing the final digits of the directory number of a station on his own line to said one connector and restoring his receiver for causing the seizure of said line and for connecting the ringing signals of the called station thereto, a line relay in said one connector, means in said control unit for causing the disconnection of said line relay and for holding said connector during the said ringing signals, and timing circuits in said control unit for causing the release of said connector shortly after the called station answers.

22. In a telephone system, multi-station subscriber lines, relay type connectors having incoming line conductors, a relay type control unit, means to connect said control unit to any one of said connectors upon the extension of a call to said connector, counting relays in said control unit operated from dial pulses from a calling line to said connector over the said line conductors thereof extended to said control unit by said connection for causing said connector to connect with a called line and to ring said called line if idle, a busy relay in said control unit operated in response to the calling subscriber dialling another station on his own line to give the busy signal, a reverting call relay in said control unit operated in response to such subscriber restoring his receiver upon hearing the busy signal, means in said control unit controlled by said operated reverting call relay for releasing said busy relay and for causing the ringing signal of the called station to be connected to said line, and means in said control unit operated in response to said called station answering to cut off the ringing signal and substitute therefor a special reverting call signal.

23. In a telephone system, multi-station subscriber lines, relay type connectors each having a pair of incoming line conductors, a relay type control unit, means to connect said control unit to any one of said connectors in response to the extension of a call to said connector, a pulse counter in said control unit operated in response to dial pulses from a called subscriber to said connector over the said line conductors thereof extended to said control unit in response to said connection to cause said connector to connect with a called one of said lines, a reverting call relay in said control unit operated in response to such subscriber calling another station on his own line and restoring his receiver, means controlled by said operated relay to cause the ringing signal of said other station to be impressed on said called subscriber's line from said control unit, ring timing relays in said control unit to automatically stop the ringing and release the connector and control unit after a predetermined ringing interval if the called station fails to answer, means in said control unit to impress a different audible signal on said called line when the called station answers, and release timing relays in said control unit for automatically disconnecting said different signal and freeing said connector and said control unit shortly after said called station has answered.

24. In a telephone system, subscriber lines, regular operator trunk lines, toll operator trunk lines, relay type connectors for completing connections to and from said lines, an incoming speech circuit and a pulsing circuit in each said connector, a control unit, relays means for connecting any one of said connectors and the associated pulsing circuit to said control unit in response to the seizure of said connector by a call, counting relays in said control unit operated in response to dial pulses over said connector's incoming speech circuit repeated from said one connector over said pulsing circuit to cause said connector to select a called one of said subscriber lines and to cause said control unit to connect ringing signals to the called line if idle, means for stopping the ringing and completing said speech circuit to the called line in response to the called line answering, a first relay in said connector operated upon seizure of said connector on calls thereto from a toll operator, a second relay in said connector, a busy relay in said control unit operated in response to the extension of a call to a busy subscriber line to prevent completion of the connection, means operated by said operated busy relay and said operated first relay for extending said pulsing circuit to said second relay for causing the operation thereof by said toll operator in response to her dialling an extra digit, and means controlled by said operated second relay for extending said speech circuit to such busy subscriber line.

25. In a telephone system, subscriber lines, relay type connectors for extending calls thereto, group and units relays in said connectors, a relay type control unit common to said connectors, connect relays in each said connector operated in response to the seizure of such connector for connecting said connector temporarily to said control unit, a line relay and a cutoff relay in each said connector, circuits closed by such an operated connect relay for operating such cutoff relay in each idle connector, contacts controlled by such operated cutoff relay to disable the associated line relay and prevent seizure of such idle connector while said control unit is in use, counting relays in said control unit operated in response to dial pulses repeated thereto from said seized connector's line relay for operating said group and units relays and thereby causing said connected connector to connect with a called line, idle-test and ringing relays in said control unit for connecting ringing signals to said called line, and a ring cutoff relay in said control unit operated in response to the called line answering to cause the connector to complete the connection and free the control unit.

26. In an automatic telephone system, subscriber lines, relay type connectors having incoming line conductors for extending calls to said subscriber lines, group and units relays in each said connector, a relay type control unit common to said connectors, connect relays in each said connector operated in response to the seizure of such connector to connect such connector to said control unit, counting relays in said control unit operated in response to dialled digits repeated thereto from said connected connector's incoming line conductors to cause the operation of said group and units relays to select a wanted one of said subscriber lines, transfer relays in said control unit controlled by said repeated digits and said operated group and units relays for releasing said counting relays after each digit and preparing circuits for the succeeding digit, ringing relays in said control unit operated in response to a final dialled digit for impressing ringing signals on said selected subscriber line, a first ring cutoff relay in said control unit operated in response to said selected line answering while ringing current is on said line, a second ring cutoff relay in said control unit operated in response to said selected line answering during a silent interval, and circuits completed by each of such operated ring cutoff relays to cause the completion of the connection through said connector and the automatic disconnection and release of said control unit.

27. In an automatic telephone system, subscriber lines, relay type connectors, a line relay and a switching relay in each said connector, a pulsing circuit associated with each said line relay, a relay type control unit for said connectors, counting relays in said control unit, connect relays in each said connector operated in response to the seizure of such connector to connect such connector and the associated pulsing circuit to said control unit, means to pass dial pulses to the included line relay during the establishment of a call through such connector, contacts on said line relay for repeating said dial pulses over said pulsing circuit to said counting relays for operating said counting relays, circuits completed by said operated counting relays to cause said connector to select a wanted one of said subscriber lines, a busy test relay and an idle test relay in said control unit, ringing relays in said control unit, a circuit for operating said busy test relay in response to selection of a busy line thereby to connect a busy tone to the calling line, a circuit for operating said idle test relay in response to the selection of an idle line, contacts operated by said operated idle test relay to cause said ringing relays to connect ringing signals to the selected idle line in response to further pulsing and to repeat said signals if necessary, a ring cutoff relay in said control unit operated in response to said signalled line answering, a circuit completed by said operated cutoff relay to operate said switching relay, contacts operated by said operated switching relay to complete the call and release said connect relays to free said control unit, and ring timing relays in said control unit operated from said ringing relays to operate said switching relay and free said control unit after a predetermined number of repetitions of said ringing signals in case the called line fails to answer.

JOHN H. VOSS.

REFERENCES CITED

The following references are of record in the file of this patent:

UNITED STATES PATENTS

| Number | Name | Date |
|---|---|---|
| 1,714,718 | Mercer | May 28, 1929 |
| 1,738,564 | Christian | Dec. 10, 1929 |
| 2,023,239 | Ostline | Dec. 3, 1935 |
| 2,152,769 | Newby | Apr. 4, 1939 |
| 2,158,945 | Peterson | May 16, 1939 |
| 2,177,069 | Kessler | Oct. 24, 1939 |
| 2,177,079 | Saunders | Oct. 24, 1939 |
| 2,252,309 | Voss | Aug. 12, 1941 |
| 2,258,651 | Hovland | Oct. 14, 1941 |
| 2,325,877 | Powell | Aug. 3, 1943 |
| 2,333,038 | Voss | Oct. 26, 1943 |
| 2,333,039 | Peterson | Oct. 26, 1943 |
| 2,335,473 | Bakker | Nov. 30, 1943 |
| 2,375,514 | Bakker | May 8, 1945 |